(12) United States Patent
Vorbach et al.

(10) Patent No.: US 10,409,765 B2
(45) Date of Patent: Sep. 10, 2019

(54) METHOD FOR PROVIDING SUBAPPLICATIONS TO AN ARRAY OF ALUS

(71) Applicant: Scientia Sol Mentis AG, Schindellegi (CH)

(72) Inventors: Martin Vorbach, Lingenfeld (DE); Armin Nuckel, Neupotz (DE)

(73) Assignee: PACT XPP SCHWEIZ AG, Schindellegi (CH)

( * ) Notice: Subject to any disclaimer, the term of this patent is extended or adjusted under 35 U.S.C. 154(b) by 0 days.

(21) Appl. No.: 15/629,720

(22) Filed: Jun. 21, 2017

(65) Prior Publication Data

US 2017/0286364 A1     Oct. 5, 2017

Related U.S. Application Data

(63) Continuation of application No. 14/276,449, filed on May 13, 2014, now Pat. No. 9,690,747, which is a continuation of application No. 12/720,898, filed on Mar. 10, 2010, now Pat. No. 8,726,250, which is a continuation of application No. 10/009,649, filed as application No. PCT/DE00/01869 on Jun. 13, 2000, now Pat. No. 8,230,411.

(30) Foreign Application Priority Data

| Jun. 10, 1999 | (DE) | ................................. | 199 26 538 |
| Jan. 9, 2000 | (DE) | ................................. | 100 00 423 |
| Apr. 12, 2000 | (DE) | ................................. | 100 18 119 |

(51) Int. Cl.
*G06F 9/30* (2018.01)
*G06F 9/38* (2018.01)
*G06F 15/80* (2006.01)
*G06F 12/00* (2006.01)
*G06F 8/41* (2018.01)
*G06F 15/78* (2006.01)

(52) U.S. Cl.
CPC .............. *G06F 15/80* (2013.01); *G06F 8/433* (2013.01); *G06F 8/45* (2013.01); *G06F 15/7867* (2013.01)

(58) Field of Classification Search
CPC .... G06F 15/7867; G06F 15/80; G06F 9/3885; G06F 9/3897; G06F 9/3001; G06F 13/4022; G06F 17/5022; G06F 17/5027; G06F 13/4068; G06F 9/30145; G06F 8/433; G06F 8/45; H01L 2924/00; H01L 2924/0002; Y02D 10/13
See application file for complete search history.

(56) References Cited

U.S. PATENT DOCUMENTS

| 5,437,049 A | * | 7/1995 | Carlstedt | .................. G06F 7/483 712/11 |
| 5,588,152 A | * | 12/1996 | Dapp | ..................... G06F 7/483 712/16 |
| 5,600,263 A | * | 2/1997 | Trimberger | ......... G06F 15/7867 326/39 |

(Continued)

*Primary Examiner* — Thuy Dao
(74) *Attorney, Agent, or Firm* — Aaron Grunberger

(57) ABSTRACT

An array of ALUs and a controlling and controlling unit providing the array sequentially ordered subapplications, wherein an ALU signals completion of execution of a subapplication to the controlling unit, which then provides a next sequential subapplication to the requesting ALU.

9 Claims, 41 Drawing Sheets

(56) References Cited

U.S. PATENT DOCUMENTS

| | | | | |
|---|---|---|---|---|
| 5,603,047 A * | 2/1997 | Caulk, Jr. | ............. | G06F 9/3001 |
| | | | | 712/23 |
| 5,646,545 A * | 7/1997 | Trimberger | ......... | G06F 15/7867 |
| | | | | 326/38 |
| 5,742,538 A * | 4/1998 | Guttag | ...................... | G06F 7/53 |
| | | | | 708/620 |
| 5,926,583 A * | 7/1999 | Iwase | ...................... | G06F 17/10 |
| | | | | 348/721 |
| 6,094,715 A * | 7/2000 | Wilkinson | .............. | G06F 7/483 |
| | | | | 712/20 |
| 6,134,516 A * | 10/2000 | Wang | .................. | G06F 17/5022 |
| | | | | 703/20 |
| 6,182,206 B1 * | 1/2001 | Baxter | .................... | G06F 8/447 |
| | | | | 712/227 |
| 6,230,278 B1 * | 5/2001 | Li | ......................... | G06F 1/3203 |
| | | | | 712/219 |
| 6,317,819 B1 * | 11/2001 | Morton | .................... | G06F 8/45 |
| | | | | 711/147 |
| 6,389,379 B1 * | 5/2002 | Lin | .................... | G06F 17/5022 |
| | | | | 703/14 |
| 6,594,752 B1 * | 7/2003 | Baxter | .................... | G06F 8/447 |
| | | | | 712/227 |
| 6,952,827 B1 * | 10/2005 | Alverson | ................ | G06F 9/461 |
| | | | | 709/203 |

* cited by examiner

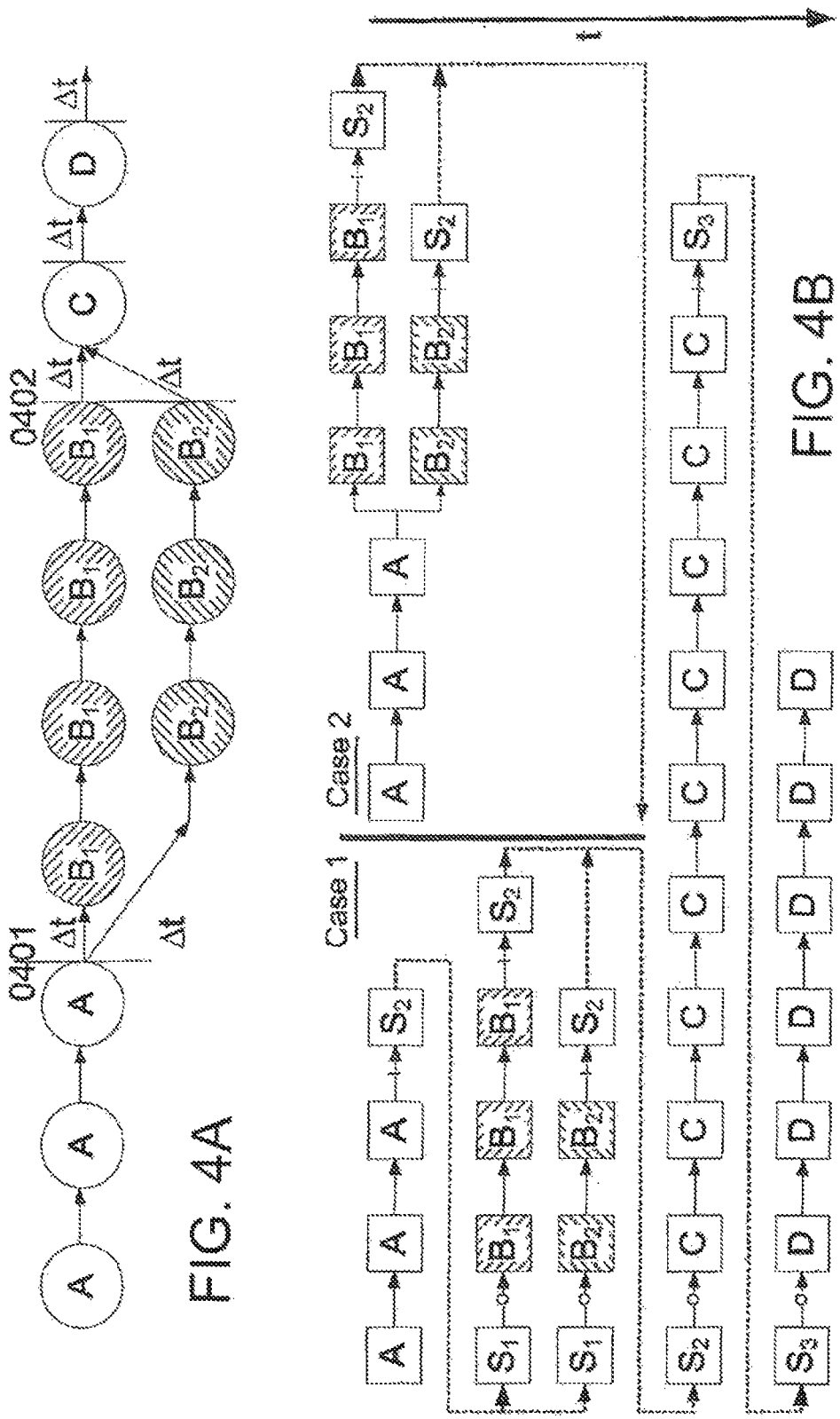

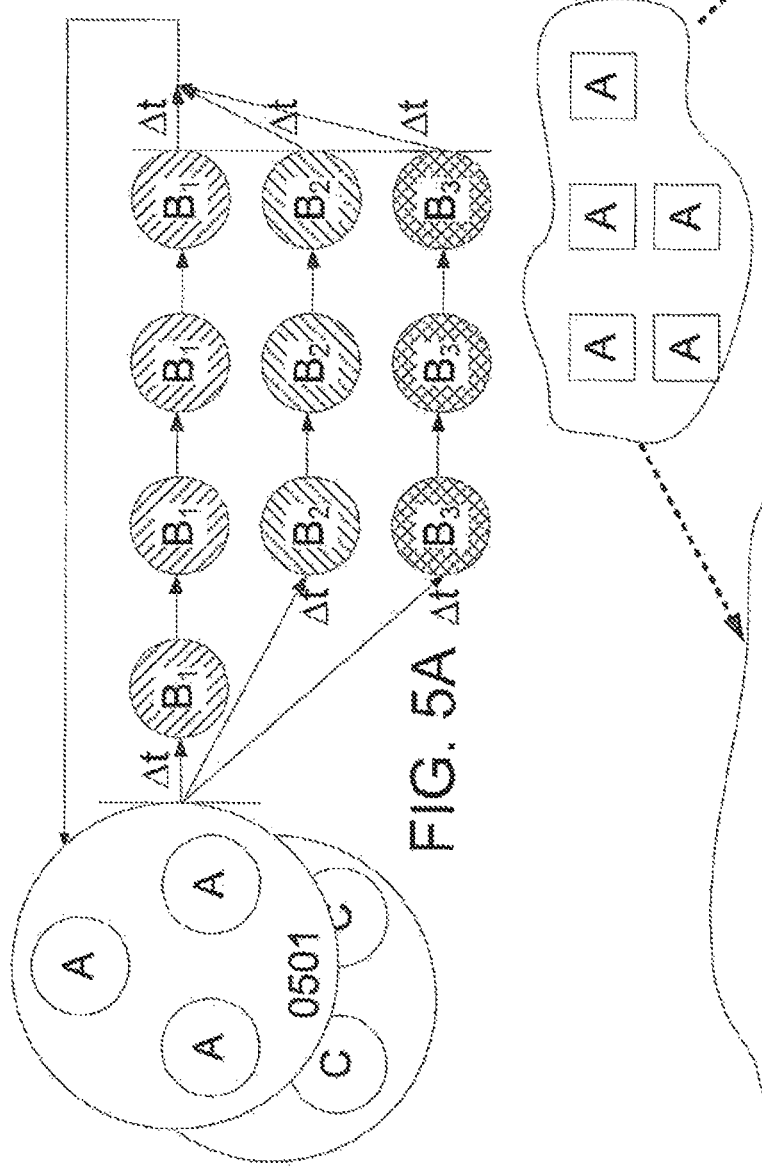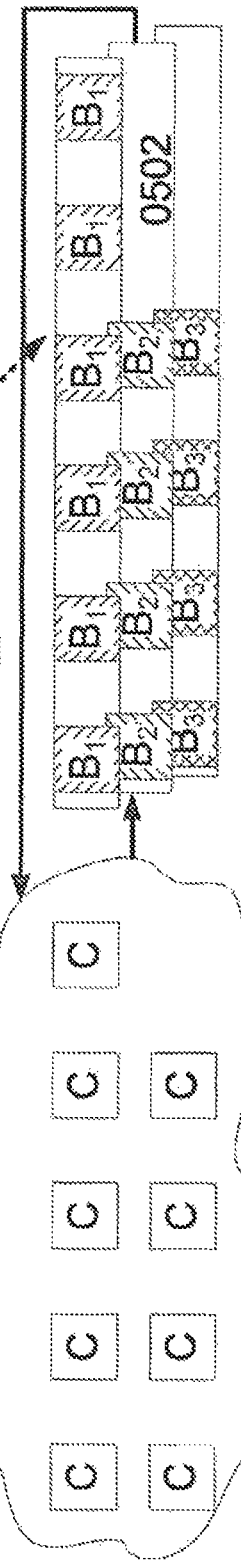

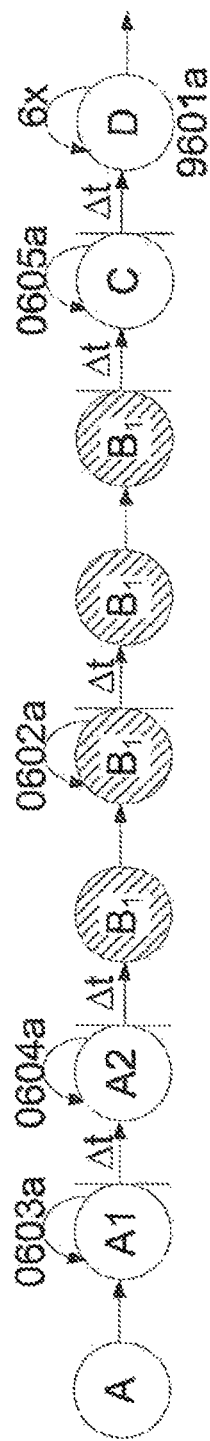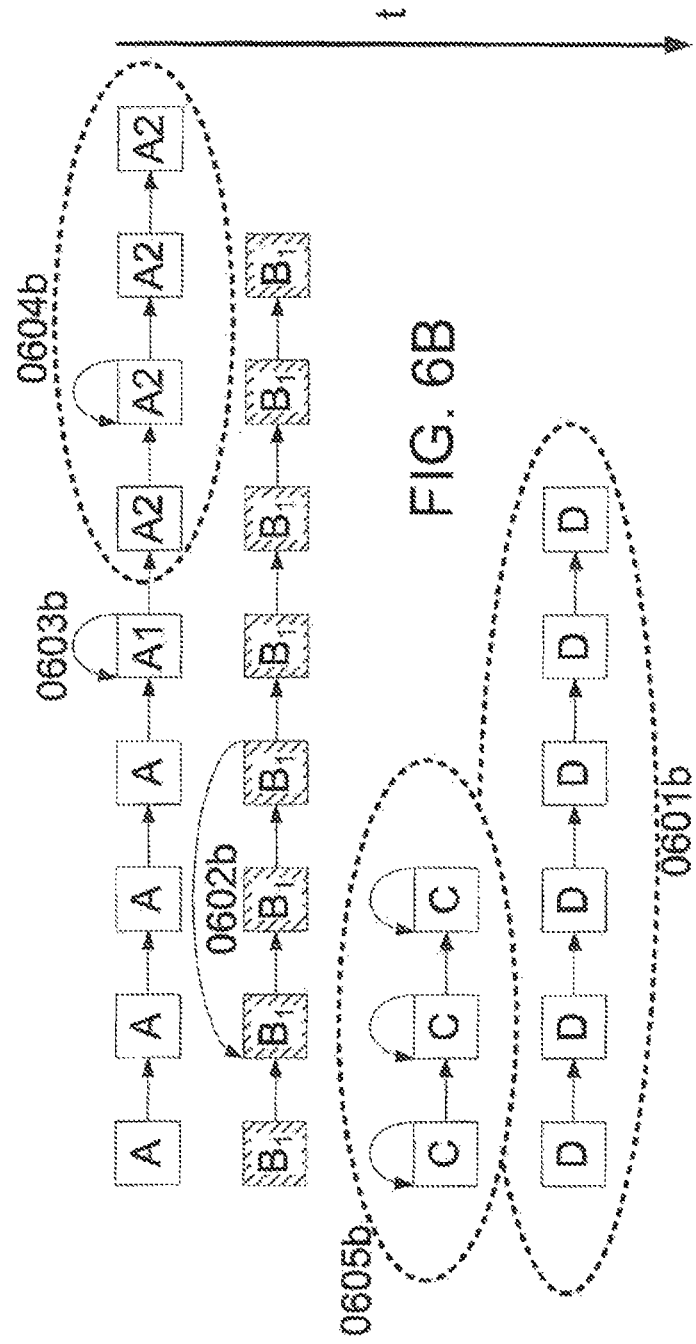
FIG. 6A
FIG. 6B

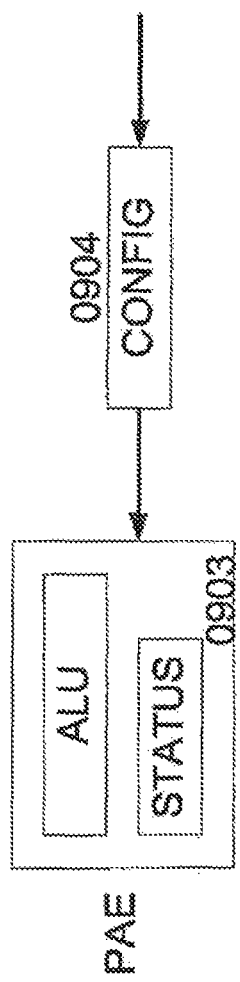
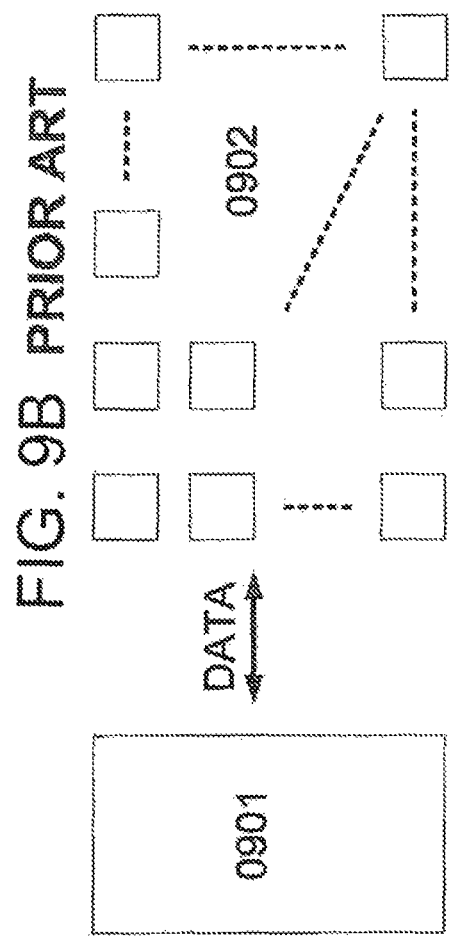
FIG. 9A PRIOR ART
FIG. 9B PRIOR ART

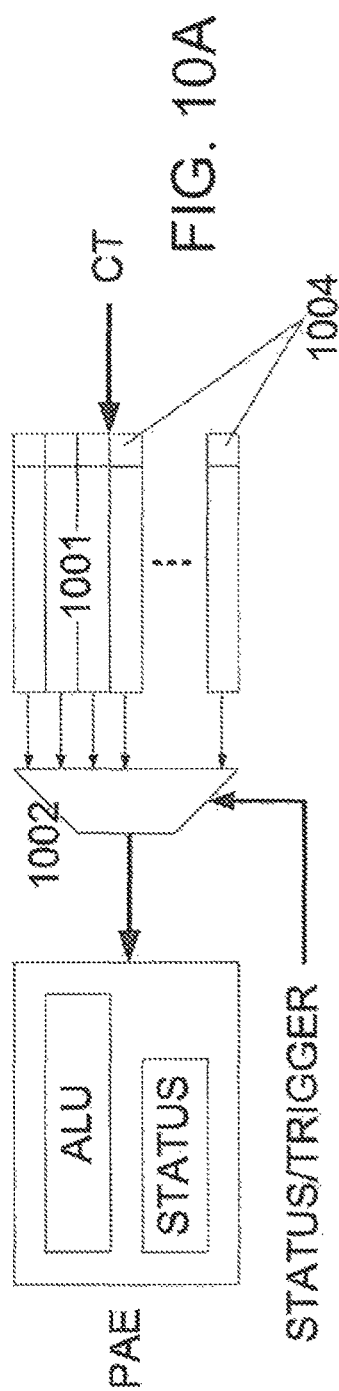
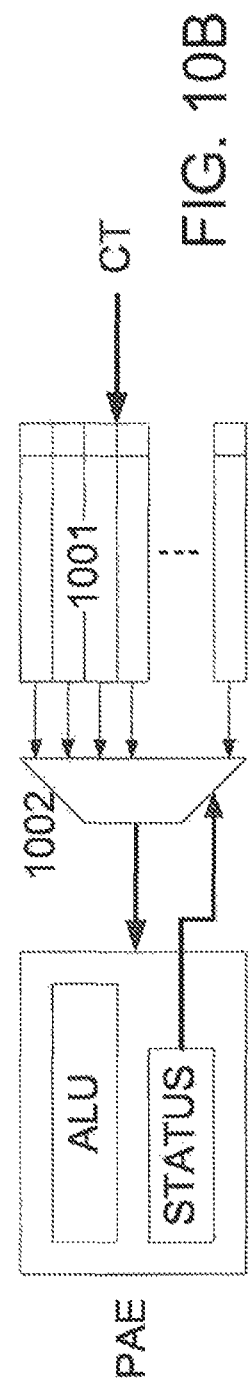
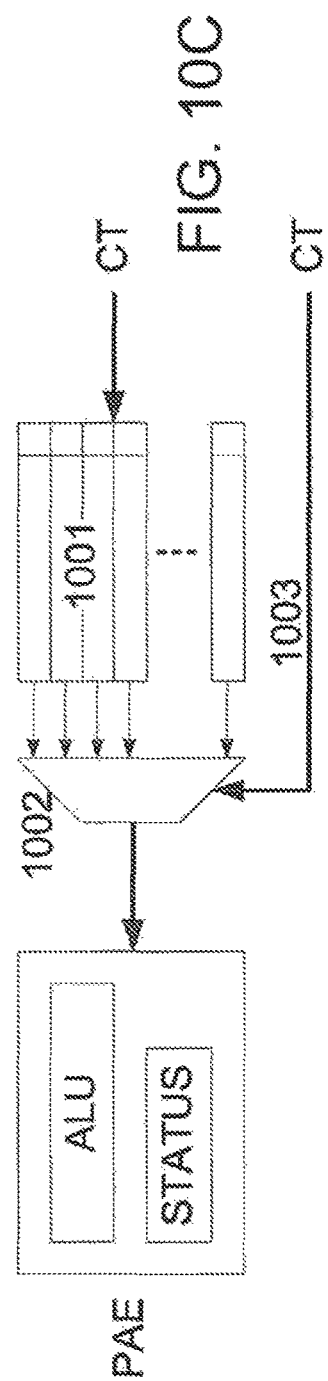
FIG. 10A
FIG. 10B
FIG. 10C

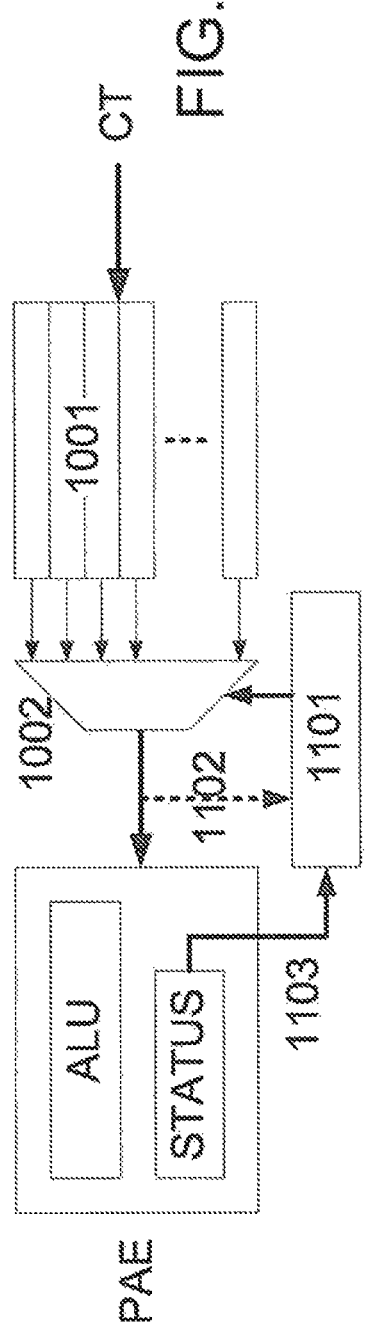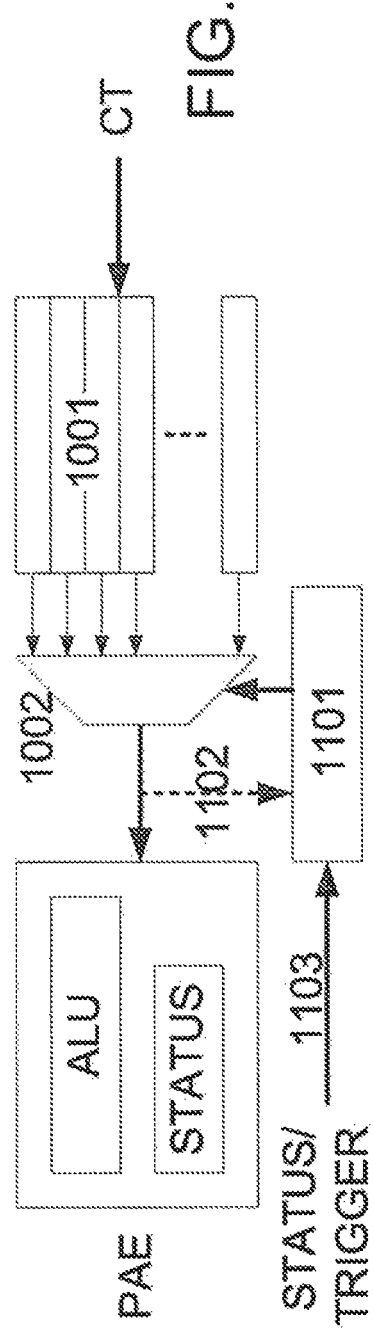

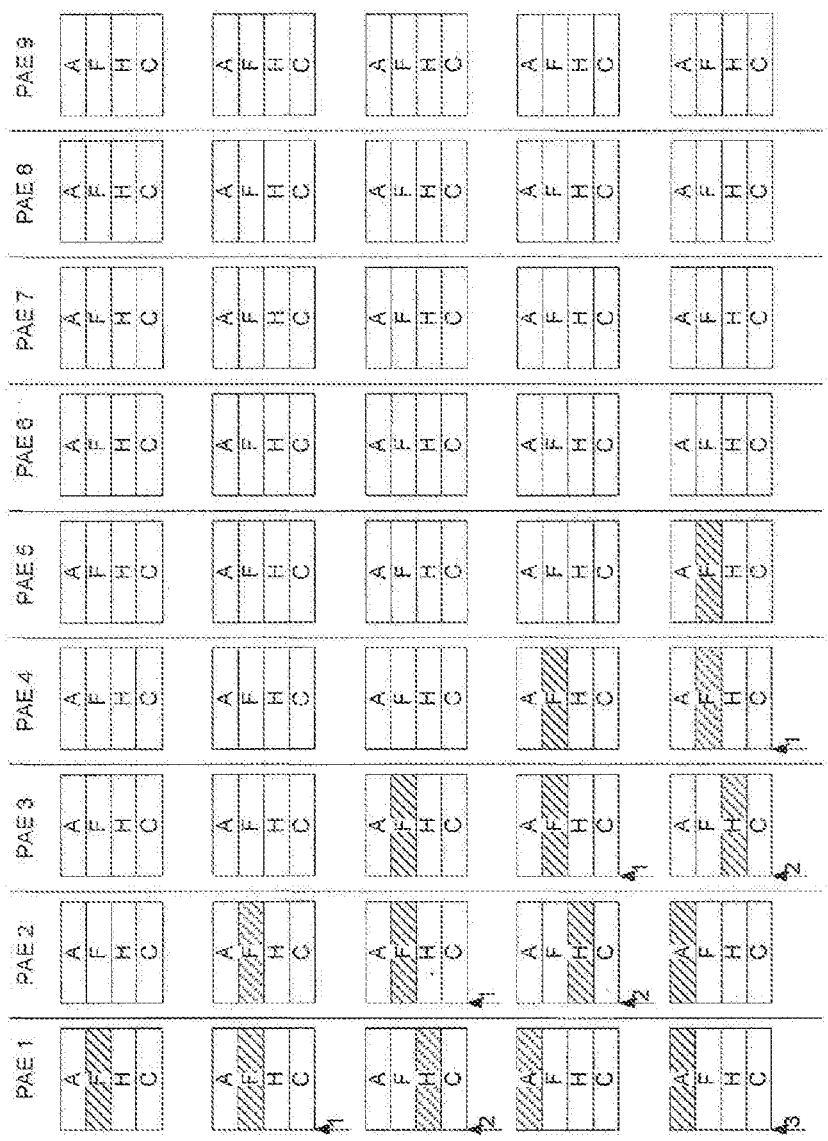

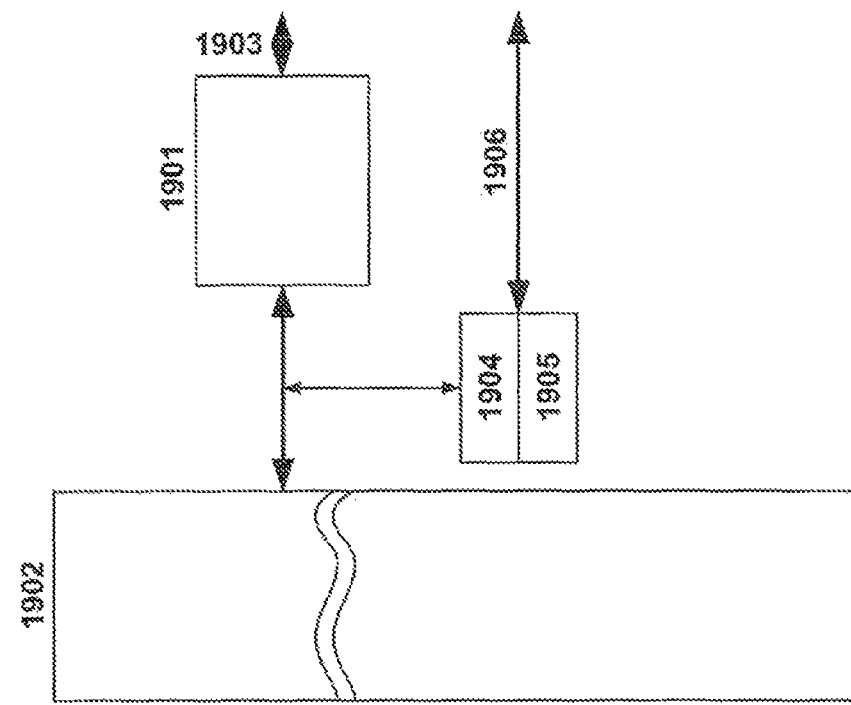
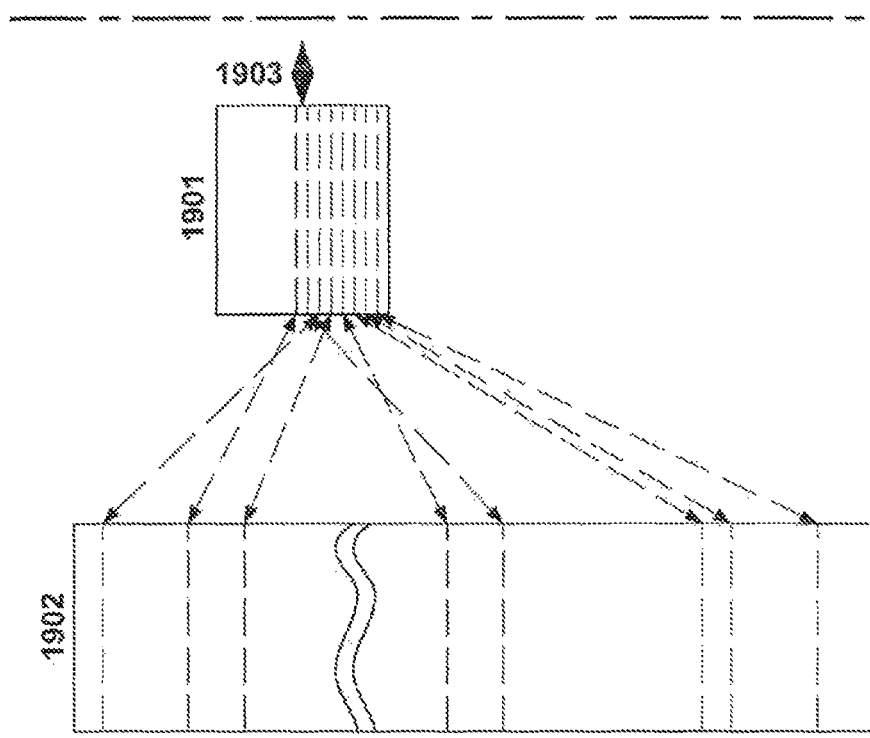

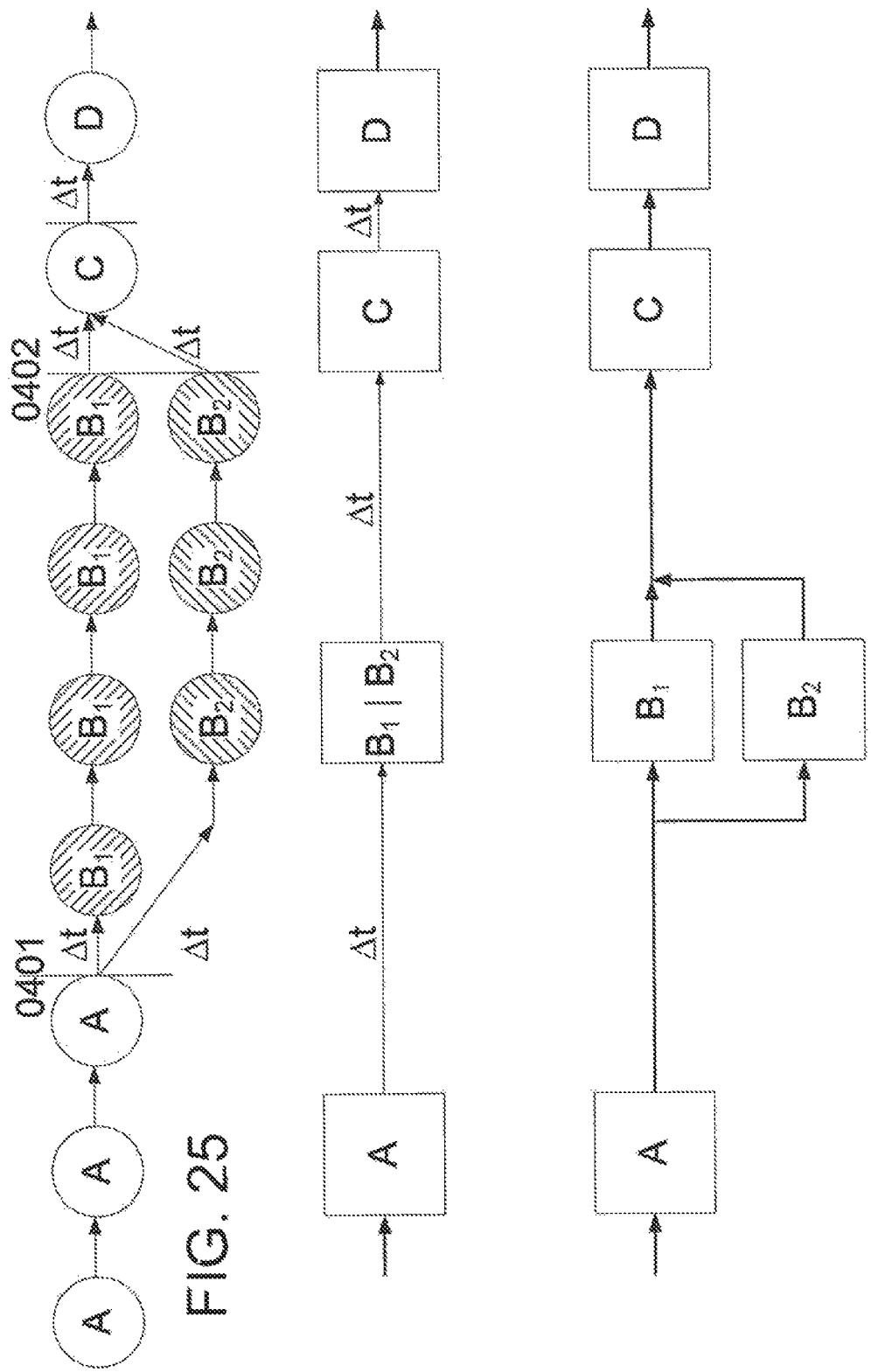

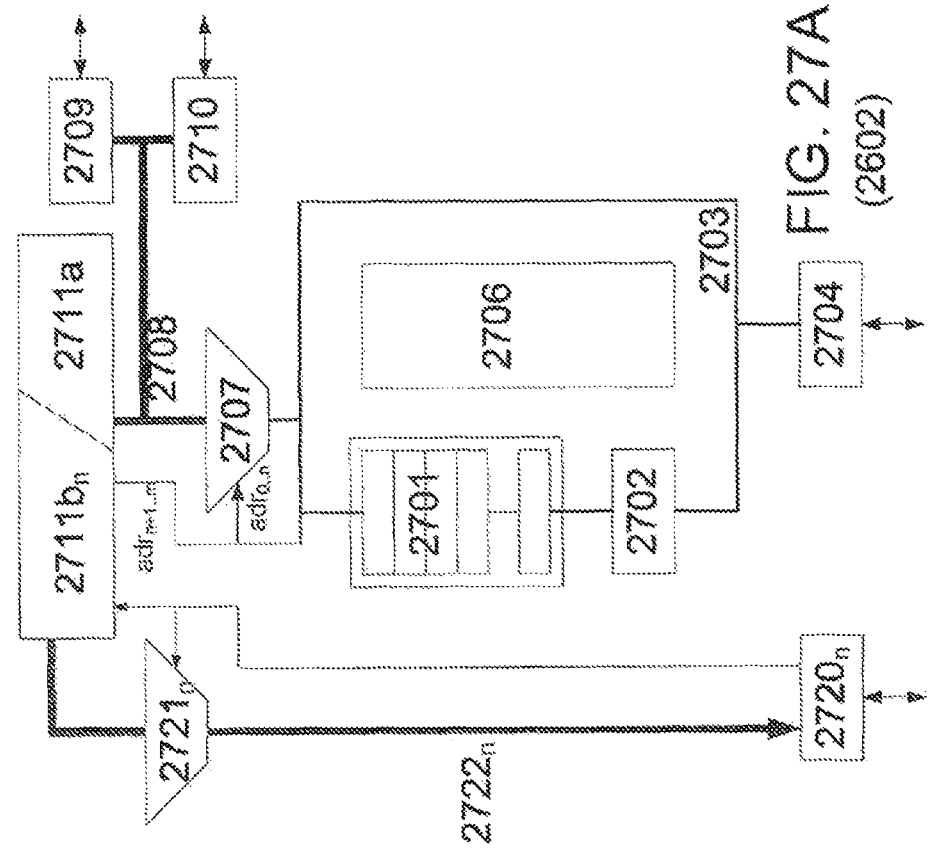
FIG. 27A (2602)
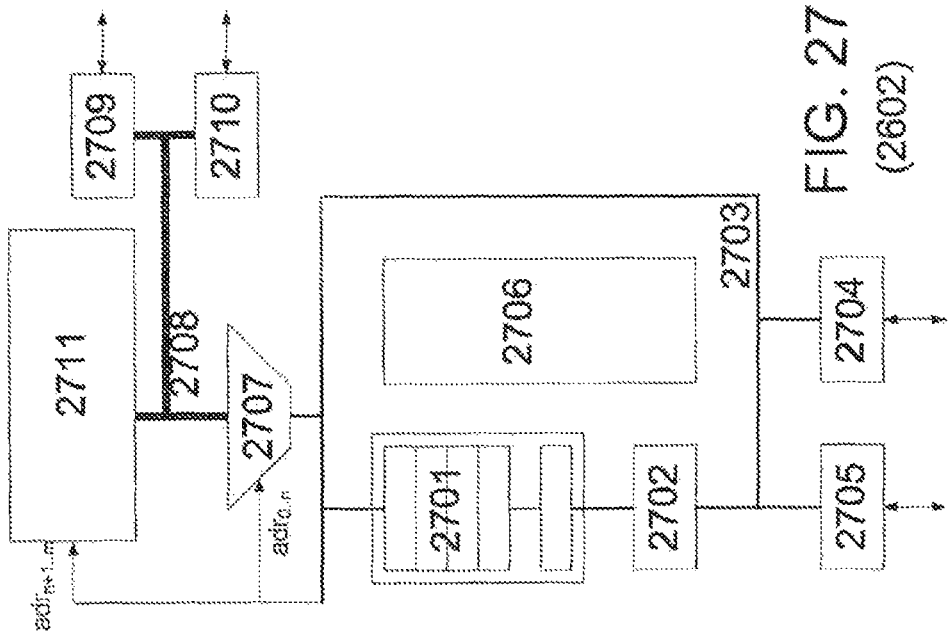
FIG. 27 (2602)

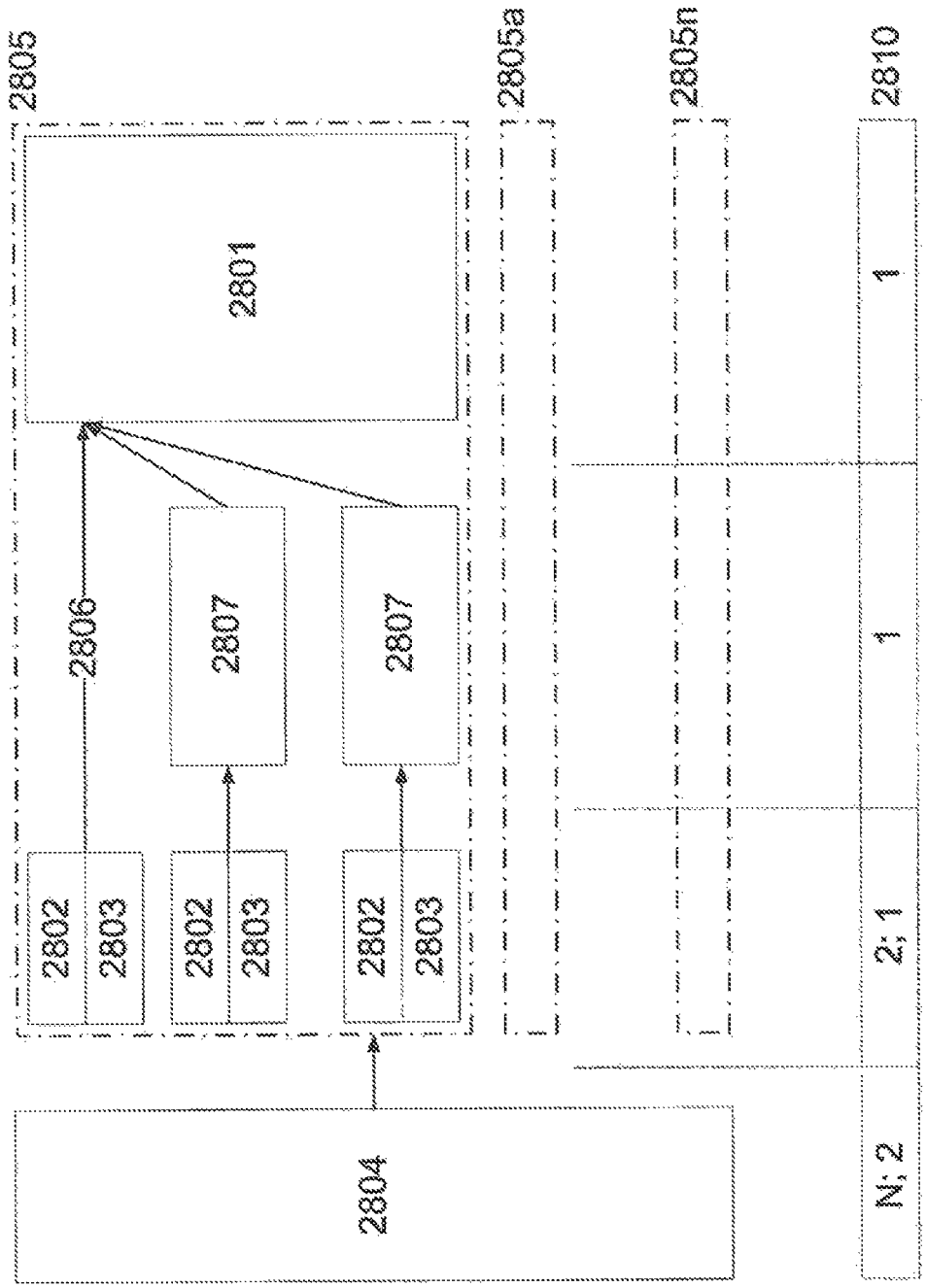

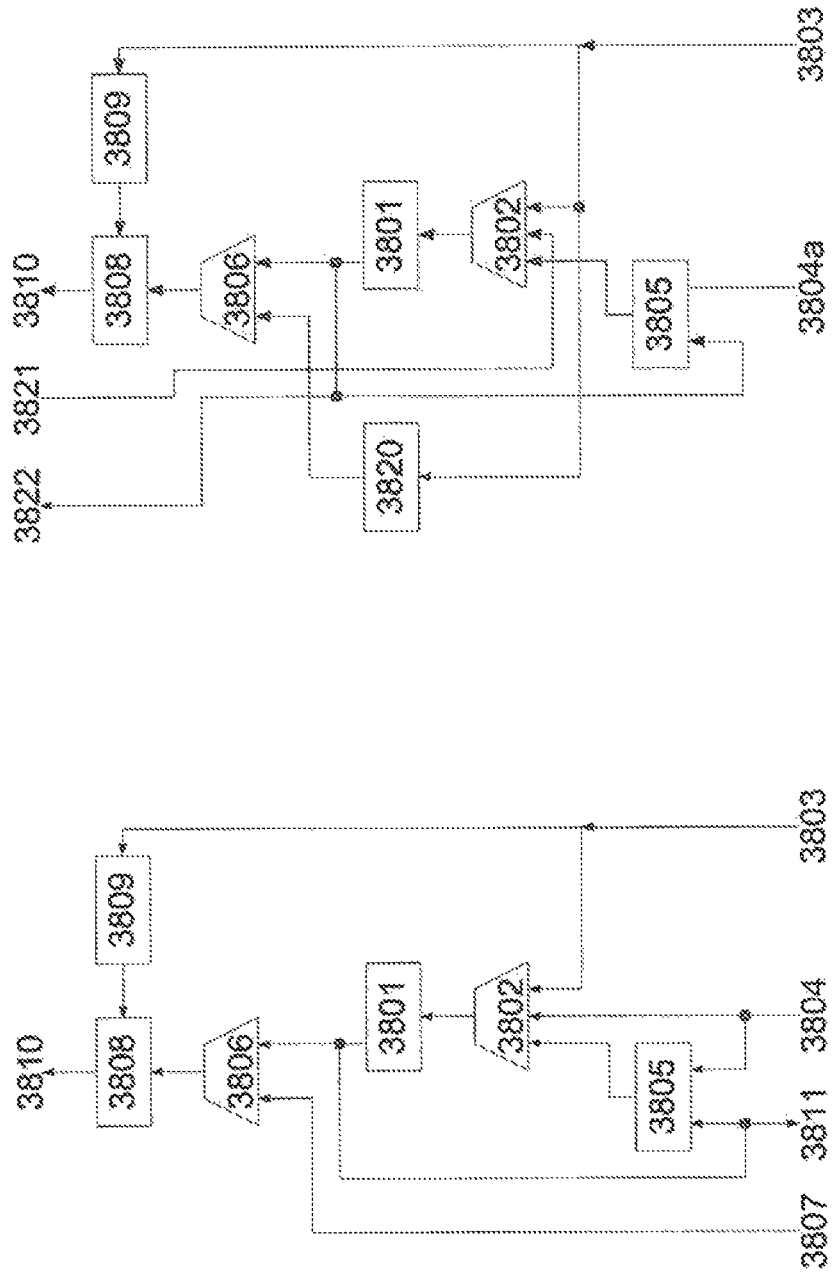

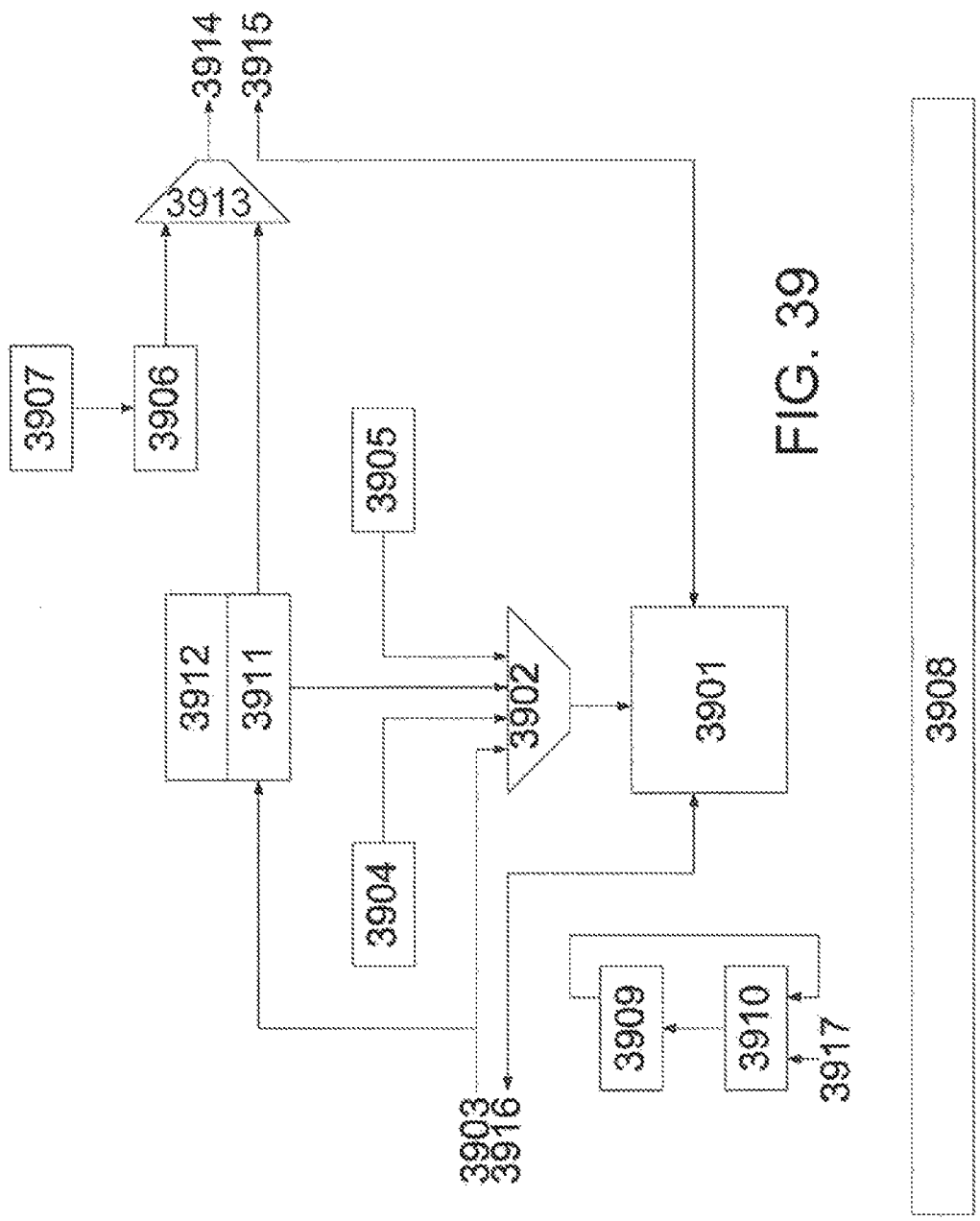

METHOD FOR PROVIDING SUBAPPLICATIONS TO AN ARRAY OF ALUS

CROSS-REFERENCE TO RELATED APPLICATIONS

This application is a continuation of and claims priority to U.S. patent application Ser. No. 14/276,449, filed May 13, 2014, which is now U.S. Pat. No. 9,690,747, which is a continuation of Ser. No. 12/720,898, filed Mar. 10, 2010, now U.S. Pat. No. 8,726,250, which is a continuation of U.S. application Ser. No. 10/009,649, filed on May 29, 2002, now U.S. Pat. No. 8,230,411, which is the national stage of International Application Serial No. PCT/DE00/01869, filed on Jun. 13, 2000, which claims benefit of and priority to German Patent Application Serial No. 199 26 538.0, filed on Jun. 10, 1999, the entire contents of each of which are expressly incorporated in the accompanying application by reference, and which also claims the benefit of and priority to DE 100 00 423.7, filed Jan. 9, 2000 and DE 100 18 119.8 filed Apr. 12, 2000.

AREA OF APPLICATION

The present invention may be applied to programmable arithmetic and/or logic hardware modules (VPUs) which can be reprogrammed during operation. For example, the present invention may be applied to VPUS having a plurality of arithmetic and/or logic units whose interconnection can also be programmed and reprogrammed during operation. Such logical hardware modules are available from several manufacturers under the generic name of FPGA (Field-Programmable Gate Arrays). Furthermore, several patents have been published, which describe special arithmetic hardware modules having automatic data synchronization and improved arithmetic data processing.

All the above-described hardware modules may have a two-dimensional or multidimensional arrangement of logical and/or arithmetic units (Processing Array Elements—PAEs) which can be interconnected via bus systems.

The above described hardware modules may either have the units listed below or these units may be programmed or added (including externally):
1. at least one unit (CT) for loading configuration data;
2. PAEs;
3. at least one interface (IOAG) for one or more memory(ies) and peripheral device(s).

An object of the present invention is to provide a programming method which allows the above-described hardware modules to be efficiently programmed with conventional high-level programming languages, making automatic, full, and efficient use of the parallelism of the above-described hardware modules obtained by the plurality of units to the maximum possible degree.

BACKGROUND INFORMATION

Hardware modules of the type mentioned above may be programmed using popular data flow languages. This can create two basic problems:
1. A programmer must become accustomed to programming in data flow languages; multilevel sequential tasks can generally be described only in a complex manner;
2. Large applications and sequential descriptions can be mapped to the desired target technology (synthesized) with the existing translation programs (synthesis tools) only to a certain extent.

In general, applications are partitioned into multiple subapplications, which are then synthesized to the target technology individually (FIG. 1). Each of the individual binary codes is then loaded onto one hardware module. A method described in German Patent 44 16 881, filed on Feb. 8, 1997, makes it possible to use a plurality of partitioned subapplications within a single hardware module by analyzing the time dependence, sequentially requesting the required subapplications from a higher-level load unit via control signals, whereupon the load unit loads the subapplications onto the hardware module.

Existing synthesis tools are capable of mapping program loops onto hardware modules only to a certain extent (FIG. 2 (0201)). FOR loops (0202) are often supported only as primitive loops by fully rolling out the loop onto the resources of the target module, in FIG. 2.

Contrary to FOR loops, WHILE loops (0203) have no constant abort value. Instead, a WHILE loop is evaluated using a condition, whenever interrupt takes place. Therefore, normally (when the condition is not constant), at the time of the synthesis, it is not known when the loop is aborted. Due to their dynamic behavior, these synthesis tools cannot map these loops onto the hardware, e.g., transfer them to a target module, in a fixed manner.

Using conventional synthesis tools, recursions basically cannot be mapped onto hardware if the recursion depth is not known at the time of the synthesis. Mapping may be possible if the recursion depth is known, e.g., constant. When recursion is used, new resources are allocated with each new recursion level. This would mean that new hardware has to be made available with each recursion level, which, however, is dynamically impossible.

Even simple basic structures can be mapped only by synthesis tools when the target module is sufficiently large to offer sufficient resources.

Simple time dependencies (0301) are not partitioned into multiple subapplications by conventional synthesis tools and can therefore be transferred onto a target module as a whole.

Conditional executions (0302) and loops over conditions (0303) can also only be mapped if sufficient resources exist on the target module.

BRIEF DESCRIPTION OF THE DRAWINGS

FIGS. 4A-4B illustrate the achievement of time independence in the partitioning of a larger example program, according to an example embodiment of the present invention.

FIGS. 5A-5B illustrate the execution of a model graph, according to an example embodiment of the present invention.

FIGS. 6A-6B illustrate the partitioning of a graph containing loops, according to an example embodiment of the present invention.

FIGS. 9A-9B illustrate the inclusion of a set of configuration registers with a PAE, and memory access by a group of PAEs.

FIGS. 10A-10C illustrate three approaches to having the multiplexer select a register, according to example embodiment of the present invention.

FIGS. 11A-11B illustrate approaches to selecting a register with a sequencer, according to an example embodiment of the present invention.

FIGS. 13A-13J show the basic principle of wave reconfiguration (WRC), according to an example embodiment of the present invention.

FIGS. 13G* to 13J* show that when running a wave reconfiguration, not all PAEs need to operate according to the same pattern.

FIG. 17 and FIG. 17A illustrate the operation of an array of PAEs as a register processor, according to an example embodiment of the present invention.

FIGS. 19A-19B illustrate a memory in the "register/cache" mode, according to an example embodiment of the present invention.

FIG. 25 illustrates the scalability of the VPU technology, according to an example embodiment of the present invention.

FIG. 27 and FIG. 27A illustrate the structure of an example configuration unit, according to an example embodiment of the present invention.

FIG. 28 illustrates an example structure of complex programs.

FIG. 38 and FIG. 38A illustrate an example implementation of a DMA function with direct memory access, according to an example embodiment of the present invention.

FIG. 39 illustrates the mode of operation of the memories, according to an example embodiment of the present invention.

DETAILED DESCRIPTION OF AN EXAMPLE EMBODIMENT

Figure 1:
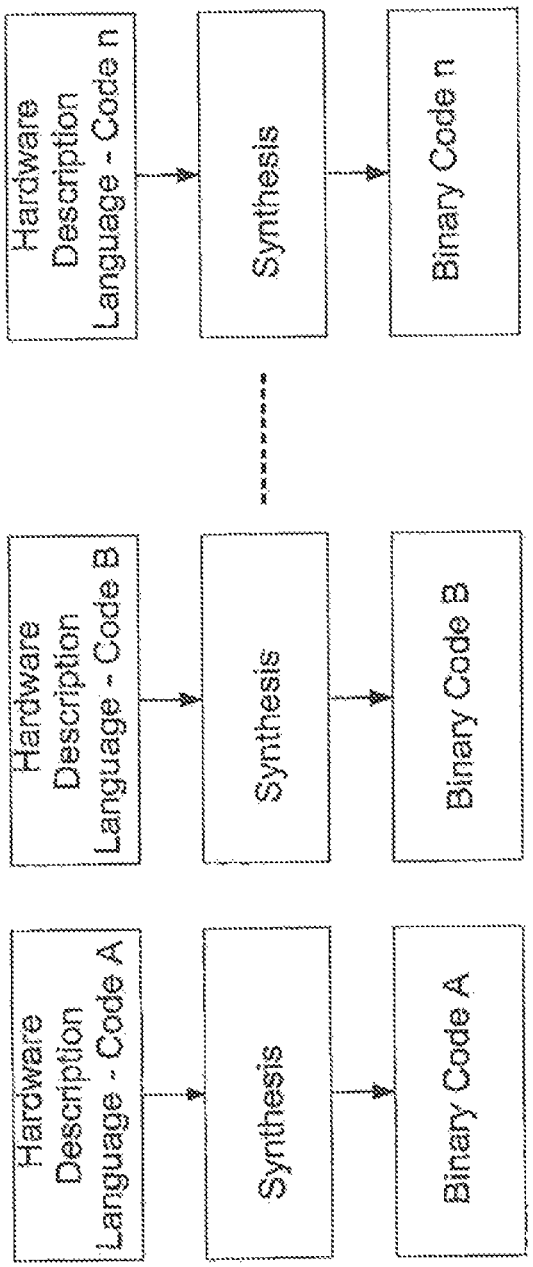
FIG. 1 illustrates the partitioning of applications into multiple subapplications, which are then synthesized to the target technology individually.
Figure 2:
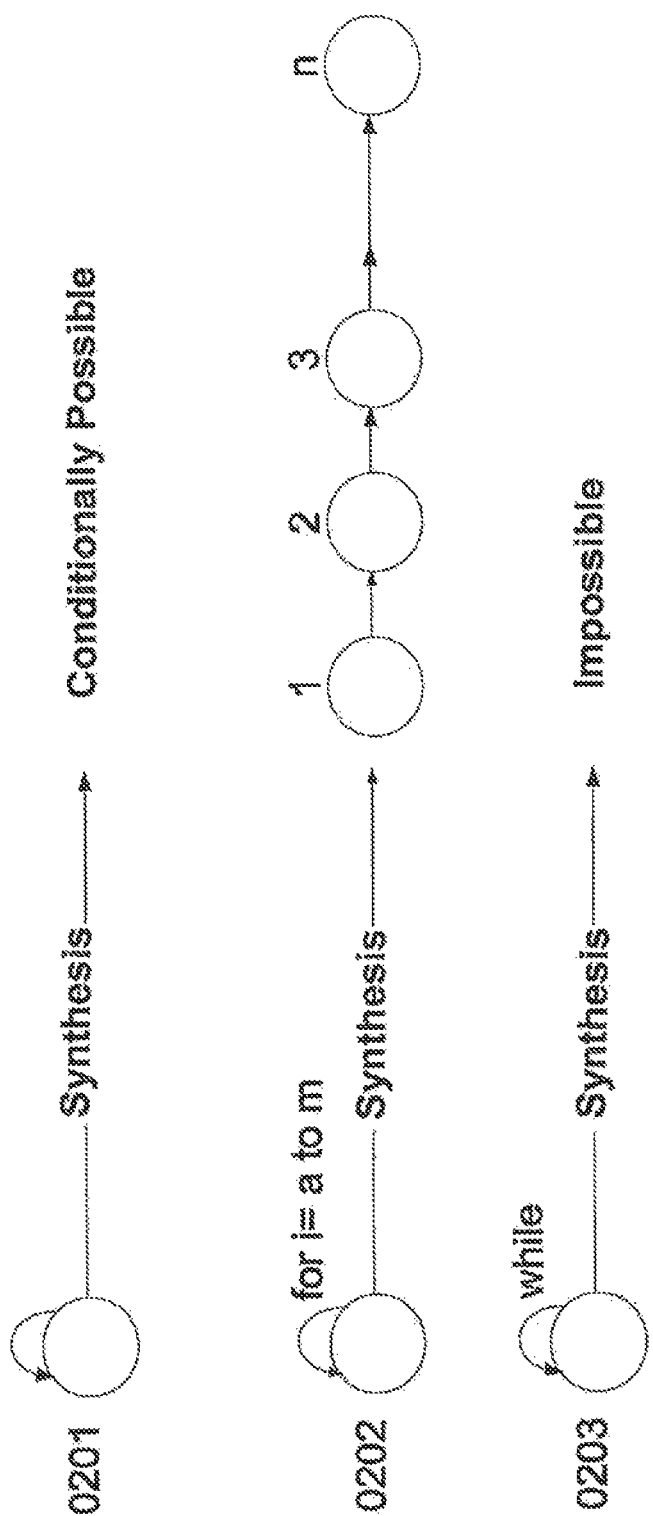
FIG. 2 illustrates mapping program loops onto hardware modules.
Figure 3:
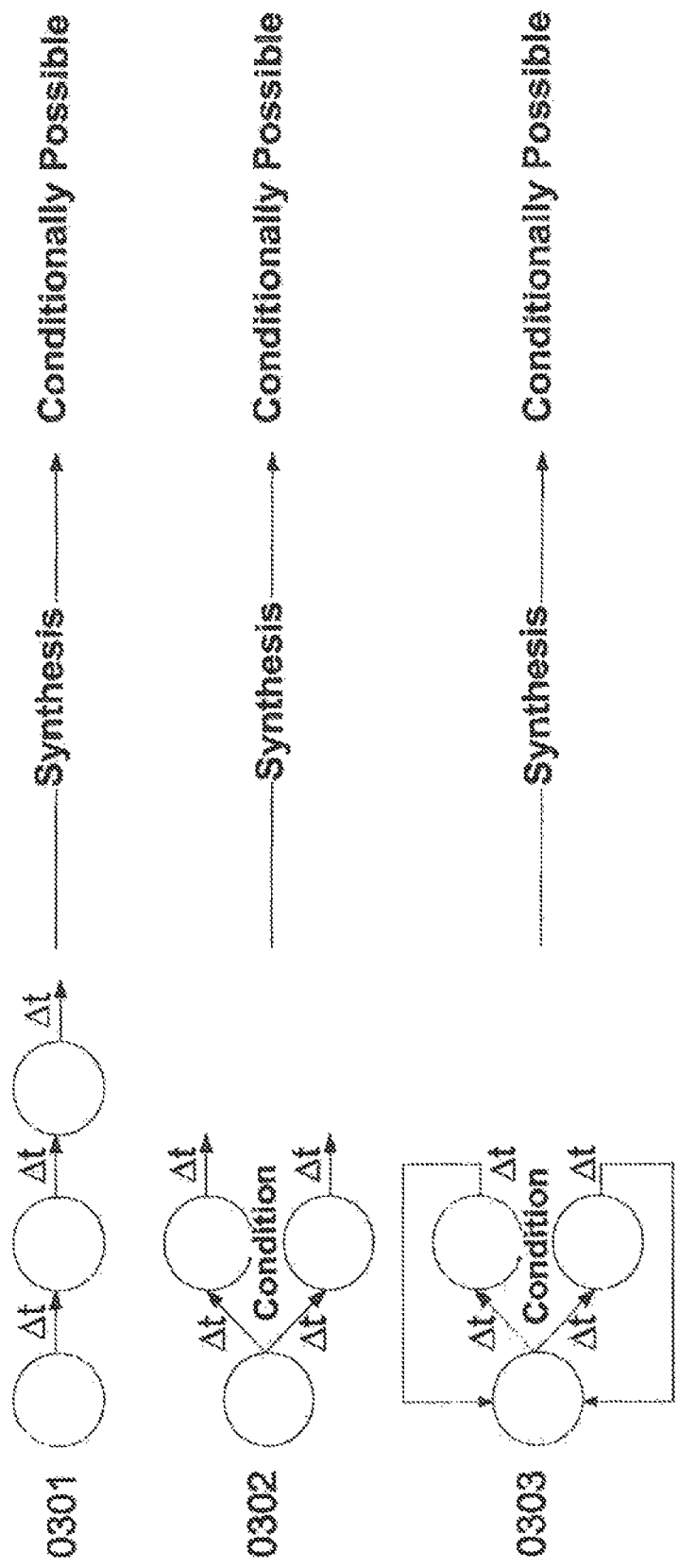
FIG. 3 illustrates the partitioning of simple time dependencies.

The method described in German Patent 44 16 881 allows conditions to be recognized within the hardware structures of the above-mentioned modules at runtime and makes it possible to dynamically respond to such conditions so that the function of the hardware is modified according to the condition received, which is basically accomplished by configuring a new structure.

The method according to the present invention may include the partitioning of graphs (applications) into time-independent subgraphs (subapplications).

The term "time independence" is defined so that the data which are transmitted between two subapplications are separated by a memory of any design (including a simple register). This is possible, in particular, at the points of a graph where there is a clear interface with a limited and minimum amount of signals between the two subgraphs.

Furthermore, points in the graph having the following features may be particularly suitable when, for example:
1. There are few signals or variables between the nodes;
2. A small amount of data is transmitted via the signals or variables;
3. There is no feedback, e.g., no signals or variables are transmitted in the direction opposite to the others.

In the case of large graphs, time independence may be achieved by introducing specific, clearly defined interfaces that are as simple as possible to store data in a buffer (see $S_1$, $S_2$ and $S_3$ in FIG. 4B).

Loops often have a strong time independence with respect to the rest of the algorithm, since they may work over a long period on a limited number of variables that are (mostly)

local in the loop and may require a transfer of operands or of the result only when entering or leaving the loop.

With time independence, after a subapplication has been completely executed, the subsequent subapplication can be loaded without any further dependencies or influences occurring. When the data is stored in the above-named memory, a status signal trigger, as described in German Patent Application No. 197 04 782.9, filed on Feb. 8, 1997, can be generated, which may request the higher-level load unit to load the next subapplication. When simple registers are used as memories, the trigger may be generated when data is written into the register. When memories are used, in particular memories operating by the FIFO principle, triggers may be generated depending on multiple conditions. For example, the following conditions, individually or in combination, can generate a trigger:

Result memory full
Operand memory empty
No new operands
Any condition within the subapplication, generated, e.g., by
  comparators (equal, greater, etc.)
  counters (overrun)
  adders (overrun)

In the following, a subapplication may also be referred to as a software module in order to improve understandability from the point of view of conventional programming. For the same reason, signals may also be called variables. These variables may differ from conventional variables in one important aspect: a status signal (Ready) which shows whether a given variable has a legal value may be assigned to each variable. If a signal has a legal (calculated) value, the status signal may be Ready; if the signal has no legal value (calculation not yet completed), the status signal may be Not_Ready. This principle is described in detail in German Patent Application No. 196 51 075.9.

In summary, the following functions may be assigned to the triggers:
1. Control of data processing as the status of individual processing array elements (PAEs);
2. Control of reconfiguration of PAEs (time sequence of the subapplications).

In particular, the abort criteria of loops (WHILE) and recursions, as well as conditional jumps in subapplications, may be implemented by triggers.

In case 1, the triggers are exchanged between PAEs; in case 2, the triggers are transmitted by the PAEs to the CT. The transition between case 1 and case 2 may depend on the number of subapplications running at the time in the matrix of PAEs. In other words, triggers may be to the subapplications currently being executed on the PAEs. If a subapplication is not configured, the triggers are sent to the CT. If this subapplication were also configured, the respective triggers would be sent directly to the respective PAEs.

This results in automatic scaling of the computing performance with increasing PAE size, e.g., with cascading of a plurality of PAE matrices. No more reconfiguration time is needed, but the triggers are sent directly to the PAEs which are now already configured.

Example Wave Reconfiguration

A plurality of software modules may be overlapped using appropriate hardware architecture (see FIGS. 10A-10C/FIGS. 11A-11B). A plurality of software modules may be preconfigured in the PAEs at the same time. Switching between configurations may be performed with minimum expenditure in time, so only one configuration is activated at one time for each PAE.

In a collection of PAEs into which a software module A and a module B are preconfigured, one part of this collection can be activated using a part of A and another part of this collection can be activated at the same time using a part of B. The separation of the two parts is given exactly by the PAE in which the switch-over state between A and B occurs. This means that, from a certain point in time B is activated in all PAEs for which A was activated for execution prior to this time, and in all other PAEs A is still activated after this time. With increasing time, B is activated in more and more PAEs.

Switch-over may take place on the basis of specific data, states which result from the computation of the data, or on the basis of any other events which are generated externally, e.g., by the CT.

As a result, after a data packet has been processed, switch-over to another configuration may take place. At the same time/alternatively, a signal (RECONFIG-TRIGGER) can be sent to the CT, which causes new configurations to be pre-loaded by the CT. Pre-loading can take place onto other PAEs, which are dependent on or independent of the current data processing. By isolating the active configuration from the configurations which are now available for reconfiguration (see FIGS. 10A-10C/FIGS. 11A-11B), new configurations can be loaded even into PAEs that are currently operating (active), in particular also the PAE which generated the RECONFIG-TRIGGER. This allows a configuration to overlap with the data processing.

FIGS. 13A-13J show the basic principle of wave reconfiguration (WRC). It is based on a row of PAEs (PAE1-PAE9), through which the data runs as through a pipeline. It will be appreciated that WRC is not limited to pipelines and the interconnection and grouping of PAEs may assume any desired form. The illustration was selected in order to show a simple example for easier understanding.

In FIG. 13A, a data packet runs in PAE1. The PAE has four possible configurations (A, F, H, C), which may be selected using appropriate hardware (see FIGS. 10A-10C/FIGS. 11A-11B). Configuration F is activated in PAE1 for the current data packet (shaded area).

In the next cycle, the data packet runs to PAE2 and a new data packet appears in PAE1. F is also active in PAE2. Together with the data packet, an event (↑1) appears in PAE1. The event may occur whenever the PAE receives any external event (e.g., a status flag or a trigger) or it is generated within the PAE by the computation performed.

In FIG. 13C, configuration H is activated in PAE1 because of the event (↑1); at the same time, a new event (↑2) appears, which causes configuration A to be activated in the following cycle (FIG. 13D).

Figures 13F, 13G, 13H, 13I, 13J:
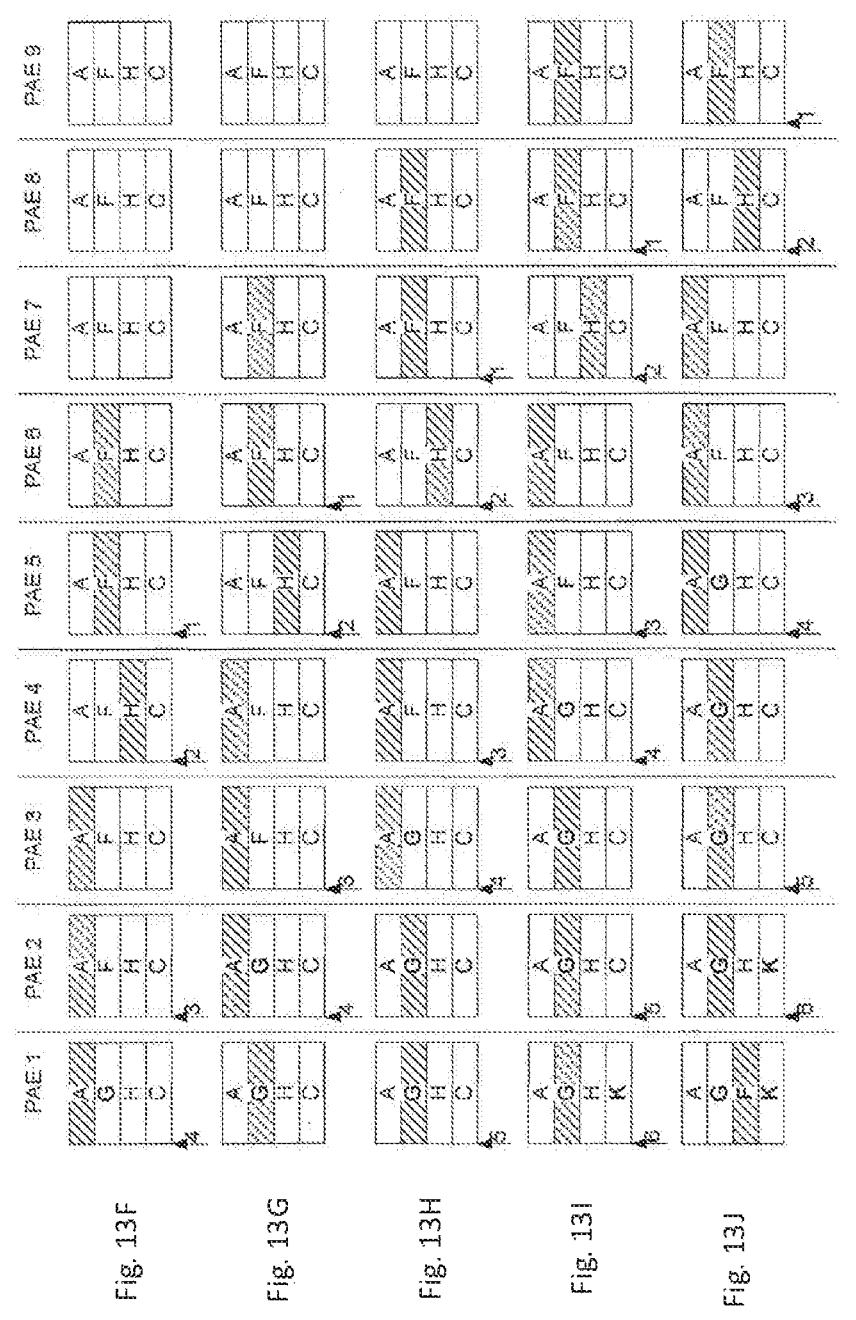
Figures 13G, 13H, 13I, 13J:
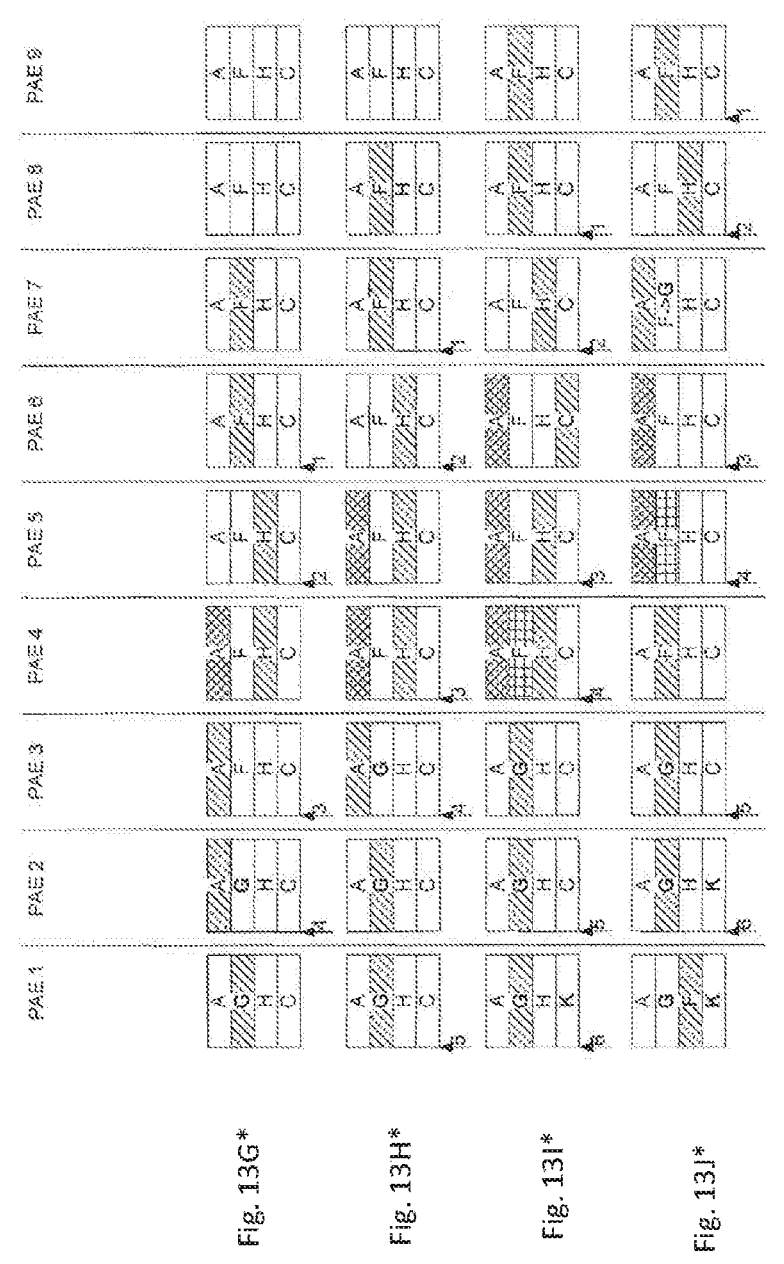

In FIG. 13E, (↑3) is received at PAE1, which causes F to be overwritten by G (FIG. 13F). G is activated with the receipt of (↑4) (FIG. 13G). (↑5) causes K to be loaded instead of C (FIGS. 13 H, I), and (↑6) loads and starts F instead of H (FIG. 13J).

FIGS. 13G* to 13J* show that when running a wave reconfiguration, not all PAEs need to operate according to the same pattern. The way a PAE is configured by a wave configuration depends mainly on its own configuration. It should be mentioned here that PAE4 to PAE6 are configured so that they respond to events differently from the other PAEs. For example, in FIG. 13G*, H is activated instead of A in response to event ↑2 (see FIG. 13G). The same holds true for 13H*. Instead of loading G in response to event ↑3 in FIG. 13I*, configuration F remains preserved and A is activated. In FIG. 13J*, it is shown for PAE7 that event ↑3 will again cause G to be loaded. In PAE4, event ↑4 causes F to be activated instead of configuration G (see FIG. 13J).

In FIGS. 13A-13J, a wave of reconfigurations moves in response to events through a number of PAEs, which may have a two- or multidimensional design.

It is not absolutely necessary that a reconfiguration having taken place once take place throughout the entire flow. For example, reconfiguration with activation of A in response to event (↑2) could take place only locally in PAEs 1 to 3 and PAE7, while configuration H continues to remain activated in all the other PAEs.

In other words:
a) It is possible that an event only occurs locally and therefore has only local reactivation as a result;
b) a global event may not have any effect on some PAEs, depending on the algorithm being executed.

In PAEs which continue to keep H activated even after (↑2), the receipt of event (↑3) may, of course, have a completely different effect, (I) such as activation of C instead of loading of G; (ii) also, (↑3) might not have any effect at all on these PAEs.

Example Processor Model

The example graphs shown in the following figures always have one software module as a graph node. It will be appreciated that a plurality of software modules may be mapped onto one target hardware module. This means that, although all software modules are time independent of one another, reconfiguration is performed and/or a data storage device is inserted only in those software modules which are marked with a vertical line and Δt. This point is referred to as reconfiguration time.

The reconfiguration time depends on certain data or the states resulting from the processing of certain data.

It will be appreciated that:
1. Large software modules can be partitioned at suitable points and broken down into small software modules which are time independent of one another, and fit into the PAE array in an optimum manner.
2. In the case of small software modules, which can be mapped together onto a target module, time independence is not needed. This saves configuration steps and speeds up data processing.
3. The reconfiguration times may be positioned according to the resources of the target modules. This makes it possible to scale the graph length in any desired manner.
4. Software modules may be configured with superimposition.
5. The reconfiguration of software modules may be controlled through the data itself or through the result of data processing.
6. The data generated by the software modules may be stored and the chronologically subsequent software modules read the data from this memory and in turn store the results in a memory or output the end result to the peripheral devices.

Example Use of Status Information in the Processor Model

Figure 8B:
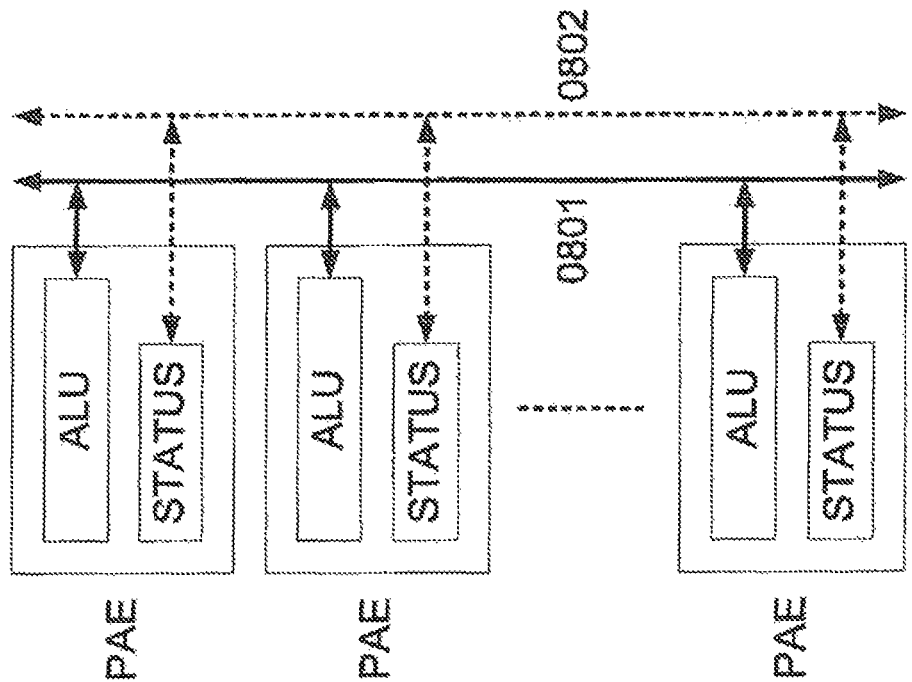
FIGS. 8A-8B illustrate determining the states within a graph by making the status registers of the individual cells (PAEs) available to other arithmetic units via a freely routable and segmentable status bus system.
Figure 8A:
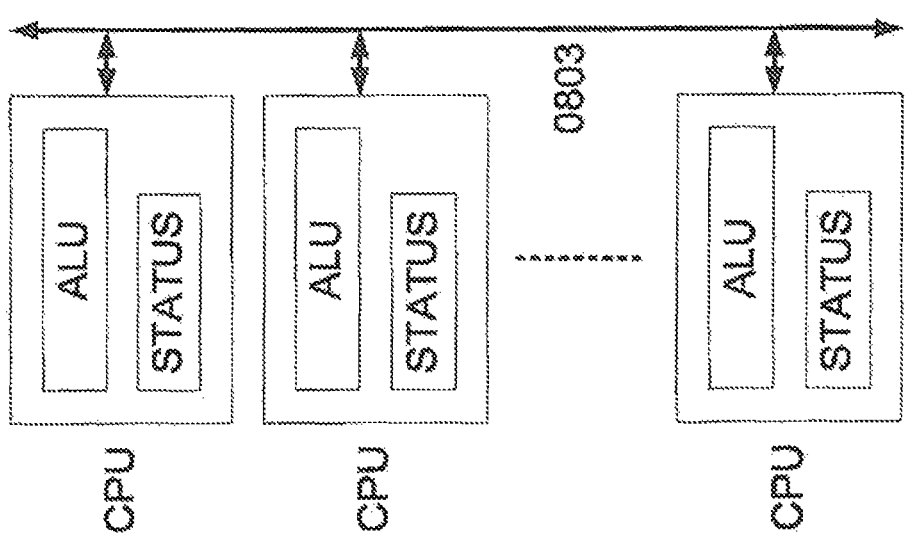

In order to determine the states within a graph, the status registers of the individual cells (PAEs) may be made available to all the other arithmetic units via a freely routable and segmentable status bus system (0802) which exists in addition to the data bus (0801) (FIG. 8B). This means that a cell (PAE X) may evaluate the status information of another cell (PAE Y) and process the data accordingly. In order to show the difference with respect to existing parallel computing systems, FIG. 8A shows a conventional multiprocessor system whose processors are connected to one another via a common data bus (0803). No explicit bus system exists for synchronized exchange of data and status.

The network of the status signals (0802) may represent a freely and specifically distributed status register of a single conventional processor (or of multiple processors of an SMP computer). The status of each individual ALU (e.g., each individual processor) and, in particular, each individual piece of status information may be available to the ALU or ALUs (processors) that need the information. There is no additional program runtime or communication runtime (except for the signal runtimes) for exchange of information between the ALUs (processors).

In conclusion, it should be noted that, depending on the task, both the data flow chart and the control flow chart may be treated according to the above-described method.

Example Virtual Machine Model

According to the previous sections, the principles of data processing using VPU hardware modules are mainly data flow oriented. However, in order to execute sequential programs with a reasonable performance, a sequential data processing model must be available for which the sequencers in the individual PAEs are often insufficient.

However, the architecture of VPUs basically allows sequencers of any desired complexity to be formed from individual PAEs. This means:
1. Complex sequencers which exactly correspond to the requirements of the algorithm may be configured;
2. Through appropriate configuration, the data flow may exactly represent the computing steps of the algorithm.

Thus, a virtual machine corresponding in particular to the sequential requirements of an algorithm may be implemented on VPUs.

An advantage of the VPU architecture is that an algorithm can be broken down by a compiler so that the data flow portions are extracted. The algorithm may be represented by an "optimum" data flow, in that an adjusted data flow is configured AND the sequential portions of the algorithm are represented by an "optimum" sequencer, by configuring an adjusted sequencer. A plurality of sequencers and data flows may be accommodated on one VPU at the same time.

As a result of the large number of PAEs, there may be a large number of local states within a VPU during operation. When changing tasks or calling a subprogram (interrupts), these states may need to be saved (see PUSH/POP for standard processors). This, however, may be difficult in practice due to the large number of states.

In order to reduce the states to a manageable number, a distinction must be made between two types of state:
1. Status information of the machine model (MACHINE-STATE). This status information is only valid within the execution of a specific software module and is also only used locally in the sequencers and data flow units of this specific software module. This means that these MACHINE STATEs represent the states occurring in the background within the hardware in conventional processors, are implicit in the commands and processing steps, and have no further information for subsequent commands after the execution of a command. Such states need not be saved. The condition for this is that interrupts should only be executed after the complete execution of all the currently active software modules. If interrupts for execution arise, no new software modules are loaded, but only those still active are executed; moreover, if allowed by the algorithm, no new operands are sent to the active software modules. Thus a software module becomes an indivisible, uninterruptible unit, comparable to an instruction of a conventional processor.

2. States of data processing (DATA-STATE). The data-related states must be saved and written into the memory when an interrupt occurs according to the conventional processor model. These are specific required registers and flags or, according to the terminology of VPU technology, triggers.

In the case of DATA-STATEs, handling can be further simplified depending on the algorithm. Two basic strategies are explained in detail below:

1. Concomitant Run of the Status Information

All the relevant status information that is needed at a later time may be transferred from one software module to the next as normally implemented in pipelines. The status information is then implicitly stored, together with the data, in a memory, so that the states are also available when the data is called. Therefore, no explicit handling of the status information takes place, in particular using PUSH and POP, which considerably speeds up processing depending on the algorithm, as well as results in simplified programming. The status information can be either stored with the respective data packet or, only in the event of an interrupt, saved and specifically marked.

2. Saving the Reentry Address

When large amounts of data stored in a memory are processed, it may be advantageous to pass the address of at least one of the operands of the data packet just processed together with the data packet through the PAEs. In this case the address is not modified, but is available when the data packet is written into a RAM as a pointer to the operand processed last.

This pointer can be either stored with the respective data packet or, only in the event of an interrupt, can be saved and specifically marked. In particular, if all pointers to the operands are computed using one address (or a group of addresses), it may be advantageous to save only one address (or a group of addressees).

Example "ULIW"-"UCISC" Model

The concept of VPU architecture may be extended. The virtual machine model may be used as a basis. The array of PAEs (PA) may be considered as an arithmetic unit with a configurable architecture. The CT(s) may represent a load unit (LOAD-UNIT) for opcodes. The IOAG(s) may take over the bus interface and/or the register set.

This arrangement allows two basic modes of operation which can be used mixed during operation:

1. A group of one or more PAEs may be configured to execute a complex command or command sequence and then the data associated with this command (which may be a single data word) is processed. Then this group is reconfigured to process the next command. The size and arrangement of the group may change. According to partitioning technologies described previously, it is the compiler's responsibility to create optimum groups to the greatest possible extent. Groups are "loaded" as commands onto the module by the CT; therefore, the method is comparable to the known VLIW, except that considerably more arithmetic units are managed AND the interconnection structure between the arithmetic units can also be covered by the instruction word (Ultra Large Instruction Word="ULIW"). This allows a very high Instruction Level Parallelism (ILP) to be achieved. (See also FIGS. 27 and 27A.) One instruction word corresponds here to one software module. A plurality of software modules can be processed simultaneously, as long as the dependence of the data allows this and sufficient resources are available on the module. As in the case of VLIW commands, usually the next instruction word is immediately loaded after the instruction word has been executed. In order to optimize the procedure in terms of time, the next instruction word can be pre-loaded even during execution (see FIGS. 10A-10C). In the event of a plurality of possible next instruction words, more than one can be pre-loaded and the correct instruction word is selected prior to execution, e.g., by a trigger signal. (See FIG. 4A B1/B2, FIG. 15 ID C/ID K, FIG. 36 A/B/C.)

2. A group of PAEs (which can also be one PAE) may be configured to execute a frequently used command sequence. The data, which can also in this case be a single data word, is sent to the group as needed and received by the group. This group remains without being reconfigured for a one or more. This arrangement is comparable with a special arithmetic unit in a processor according to the related art (e.g., MMX), which is provided for special tasks and is only used as needed. With this method, special commands can be generated according to the CISC principle with the advantage that these commands can be configured to be application-specific (Ultra–CISC=UCISC).

Extension of the RDY/ACK Protocol

German Patent Application No. 196 51 075.9, filed on Dec. 9, 1996, describes a RDY/ACK standard protocol for synchronization procedures of German Patent 44 16 881 with respect to a typical data flow application. The disadvantage of the protocol is that only data can be transmitted and receipt acknowledged. Although the reverse case, with data being requested and transmission acknowledged (hereinafter referred to as REQ/ACK), can be implemented electrically with the same two-wire protocol, it is not detected semantically.

This is particularly true when REQ/ACK and RDY/ACK are used in mixed operation.

Therefore, a clear distinction is made between the protocols: RDY: data is available at the transmitter for the receiver; REQ: data is requested by the receiver from the transmitter; ACK: general acknowledgment for receipt or transmission completed It will be appreciated that a distinction could also be made between ACK for a RDY and an ACK for a REQ, but the semantics of the ACK is usually implicit in the protocols.

Example Memory Model

Memories (one or more) may be integrated in VPUs and addressed as in the case of a PAE. In the following, a memory model shall be described which represents at the same time an interface to external peripherals and/or external memories:

A memory within a VPU with PAE-like bus functions may represent various memory modes:

1. Standard memory (random access)
2. Cache (as an extension of the standard memory)
3. Lookup table
4. FIFO
5. LIFO (stack).

A controllable interface, which writes into or reads from memory areas either one word or one block at a time, may be associated with the memory.

The following usage options may result:

1. Isolation of data streams (FIFO)
2. Faster access to selected memory areas of an external memory, which represents a cache-like function (standard memory, lookup table)
3. Variable-depth stack (LIFO).

The interface can be used, but it is not absolutely necessary if, for example, the data is used only locally in the VPU and the free memory in an internal memory is sufficient.

Example Stack Model

A simple stack processor may be designed by using the REQ/ACK protocol and the internal memory in the LIFO mode.

In this mode, temporary data is written by the PAEs to the stack and loaded from the stack as needed. The necessary compiler technologies are sufficiently known. The stack may be as large as needed due to the variable stack depth, which is achieved through a data exchange of the internal memory with an external memory.

Example Accumulator Model

Each PAE can represent an arithmetic unit according to the accumulator principle. As described in German Patent Application No. 196 51 075.9, the output register may be looped back to the input of the PAE. This yields structure which may operate like a related art accumulator. Simple accumulator processors can be designed in connection with the sequencer according to FIGS. 11A-11B.

Example Register Model

A simple register processor can be designed by using the REQ/ACK protocol and the internal memory in the standard memory mode. The register addresses are generated by one group of PAEs, while another group of PAEs is responsible for processing the data.

Example Memory Architecture

The example memory has two interfaces: a first interface which connects the memory to the array, and a second one which connects the memory with an IO unit. In order to improve the access time, the memory may be designed as a dual-ported RAM, which allows read and write accesses to take place independently of one another.

The first interface may be a conventional PAE interface (PAEI), which may guarantee access to the bus system of the array and may ensure synchronization and trigger processing. Triggers can be used to display different states of the memory or to force actions in the memory, for example, 1. Empty/full: when used as a FIFO, the FIFO status "full," "almost full," "empty," or "almost empty" is displayed;
2. Stack overrun/underrun: when used as a stack, stack overrun and underrun may be signaled;
3. Cache hit/miss: in the cache mode, whether an address has been found in the cache may be displayed;
4. Cache flush: writing the cache into the external RAM is forced by a trigger.

A configurable state machine, which may control the different operating modes, may be associated with the PAE interface. A counter may be associated with the state machine. The counter may generate the addresses in FIFO and LIFO modes. The addresses are supplied to the memory via a multiplexer, so that additional addresses generated in the array may be supplied to the memory.

The second interface may be used to connect an IO unit (IOI). The IO unit may be designed as a configurable controller having an external interface. The controller may read or write data one word or one block at a time from and into the memory. The data is exchanged with the IO unit. The controller also supports different cache functions using an additional TAG memory.

IOI and PAEI may be synchronized with one another, so that no collision of the two interfaces can occur. Synchronization is different depending on the mode of operation; for example, while in standard memory or stack mode operation either the IOI or the PAEI may access the entire memory at any time, synchronization is row by row in the FIFO mode, e.g., while IOI accesses a row x, the PAEI can access any other row other than x at the same time.

The IO unit may be configured according to the peripheral requirements, for example:
1. SDRAM controller
2. RDRAM controller
3. DSP bus controller
4. PCI controller
5. serial controller (e.g., NGIO)
6. special purpose controller (SCSI, Ethernet, USB, etc.).

A VPU may have any desired memory elements having any desired IO units. Different IO units may be implemented in a single VPU.

Example Memory Modes of Operation:
1. Standard Memory
1.1 Internal/Local

Data and addresses are exchanged with the memory via the PAEI. The addressable memory size is limited by the size of the memory.

1.2 External/Memory Mapped Window

Data and addresses may be exchanged with the memory via the PAEI. A base address in the external memory may be specified in the ICH controller. The controller may read data from the external memory address one block at a time and write it into the memory, the internal and external addresses being incremented (or decremented) with each read or write operation, until the entire internal memory has been transmitted or a predefined limit has been reached. The array works with the local data until the data is written again into the external memory by the controller. The write operation takes place similarly to the read operation described previously.

Read and write by the controller may be initiated
a) by a trigger or
b) by access of the array to an address that is not locally stored. If the array accesses such an address, initially the internal memory may written to the external one and then the memory block is reloaded with the desired address.

This mode of operation may be particularly relevant for the implementation of a register set for a register processor. In this case, the push/pop of the register set with the external memory can be implemented using a trigger for a change in task or a context switchover.

1.3 External/Lookup Table

The lookup table function is a simplification of the external/memory mapped window mode of operation. In this case, the data may be read once or a number of times via a CT call or a trigger from the external RAM into the internal RAM. The array reads data from the internal memory, but writes no data into the internal memory. The base address in the external memory is stored in the controller either by the CT or by the array and can be modified at runtime. Loading from the external memory is initiated either by the CT or by a trigger from the array and can also be done at runtime.

1.4 External/Cached

In this mode, the array optionally accesses the memory. The memory operates as a cache memory for the external memory according to the related art. The cache can be emptied (e.g., the cache can be fully written into the external memory) through a trigger from the array or through the CT.

2. FIFO

The FIFO mode is normally used when data streams are sent from the outside to the VPU. Then the FIFO is used to isolate the external data processing from the data processing within the VPU so that either the write operation to the FIFO takes place from the outside and the read operation is performed by the VPU or vice versa. The states of the FIFO are signaled by triggers to the array or, if needed, also to the outside. The FIFO itself is implemented according to the related art with different read and write pointers.

3. Stack/Internal

An internal stack may be formed by an address register. The register is (a) incremented or (b) decremented depending on the mode with each write access to the memory by the array. In contrast, in the case of read accesses from the array, the register is (a) decremented and (b) incremented. The address register makes the addresses available for each access. The stack may be limited by the size of the memory. Errors, such as overrun or underrun may be indicated by triggers.

4. Stack/External

If the internal memory is too small for forming a stack, it may be transferred into the external memory. For this purpose, an address counter for the external stack address may be available in the controller. If a certain amount of records is exceeded in the internal stack, records may be written onto the external stack one block at a time. The stack may be written outward from the end, e.g., from the oldest record, a number of the newest records not being written to the external memory, but remaining internal. The external address counter (ERC) may be modified one row at a time.

After space has been created in the internal stack, the remaining content of the stack may need to be moved to the beginning of the stack; the internal stack address may adjusted accordingly.

A more efficient version is configuring the stack as a ring memory as described in German Patent Application No. 196 54 846.2, filed on Dec. 27, 1996. An internal address counter may be modified by adding or removing stack entries. As soon as the internal address counter (IAC) exceeds the top end of the memory, it point to the lowermost address. If the IAC is less than the lowermost address, it may point to the uppermost address. An additional counter (FC) may indicate the full status of the memory, e.g., the counter may be incremented with each word written, and decremented with each word read. Using the FC, it may be ascertained when the memory is full or empty.

This technology is known from FIFOs. Thus, if a block is written into the external memory, the adjustment of the FC is sufficient for updating the stack. An external address counter (EAC) may be configured to always points to the oldest record in the internal memory and is therefore at the end of the stack opposite the IAC. The EAC may be modified if (a) data is written to the external stack; then the EAC runs toward the IAC;
(b) data is read from the external stack; then The EAC moves away from the IAC.

It will be appreciated that it may be ensured by monitoring the FC that the IAC and the EAC do not collide.

The ERC may be modified according to the external stack operation, e.g., buildup or reduction.

Example MMU

An MMU can be associated with the external memory interface. The MMU may perform two functions:
1. Recompute the internal addresses to external addresses in order to support modern operating systems;
2. Monitor accesses to the external addresses, e.g., generate an error signal as a trigger if the external stack overruns or underruns.

Example Compiler

In an example embodiment according to the present invention, the VPU technology programming may include separating sequential codes and breaking them down into the largest possible number of small and independent subalgorithms, while the subalgorithms of the data flow code may be mapped directly onto the VPU.

Separation Between VPU Code and Standard Code

C++ is used in the following to represent all possible compilers (Pascal, Java, Fortran, etc.) within a related art language; a special extension (VC=VPU C), which contains the language constructs and types which can be mapped onto VPU technology particularly well, may be defined. VC may be used by programmers only within methods or functions that use no other constructs or types. These methods and functions can be mapped directly onto the VPU and run particularly efficiently. The compiler extracts the VC in the pre-processor and forwards it directly to the VC back-end processing (VCBP).

Extraction of the Parallelizable Compiler Code

In the following step, the compiler analyzes the remaining C++ codes and extracts the portions (MC=mappable C) which can be readily parallelized and mapped onto the VPU technology without the use of sequencers. Each individual MC may be placed into a virtual array and routed. Then, the space requirement and the expected performance are analysed. For this purpose, the VCBP may be called and the individual MCs may be partitioned together with the VCs, which are mapped in each case.

The MCs whose VPU implementations achieve the highest increase in performance are accepted and the others are forwarded to the next compiler stage as C++.

Example Optimizing Sequencer Generator

This compiler stage may be implemented in different ways depending on the architecture of the VPU system:
1. VPU without a sequencer or external processor All remaining C++ codes may be compiled for the external processor.
2. VPU only with sequencer
2.1. Sequencer in the PAEs
All remaining C++ codes may be compiled for the sequencer of the PAEs.
2.2 Configurable Sequencer in the Array
The remaining C++ code is analysed for each independent software module. The best-suited sequencer version is selected from a database and stored as VC code (SVC). This step is mostly iterative, e.g., a sequencer version may be selected, the code may be compiled, analysed, and compared to the compiled code of other sequencer versions. Finally, the object code (SVCO) of the C++ code may be generated for the selected SVC.
2.3 Both 2.1 and 2.2 are Used
The mode of operation corresponds to that of 2.2. Special static sequencer models are available in the database for the sequencers in the PAEs.
3. VPU with Sequencer and External Processor
This mode of operation also corresponds to 2.2. Special static sequencer models are available in the database for the external processor.

Example Linker

The linker connects the individual software modules (VC, MC, SVC, and SVCO) to form an executable program. For this purpose, the linker may use the VCBP in order to place and route the individual software modules and to determine the time partitioning. The linker may also add the communication structures between the individual software modules and, if needed, additional registers and memories. Structures for storing the internal states of the array and sequencers for the case of a reconfiguration may be added, e.g., on the basis of an analysis of the control structures and dependencies of the individual software modules.

Notes on the Processor Models

It will be appreciated that the machine models used may be combined within a VPU in any desired manner. It is also possible to switch from one model to another within an algorithm depending on which model is best.

If an additional memory is added to a register processor from which the operands are read and into which the results are written, a load/store processor may be created. A plurality of different memories may be assigned by treating the individual operands and the result separately.

These memories then may operate more or less as load/store units and represent a type of cache for the external memory. The addresses may be computed by the PAEs which are separate from the data processing.

Pointer Reordering

High-level languages such as C/C++ often use pointers, which are poorly handled by pipelines. If a pointer is not computed until immediately before a data structure at which it points is used, the pipeline often cannot be filled rapidly enough and the processing is inefficient, especially in the VPUs.

It may be useful not to use any pointers in programming VPUs; however, this may be impossible.

The problem may be solved by having the pointer structures re-sorted by the compiler so that the pointer addresses are computed as early as possible before they are used. At the same time, there should be as little direct dependence as possible between a pointer and the data at which it points.

Extensions of the PAEs

German Patents 196 51 075.9 and 196 54 846.2 describe possible configuration characteristics of cells (PAEs).

According to German Patent 196 51 075.9, a set of configuration registers (0904) containing a configuration may be associated with a PAE (0903) (FIG. 9A). According to German Patent 196 54 846.2, a group of PAEs (0902) may access a memory to store or read data (FIG. 9B).

These related patents may be extended, e.g., a) to provide a method to speed up the reconfiguration of PAEs and isolate it in time from the higher-level load unit,
b) to design the method so that the possibility of simultaneously sequencing over more than one configuration is provided, and
c) to simultaneously hold in one PAE a plurality of configurations, one of which is always activated, with rapid switching between different configurations.

Isolation of the Configuration Register

The configuration register may be isolated from the higher-level load unit (CT) (FIGS. 10A-10C) by the use of a set configuration registers (1001). Precisely one of the configuration registers always selectively determines the function of the PAE. The active register is selected via a multiplexer (1002). The CT may freely write into each of the configuration registers as long as the configuration register does not determine the current configuration of the PAE, e.g., is not active. Writing onto the active register is possible using, for example, the method described in German Patent Application No. 198 07 782.2, filed on Feb. 25, 1998.

The configuration register to be selected by multiplexer 1002 may be determined by different sources:

1. Any status signal or a group of any status signals supplied via a bus system 0802 in FIG. 8B to multiplexer 1002 (FIG. 10A). The status signals may generated by any of the PAEs or made available through external links of the hardware module (see FIG. 8B).
2. The status signal of the PAE which is configured by the configuration registers 1001 and multiplexer 1002 may be used for the selection (FIG. 10B).
3. A signal 1003 generated by the higher-level CT may used for the selection, as shown in FIG. 10C.

Optionally, the incoming signals 1003 may be stored for a certain period of time using a register and may be optionally called as needed.

By using a plurality of registers, the CT may be isolated in time. The CT may "pre-load" a plurality of configurations without a direct time-dependency existing.

The configuration of the PAE is delayed only until the CT has loaded the register if the selected/activated register in the register set 1001 has not yet been loaded. In order to determine whether a register has valid information, a "valid bit" 1004 which is set by the CT may be inserted in each register. If 0906 is not set in a selected register, the CT may be requested, via a signal, to configure the register as rapidly as possible.

The procedure described in FIGS. 10A-10C may be extended to a sequencer, as shown in FIGS. 11A-11B. For this purpose, a sequencer having an instruction decoder 1101 may be used for triggering the selection signals of the multiplexer 1002. The sequencer determines, as a function of a currently selected configuration 1102 and an additional piece of status information 1103 the configuration to be selected next. The status information may be:

(a) the status of the status signal of the PAE which is configured by register set 1001 and 1002, as shown in FIG. 11A;
(b) any desired status signal supplied via bus system 0802, as shown in FIG. 11B; or
(c) a combination of (a) and (b).

Register set 1001 may also be designed as a memory, with a command being addressed by instruction decoder 1101 instead of multiplexer 1002. Addressing here depends on the command itself and on a status register. In this respect, the structure corresponds to that of a "von Neumann" machine with the difference (a) of universal applicability, e.g., non-use of the sequencer (as in FIGS. 10A-10C);
(b) that the status signal does not need to be generated by the arithmetic unit (PAE) associated with the sequencer, but may come from any other arithmetic unit (e.g., FIG. 11B).

It will be appreciated that it may be useful if the sequencer can execute jumps, in particular also conditional jumps within the register set 1001.

Figure 12:
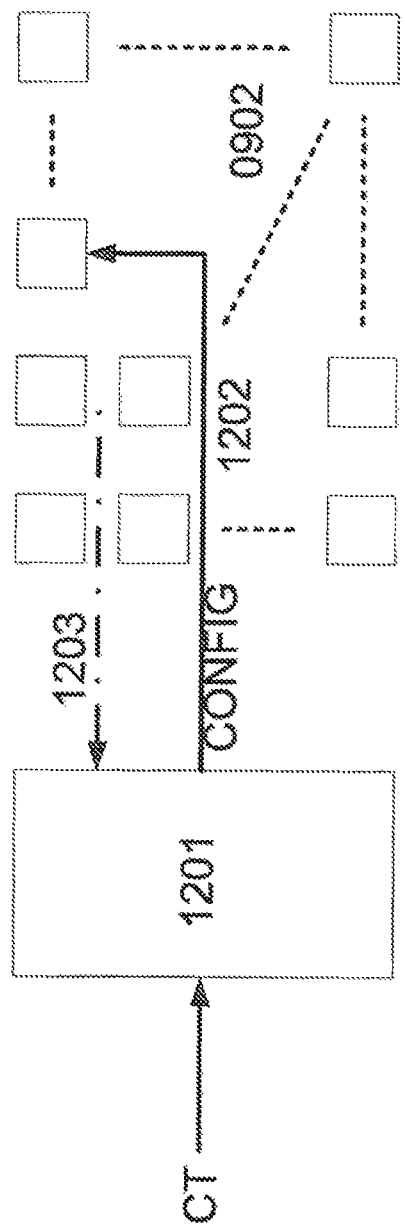
FIG. 12 illustrates an additional or alternative procedure for creating sequencers within VPUs, according to an example embodiment of the present invention.

FIG. 12 illustrates an additional or alternative procedure for creating sequencers within VPUs. FIG. 12 shown the use of the internal data storage device 1201 or 0901 for storing the configuration information for a PAE or a group of PAEs. In this case, the data output of a memory is connected to a configuration input 1202 or data input of a PAE or a plurality of PAEs. The address 1203 for data storage device 1201 may be generated by the same PAE/PAEs or any one or more other PAE(s).

In this procedure, the sequencer is not fixedly implemented, but may be emulated by a PAE or a group of PAEs. The internal memories may reload programs from the external memories.

In order to store local data (e.g., for iterative computations and as a register for a sequencer), the PAE may be provided with an additional register set, whose individual registers are either determined by the configuration, connected to the ALU or written into by the ALU; or they be freely used by the command set of an implemented sequencer (register mode). One of the registers may also be used as an accumulator (accumulator mode). If the PAE is used as a full-featured machine, it may be advantageous to use one of the registers as an address counter for external data addresses.

In order to manage stacks and accumulators outside the PAE (e.g., in the memories according to the present invention), the previously described RDY/ACK REQ/ACK synchronization model is used.

Conventional PAEs, such as those described in German Patent Application No. 196 51 075.9, may be ill-suited for processing bit-wise operations, since the integrated ALU may not particularly support bit operations, e.g., it has a narrow design (1, 2, 4 bits wide). Efficient processing of individual bits or signals may be guaranteed by replacing the ALU core with an FPGA core (LC), which executes logical operations according to its configuration. The LC can be freely configured in its function and internal interconnections. Conventional LCs can be used. For certain operations it may be advantageous to assign a memory to the LC internally. The interface modules between FC and the bus system of the array are adjusted only slightly to the FC, but are basically preserved. However, in order to configure the time response of the FC in a more flexible manner, it may be useful if the registers in the interface modules are configured so that they can be turned off.

FIG. 4A illustrates some basic characteristics of an example method according to the present invention. The Type A software modules may be combined into a group and, at the end, have a conditional jump either to B1 or to B2. At position 0401, a reconfiguration point may be inserted. It may be useful to treat each branch of the conditional jump as a separate group (case 1). However, if both B branches (B1 and B2), together with A as well, suit the target module (case 2), it may be more convenient to insert only one reconfiguration point at position 0402, since this reduces the number of configurations and increases the processing speed. Both branches (B1 and 32) jump to C at position 0402.

The configuration of cells on the target module is illustrated schematically in FIG. 4B. The functions of the individual graph nodes may be mapped onto the cells of the target module. Each line represents one configuration. The broken-line arrows at a new line indicate a reconfiguration. $S_n$ is a data storage cell of any desired design (register, memory, etc.). $S_nI$ is a memory which accepts data and $S_nO$ is a memory which outputs data. Memory $S_n$ is always the same for the same n; I ad O identify the direction of data transfer.

Both cases of conditional jump (case 1, case 2) are shown.

The model of FIGS. 4A-4B correspond to a data flow model with several extensions. The model includes the reconfiguration point and the graph partitioning that is achieved thereby, the data transmitted between the partitions being buffered.

FIGS. 5A-5B illustrate the execution of a model graph. The model graph B includes the subgraphs $B_1$, $B_2$, and $B_3$. The model graph B may be called from a collection of graphs 0501. The collection of graphs 0501 may include any number and combination of graphs. After execution of B, the data is returned to the collection of graphs 0501.

If a sufficiently large sequencer (A) is implemented in 0501, a principle which is very similar to typical processors can be implemented with this model. In this case, the data may go to
1. sequencer A, which decodes it as commands and responds to it according to the "von Neumann" principle;
2. sequencer A, where it is treated as data and forwarded to a fixedly configured arithmetic unit C for computation.

Graph B selectively makes available a special arithmetic unit and/or special opcodes for certain functions and is alternatively used to speed up C. For example, B1 can be an optimized algorithm for performing matrix multiplications, while 32 represents a FIR filter, and B3 a pattern recognition. The appropriate, e.g., corresponding graph B is called according to an opcode which is decoded by the collection 0501.

FIG. 5B schematically shows the mapping onto the individual cells. The cell may perform pipeline-type arithmetic unit, as illustrated in 0502.

While larger memories may be introduced at the reconfiguration points of FIGS. 4A-4B for temporary storage of data, simple synchronization of data is sufficient at the reconfiguration points of FIGS. 5A-5B, since the data stream preferably runs as a whole through graph B, and graph B is not partitioned further; therefore, temporary storage of data is superfluous.

FIG. 6A shows different loops. Loops may be basically h handled in three different ways:
1. Hardware approach: Loops may be mapped onto the target hardware completely rolled out (0601 a/b). As explained previously, this may be possible only for a few types of loops;
2. Data flow approach: Loops may be formed over a plurality of cells within the data flow (0602 a/b). The end of the loop may be looped back to the beginning of the loop.
3. Sequencer approach: A sequencer having a minimum command set may execute the loop (0603 a/b). The cells of the target modules may be configured so that they contain the corresponding sequencers (see FIG. 11 A/B).

The execution of the loops may sometimes be optimized by breaking them down in a suitable manner:
1. Using conventional optimizing methods, often the body of the loop, e.g., the part to be executed repeatedly, can be optimized by removing certain operations from the loop and placing them before or after the loop (0604 a/b). Thus, the number of commands to be sequenced is substantially reduced. The removed operations are only executed once before or after the execution of the loop.
2. Another optimization option is dividing the loops into a plurality or smaller or shorter loops. This division is performed so that a plurality of parallel or sequential (0605 a/b) loops are obtained.

Figure 7:
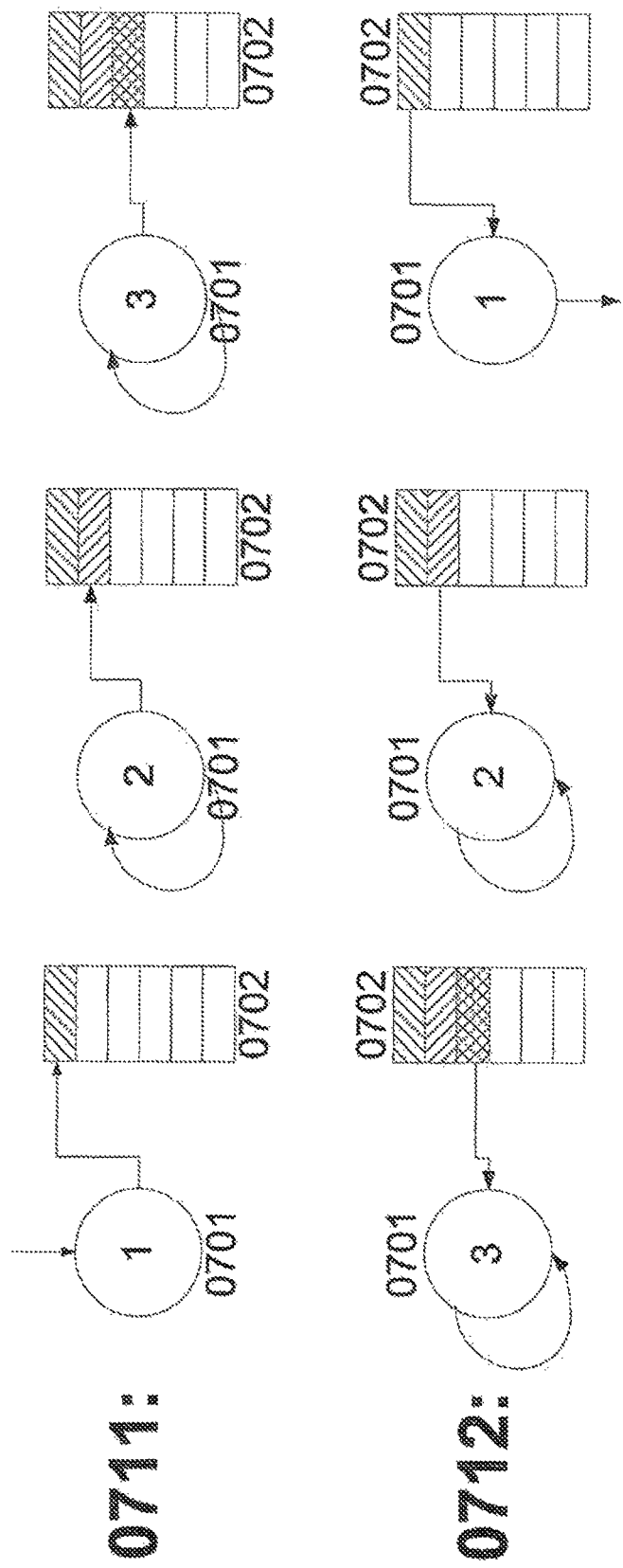
FIG. 7 illustrates the implementation of a recursion, according to an example embodiment of the present invention.

FIG. 7 illustrates the implementation of a recursion. The same resources 0701 may be used in the form of cells for each recursion level. Several revision levels are shown (1-3). The results of each recursion level (1-3) may be written into a stack-type memory 0702 as it is being built up (0711:). The stack is torn down simultaneously with the tear-down (0712:) of the levels.

Figure 14:
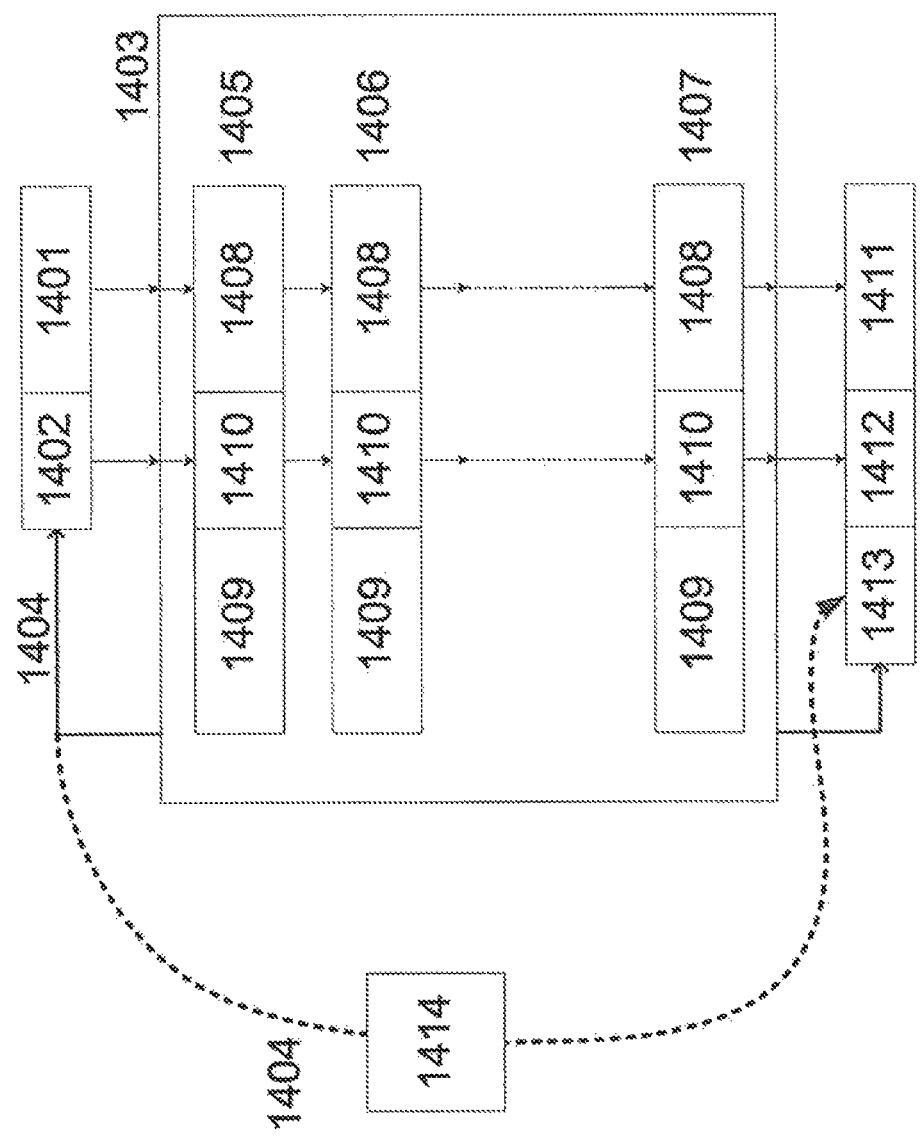
FIG. 14 illustrates a virtual machine model, according to an example embodiment of the present invention.

FIG. 14 illustrates a virtual machine model. Data 1401 and states 1402 associated with the data may be read into a VPU 1403 from an external memory. Data 1401 and states 1402 may be selected via an address 1404 generated by the VPU. PAEs may be combined to form different groups within the VPU (group 1405, group 1406, group 1407). Each group may have a data processing part 1408, which may have local implicit states (1409), which have no effect on the surrounding groups. Therefore the states of the data processing part are not forwarded outside the group. However, it may depend on the external states. Another part 1410 generates states which have an effect on the surrounding groups.

The data and states of the results may be stored in memories (1411 and memory 1412). At the same time, the address of operands 1404 may be stored as a pointer 1413. Address 1404 may pass through registers 1414 for time synchronization.

FIG. 14 shows a simple model for the sake of clarity. The interconnection and grouping may be considerably more complex than they are in this model. States and data may also be transmitted to software modules other than those mentioned below. Data is transmitted to different software modules than the states. Both data and states of a certain software modules may be received by a plurality of different software modules. 1408, 1409, and 1410 may be present within a group. Depending on the algorithm, individual parts may also not be present (e.g., 1410 and 1409 present, but not 1410).

Figure 15:
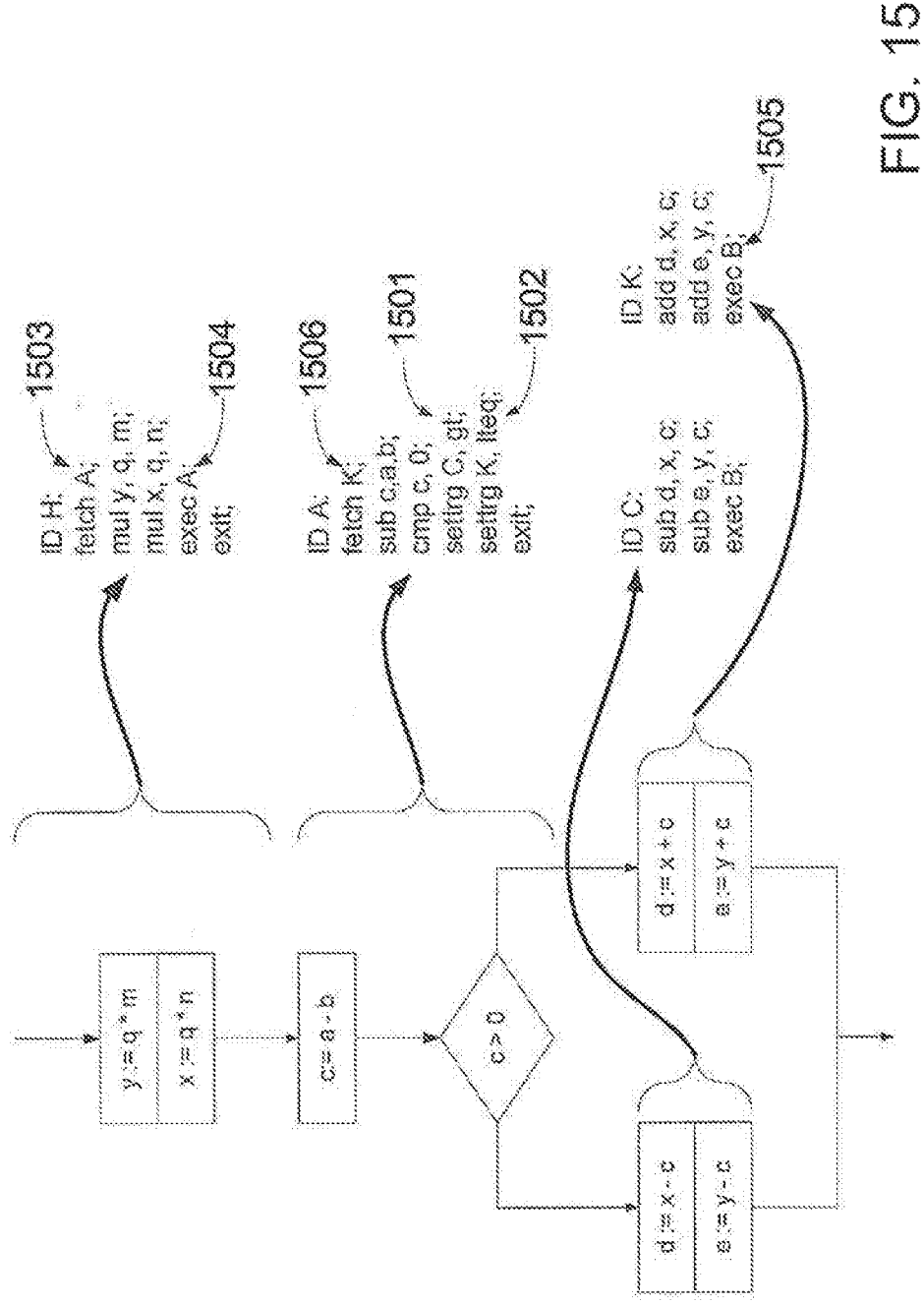
FIG. 15 illustrates the extraction of subapplications from a processing graph, according to an example embodiment of the present invention.

FIG. 15 illustrates how subapplications may be extracted from a processing graph. The graph may be broken down so that long graphs are subdivided into smaller parts as appropriate and mapped in subapplications (H, A, C, K). After jumps, new subgraphs may be formed (C, K), with a separate subgraph being formed for each jump.

In the ULIW model, each subgraph may be loaded separately by the CT, see German Patent Application No. 198 07 782.2. Subgraphs may be managed by the mechanisms of German Patent Application No. 198 07 782.2. These may include intelligent configuring, execute/start, and deletion of subapplications.

At point 1503 a fetch instruction may cause subapplication A to be loaded or configured, while subapplication K is being executed. Thus,
a) subapplication A may be already configured in the PAEs at the time subapplication K is completely executed if the PAEs have more than one configuration register;
b) subapplication A may be already loaded into the CT at the time subapplication K is completely executed if the PAEs only have one configuration register.

1504 starts the execution of subapplication K.

This means that, at runtime the next required program parts may be loaded independently while the current program parts are running. This may yield a much more efficient handling of the program codes than the usual cache mechanisms.

Another particular feature of subapplications A is shown. In principle, both possible branches (C, K) of the comparison could be preconfigured. Assuming that the number of free configuration registers available is insufficient for this, the more probable of the two branches is configured (1506). This also saves configuration time. When the non-configured branch is executed, the program execution may be interrupted (since the configuration is not yet loaded into the configuration registers) until the branch is configured.

In principle, unconfigured subapplications may also be executed (1505); in this case they may need to be loaded prior to execution as described previously.

A FETCH command may be initiated by a trigger via its own ID. This allows subapplications to be pre-loaded depending on the status of the array.

The ULIW model differs from the VLIW model in that it also includes data routing. The ULIW model also forms larger instruction words.

The above-described partitioning procedure may also be used by compilers for existing standard processors according to the RISC/CISC principle. If a unit described in German Patent Application No. 198 07 782.2 is used for controlling the command cache, it can be substantially optimized and sped up.

For this purpose, "normal" programs may be partitioned into subapplications in an appropriate manner. According to German Patent Application No. 198 07 782.2, references to possible subsequent subapplications are inserted (1501, 1502). Thus a CT may pre-load the subapplications into the cache before they are needed. In the case of a jump, only the subapplication to which the jump was made needs to be executed; the other(s) may be overwritten later by new subapplications. In addition to intelligent pre-loading, the procedure has the additional advantage that the size of the subapplications is already known at the time of loading. Thus, optimum bursts can be executed by the CT when accessing the memories, which in turn may considerably speed up memory access.

Figure 16:
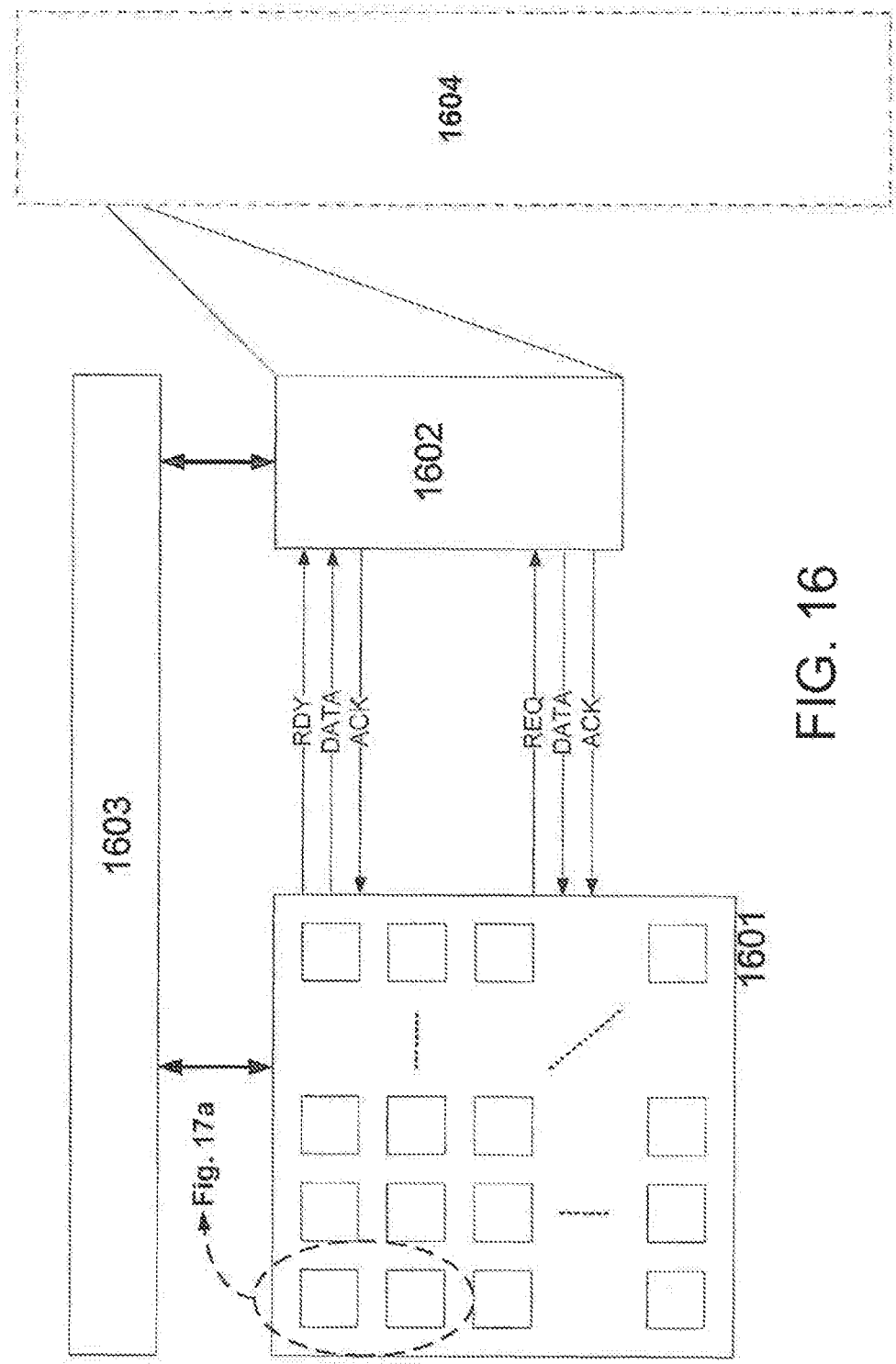
FIG. 16 illustrates the structure of an example stack processor, according to an example embodiment of the present invention.

FIG. 16 illustrates the structure of an example stack processor. Protocols may be generated by the PAE array 1601 in order to write into or read from a memory 1602 configured as LIFO. A RDY/ACK protocol may be used for writing and a REQ/ACK protocol may be used for reading. The interconnection and operating modes may be configured by the CT 1603. Memory 1602 may transfer its content to an external memory 1604.

Figure 17:
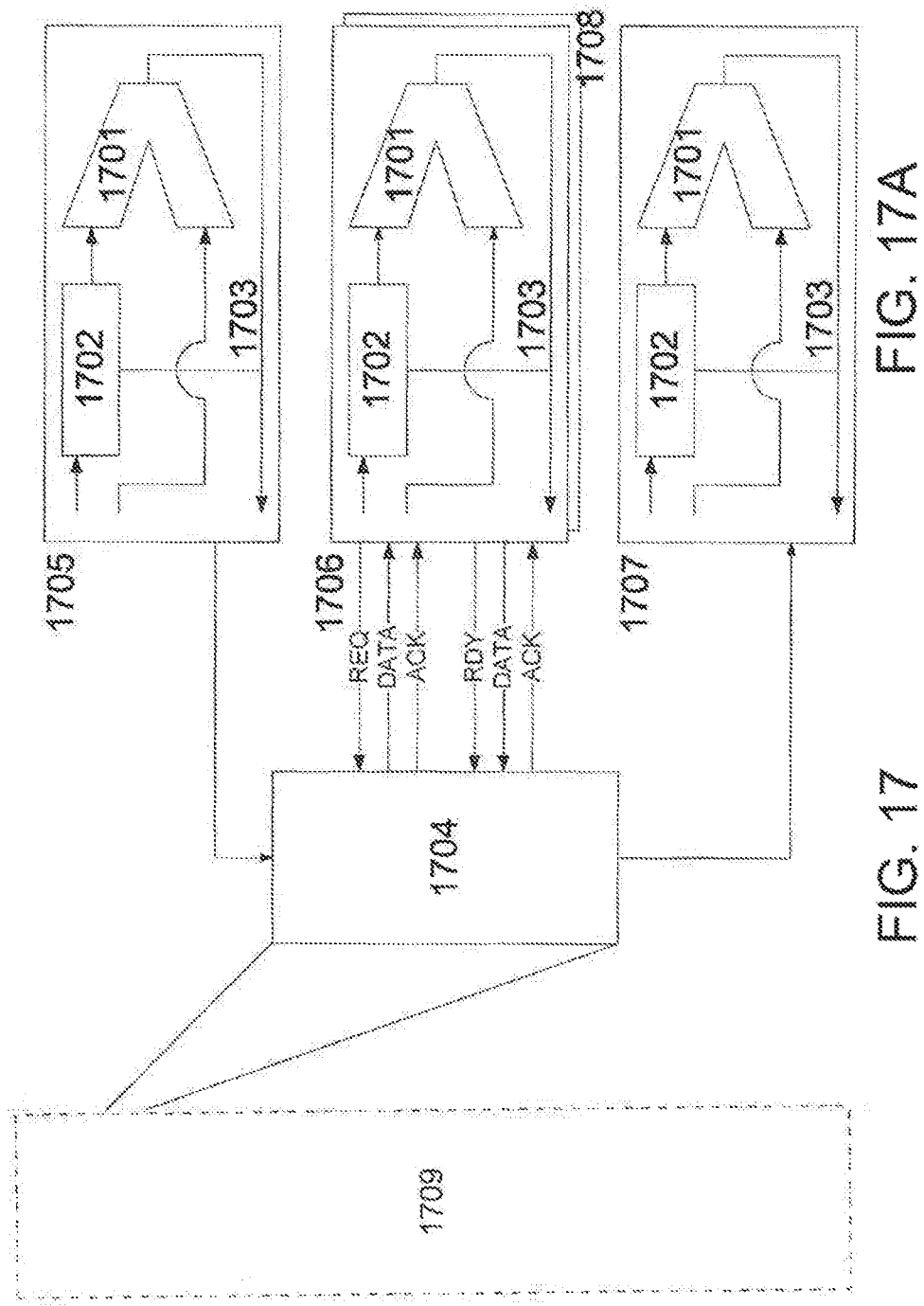

An array of PAEs may operate as a register processor in this embodiment (FIG. 17 and FIG. 17A). Each PAE may be composed of an arithmetic unit (1701) and an accumulator (1702) to which the result of arithmetic unit 1701 is looped back (1703). Thus, in this embodiment, each PAE may represent an accumulator processor. A PAE (1705) reads and writes the data into the RAM (1704) configured as a standard memory. An additional PAE (1706) may generate the register addresses.

It may be advantageous to use a separate PAE for reading the data. In this case, PAE 1705 would only write and PAE 1707 would only read. An additional PAE (1708, shown in broken lines underneath PAE 1706) may be added for generating the read addresses.

It is not necessary to use separate PAEs for generating addresses. Often the registers are implicit and, configured as constants, may be transmitted by the data processing PAEs.

The use of accumulator processors for a register processor is shown as an example. PAEs without accumulators can also be used for creating register processors. The architecture shown in FIG. 17 and FIG. 17A can be used for activating registers as well as for activating a load/store unit.

When used as a load/store unit, an external RAM (1709) may need to be connected downstream, so that RAM 1704 represents only a temporary section of external RAM 1709, similar to a cache.

Also, when 1704 is used as a register bank, it may be advantageous to some for an external memory to be connected downstream. In this case, PUSH/POP operations according to the related art, which write the content of the register into a memory or read it from there, may be performed.

Figure 18:
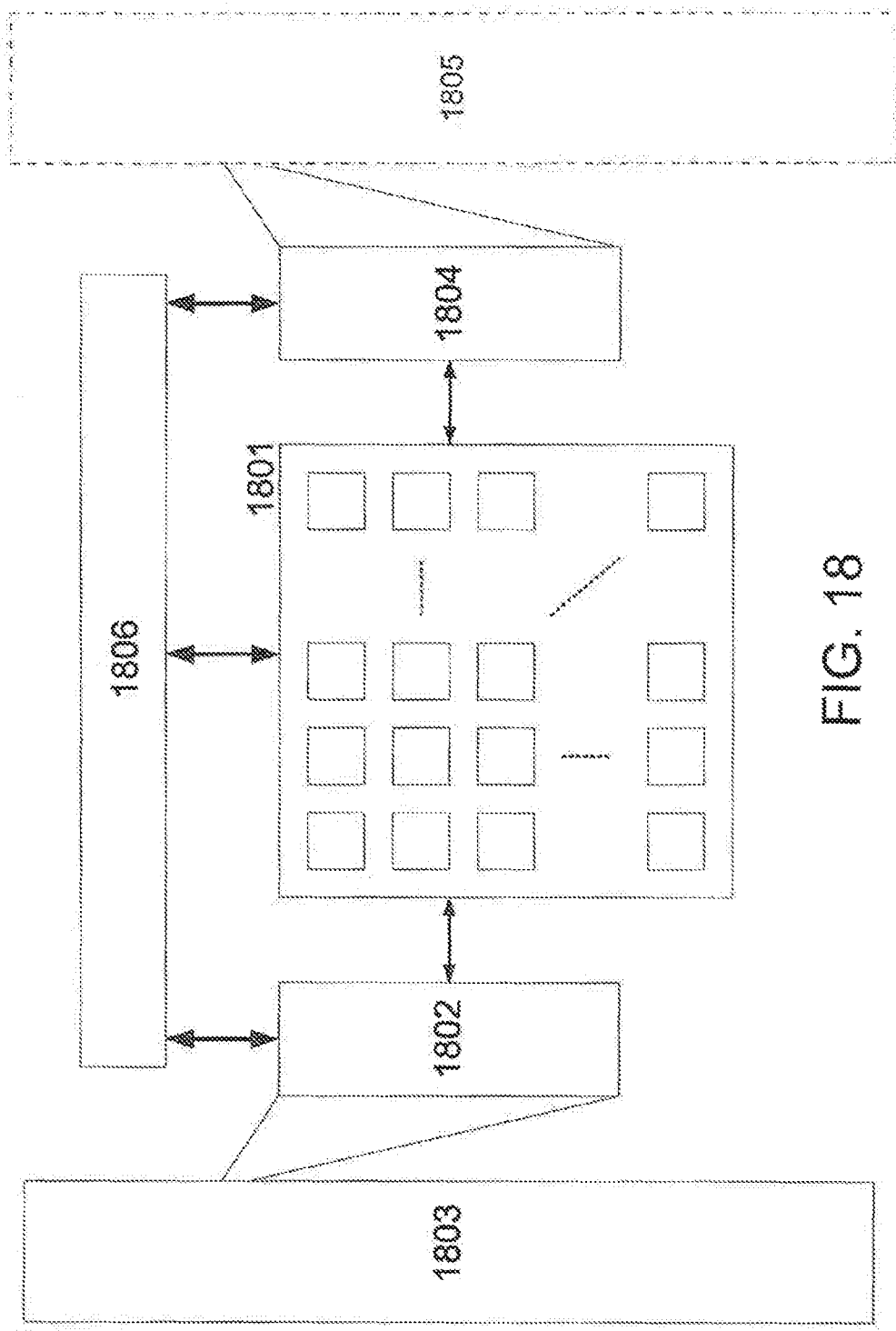
FIG. 18 illustrates an example complex machine in which the PAE array controls a load/store unit with a downstream RAM, according to an example embodiment of the present invention.

FIG. 18 illustrates a complex machine as an example, in which the PAE array (1801) controls a load/store unit (1802) with a downstream RAM (1803), and also has a register bank (1804) with a downstream RAM (1805). 1802 and 1804 may be activated by one PAE each or any group of PAEs. The unit is controlled by a CT (1806) according to the VPU principle.

There is no basic difference between the load/store unit (1802) and the register bank (1804) and their activation.

FIGS. 19A-19B, 20A-20B, 21A-21B show an internal memory according to an example embodiment of the present invention. The figures also represent a communication unit having external memories and/or peripheral devices. The individual figures show different modes of operation of the same memory. The modes of operation and the individual detail settings are configured.

FIG. 19A shows a memory according to the present invention in the "register/cache" mode. In the memory (1901), words of a usually larger and slower external memory (1902) may be stored.

The data exchange between 1901, 1902, and the PAEs (not shown) connected via a bus (1903) may take place as follows, distinction being made between two modes of operation:
A) The data read or transmitted by the PAEs from main memory 1902 is buffered in 1901 using a cache technique. Any conventional cache technique can be used.
B) The data of certain addresses is transmitted between 1902 and 1901 via a load/store unit. Certain addresses may be predefined both in 1902 and in 1901, different addresses being normally used for 1902 and 1901. The individual addresses may be generated by a constant or by computations in PAEs. In this operating mode memory 1901 may operate as a register bank.

The addresses between 1901 and 1902 may be assigned in any desired manner, which only depends on the respective algorithms of the two operating modes.

The corresponding machine is shown in FIG. 19B as a block diagram. A control unit (1904) operating as a conventional load/store unit (1904) or as a conventional cache controller is associated with the bus between 1901 and 1902. If needed, a memory management unit (MMU) (1905) with address translation and address checking may be associated with this unit. Both 1904 and 1905 can be activated by the PAEs. Thus, for example, the MMU may be programmed, the load/store addresses may be set, or a cache flush may be triggered.

Figure 20B:
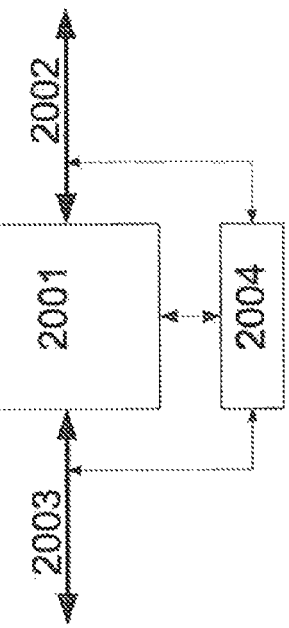
FIGS. 20A-20B illustrate the use of a memory in the FIFO mode, according to an example embodiment of the present invention.
Figure 20A:
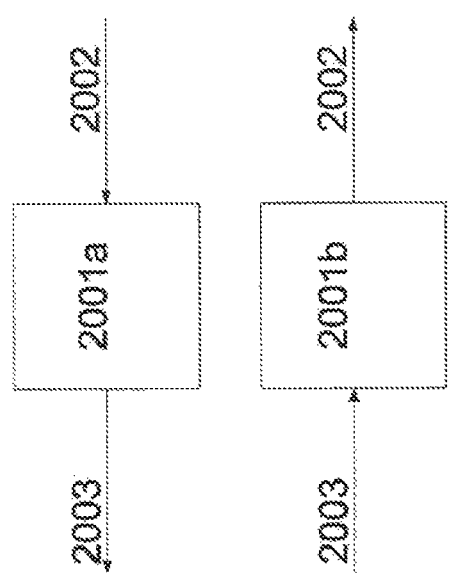

FIGS. 20A-20B show the use of the memory (2001) in the FIFO mode, in which data streams are isolated according to a FIFO principle. The typical application is in a write (2001 *a*) or read (2001 *b*) interface, in which case data is isolated in time between the PAEs connected to the internal bus system (2002) and the peripheral bus (2003).

A unit (2004) which controls the write and read pointers of the FIFO as a function of the bus operations of 2003 and 2002 may be provided to control the FIFO.

Figures 21A, 21B:
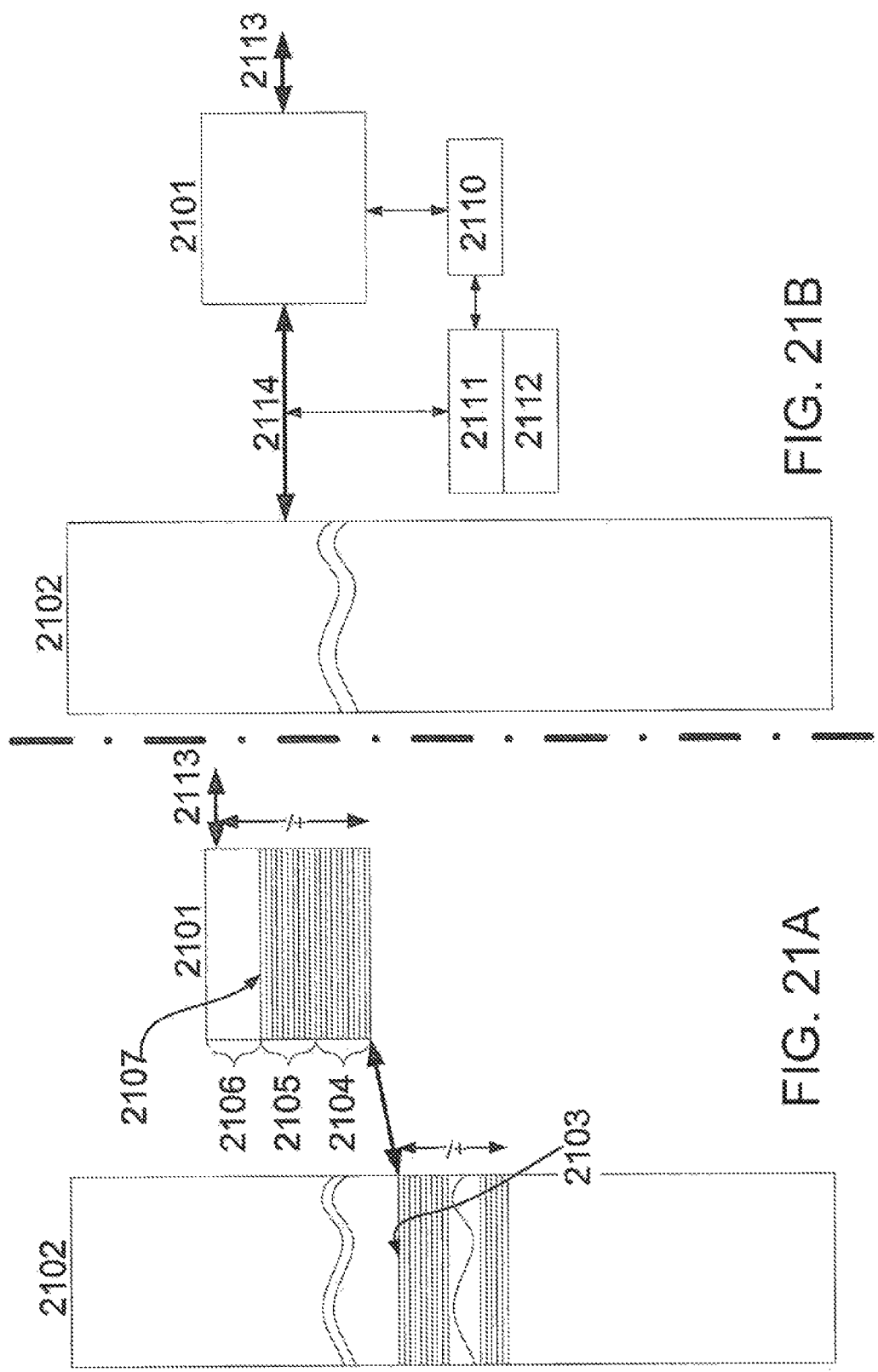
FIGS. 21A-21B illustrate the operation of example memories in stack mode, according to an example embodiment of the present invention.

FIGS. 21A-21B illustrate an example operating principle of the memories in stack mode, according to an example embodiment of the present invention. A stack may be a memory whose uppermost/lowermost element is the one active at the time. Data may be appended at the top/bottom, and data may likewise be removed from the top/bottom. The data written last may also be the data read first (last in first out). The stack may grow upward or downward depending on the implementation. In the following embodiment, stacks growing upward will be discussed.

The current data may be held in internal memory 2101; the most recent record (2107) may be located at the very top in 2101. Old records are transferred to external memory 2102. If the stack continues to grow, the space in internal memory 2101 is no longer sufficient. When a certain amount of data is reached, which may be represented by a (freely selectable) address in 2101 or a (freely selectable) value in a record counter, part of 2101 is written as a block to the more recent end (2103) of the stack in 2102. This part is the oldest and thus the least current data (2104). Subsequently, the remaining data in 2101 may be shifted so that the data in 2101 copied to 2102 is overwritten with the remaining data (2105) and thus sufficient free memory (2106) may created for new stack inputs.

If the stack decreases, starting at a certain (freely selectable) point, the data in 2101 may be shifted so that free memory is created after the oldest and least current data. A memory block is copied from 2102 into the freed memory, and is then deleted in 2102.

Thus, 2101 and 2102 may represent a single stack, the current records being located in 2101 and the older and less current records being transferred to 2102. The method represents a quasi-cache for stacks. The data blocks may be transmitted by block operations; therefore, the data transfer between 2101 and 2102 can be performed in the rapid burst operating modes of modern memories (SDRAM, RAM-BUS, etc.).

In the example illustrated in FIGS. 21A-21B the stack grows upward. It will be appreciated that if the stack grew downward (a frequently used method), the positions top/bottom and the directions in which the data is moved within the memory are exactly reversed.

Internal stack 2101 may be designed as a type of ring memory. The data at one end of the ring may be transmitted between PAEs and 2101 and at the other end of the ring between 2101 and 2102. This has the advantage that data can be easily shifted between 2101 and 2102 without having any effect on the internal addresses in 2101. Only the position pointers of the bottom and top data and the fill status counter have to be adjusted. The data transfer between 2101 and 2102 may by triggered by conventional ring memory flags "almost full"/"full" "almost empty"/"empty."

Example hardware is shown as a block diagram in FIG. 21B. A unit (2110) for managing the pointers and the counter may be associated with internal stack 2101. A unit (2111) for controlling the data transfers may be looped into the bus (2114) between 2101 and 2102. A conventional MMU (2112) having the corresponding test systems and address translations can be associated with this unit.

The connection between the PAEs and 2101 may be implemented by bus system 2113.

Figure 22:
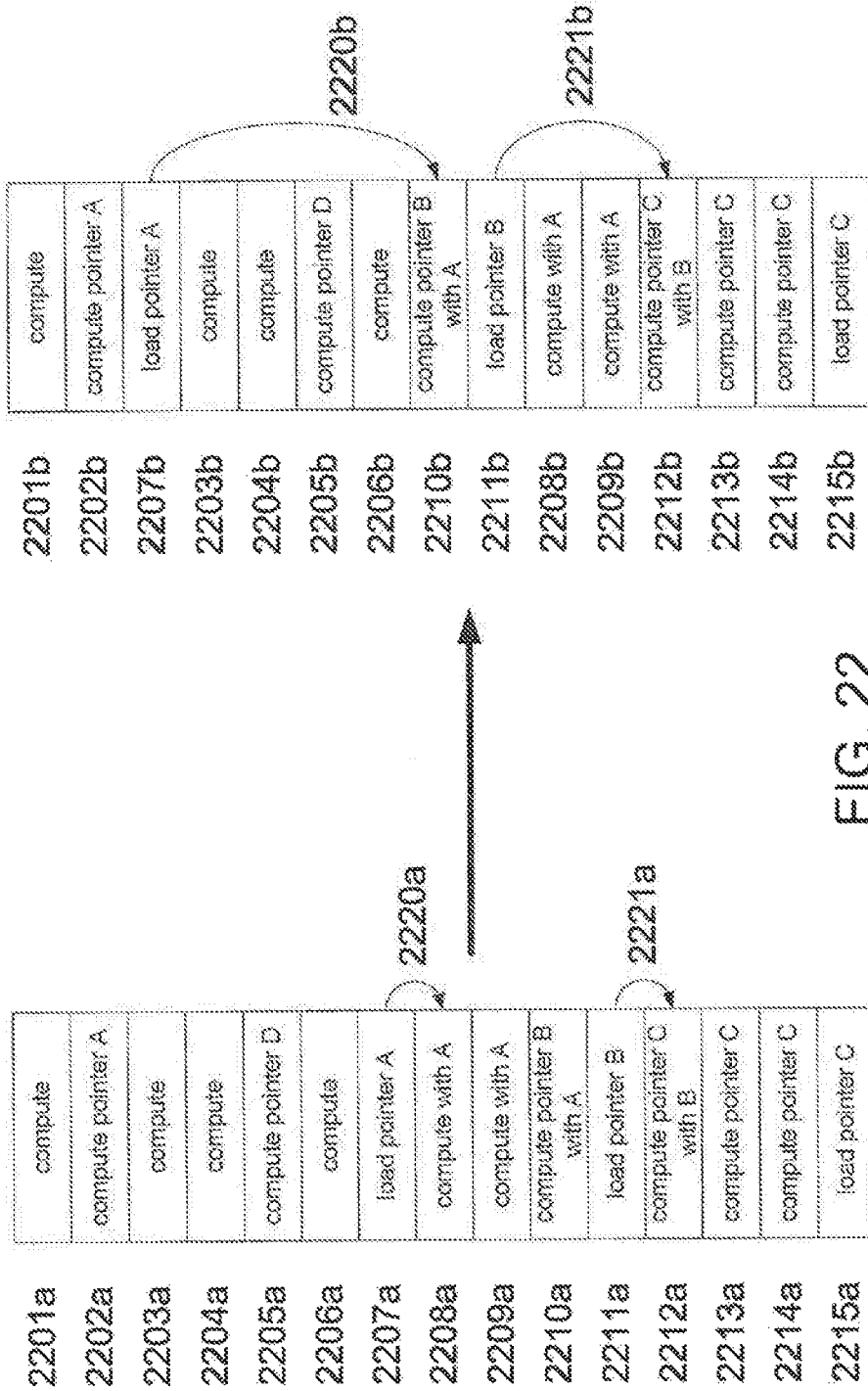
FIG. 22 illustrates an example re-sorting of graphs, according to an example embodiment of the present invention.

FIG. 22 illustrates an example re-sorting of graphs. The left-hand column (22.*a*) shows an unoptimized arrangement of commands. Pointers A (2207 *a*) and B (2211 *a*) are loaded. One cycle later in each case, the values of the pointers are needed (2208 *a*, 2212 *a*). This dependence may be too short to be executed efficiently, since a certain time (2220 *a*, 2221 *a*) is needed for loading from the memory. The time periods are increased to a maximum (2220 *b*, 2221 *b*) by re-sorting the commands (22.*b*). Although the value of the pointer of A is needed in 2210 and 2208, 2208 is placed after 2210, since more time is gained in this way for computing B. Computations that are independent of pointers (2203, 2204, 2206) may be inserted between 2211 and 2212, for example, in order to gain more time for memory accesses. A compiler or assembler may perform the corresponding optimization using system parameters which represent the access times.

Figure 23:
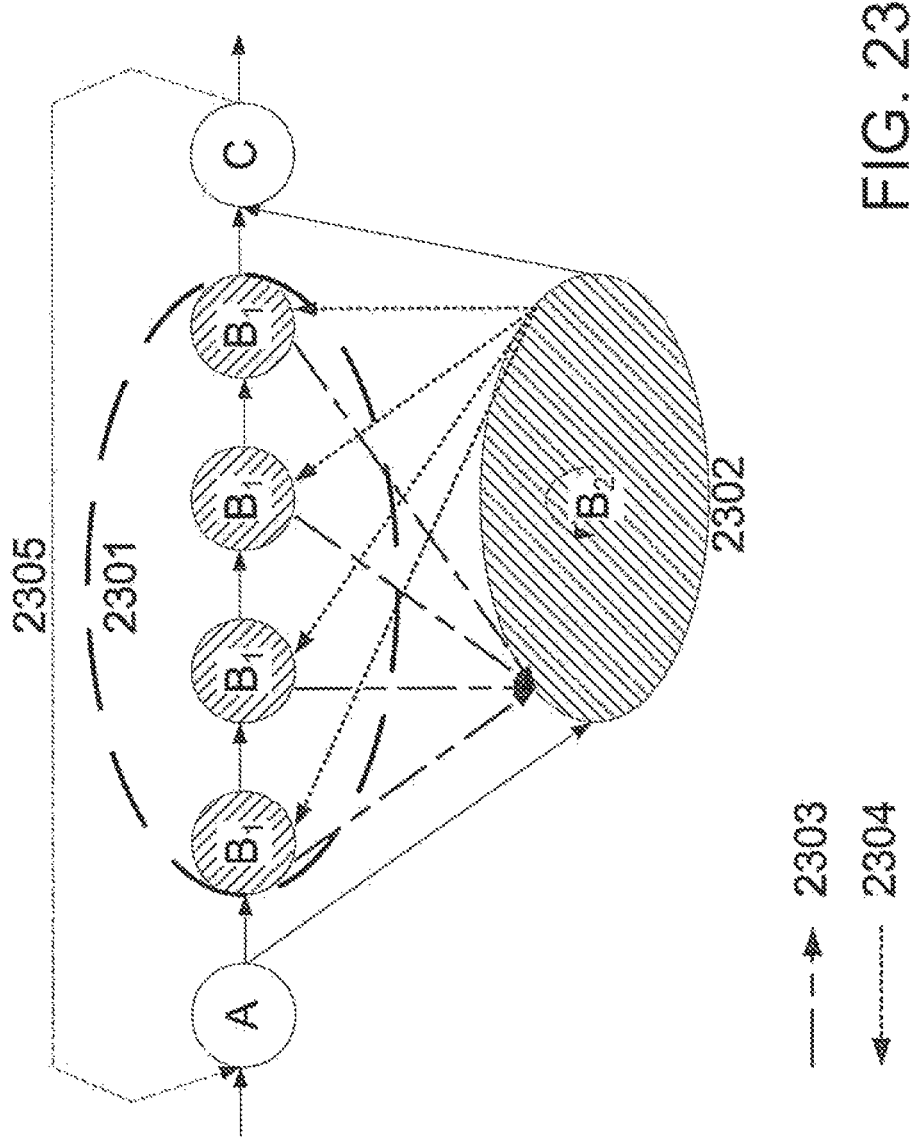
FIG. 23 illustrates a special case of FIGS. 4-7, according to an example embodiment of the present invention.

FIG. 23 illustrates a special case of FIGS. 4-7 (i.e. FIG. 4A-4B, FIG. 5A-5B, FIG. 6A-6B and FIG. 7). An algorithm is often composed of data flow portions and sequential portions even within loops. Such structures may be efficiently constructed according to the above-described method using the bus system described in German Patent Application No. 197 04 742.4, filed on Feb. 11, 1997. For this purpose, the RDY/ACK protocol of the bus system may be initially extended by the REQ/ACK protocol, according to an example embodiment of the present invention. Register contents of individual PAEs may be specifically queried by one or more other PAEs or by the CT. A loop (2305) may be broken down into at least two graphs: a first one (2301)

which represents the data flow portion, and a second one (2302), which represents the sequential portion.

A conditional jump chooses one of the two graphs. The special characteristic is that now 2302 needs to know the internal status of 2301 for execution and vice versa, 2301 must know the status of 2302.

This may be implemented by storing the status just once, namely in the registers of the PAEs of the higher-performance data flow graph (2301).

If a jump is performed in 2302, the sequencer may read the states of the respective registers from (2303) using the bus system of German Patent Application No. 197 04 742.4. The sequencer performs its operations and writes all the modified states back (2304) into the registers (again via the bus system of German Patent Application No. 197 04 742.4. Finally, it should be mentioned that the above-mentioned graphs need not necessarily be narrow loops (2305). The method is generally applicable to any subalgorithm which is executed multiple times within a program run (reentrant) and is run either sequentially or in parallel (data flow type). The states may be transferred between the sequential and the parallel portions.

Wave reconfiguration offers considerable advantages regarding the speed of reconfiguration, in particular for simple sequential operations. With wave reconfiguration, the sequencer may also be designed as an external microprocessor. A processor may be connected to the array via the data channels and the processor may exchange local, temporary data with the array via bus systems. All sequential portions of an algorithm that cannot be mapped into the array of PAEs may be run on the processor.

The example system may have three bus systems:
1. Data bus which regulates the exchange of processed data between the VPU and the processor;
2. Register bus which enables access to the VPU registers and thus guarantees the data exchange (2302, 2304) between 2302 and 2301;
3. Configuration data bus, which configures the VPU array.

Figure 24A:
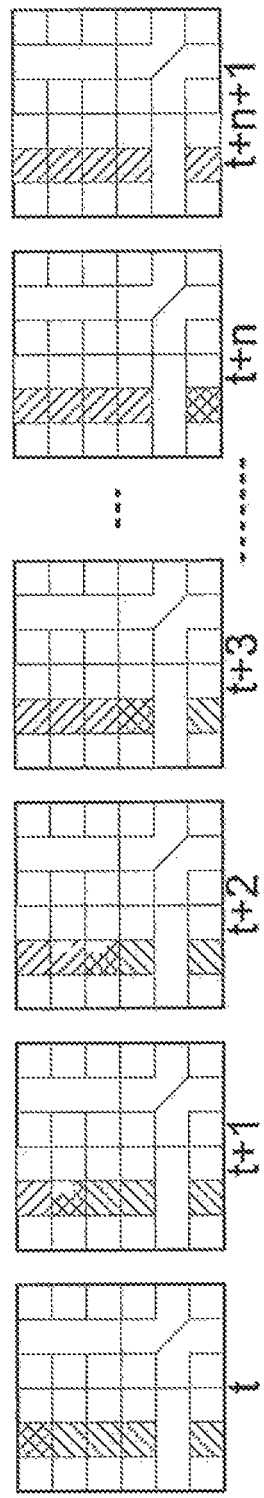
FIGS. 24A-24B illustrate the effects of wave reconfiguration over time, in an example embodiment of the present invention.
Figure 24B:
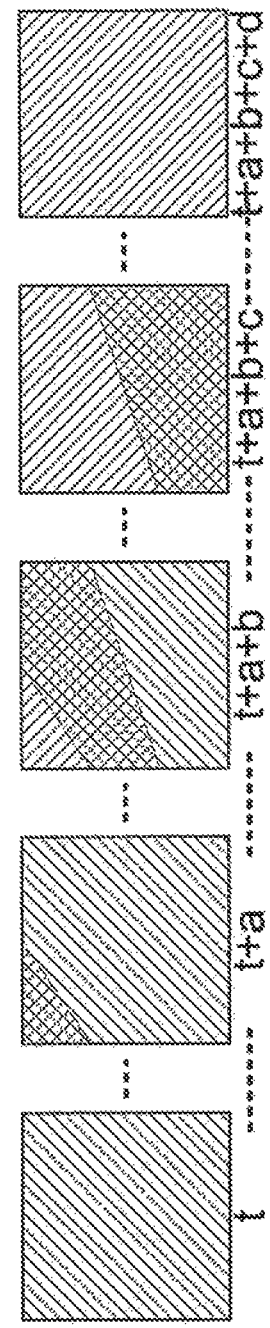

FIGS. 24A-24B illustrate the effects of wave reconfiguration over time, in an example embodiment of the present invention. Single-hatched areas represent data processing PAEs, 2401 showing PAEs after reconfiguration and 2403 showing PAEs before reconfiguration. Cross-hatched areas (2402) show PAEs which are being reconfigured or are waiting for reconfiguration.

FIG. 24A illustrates the effect of wave reconfiguration on a simple sequential algorithm. Those PAEs that have been assigned a new task may be reconfigured. This may be performed efficiently, e.g., simultaneously, because a PAE receives a new task in each cycle.

A row of PAEs from the matrix of all PAEs of a VPU is shown as an example. The states in the cycles after cycle t are given with a one-cycle delay.

FIG. 24B shows the effect over time of the reconfiguration of large portions. A number of PAEs of a VPU is shown as an example. The states in the cycles after cycle t are given with different delays of a plurality of cycles.

While initially only a small portion of the PAEs are being reconfigured or are waiting for reconfiguration, this area becomes larger over time until all PAEs are reconfigured. The enlarging of the area means that, due to the time delay of the reconfiguration, more and more PAEs will be waiting for reconfiguration (2402), resulting in loss of computing capacity. A wider bus system may be used between the CT (in particular the memory of the CT) and the PAEs, which may provide sufficient lines for reconfiguring multiple PAEs at the same time within one cycle.

FIG. 25 illustrates the scalability of the VPU technology. Scalability may result from the rollout of a graph without a time sequence separating individual subapplications. The algorithm previously illustrated in FIGS. 4A-4B is chosen as an example. In FIG. 25A, the individual subgraphs may be transferred to the VPU consecutively, with either $B_1$ or $B_2$ being loaded. In FIG. 25B, all subgraphs are transferred to a number of VPUs and connected to one another via bus systems. Thus large amounts of data may be processed efficiently without the negative effect of the reconfiguration.

Figure 26:
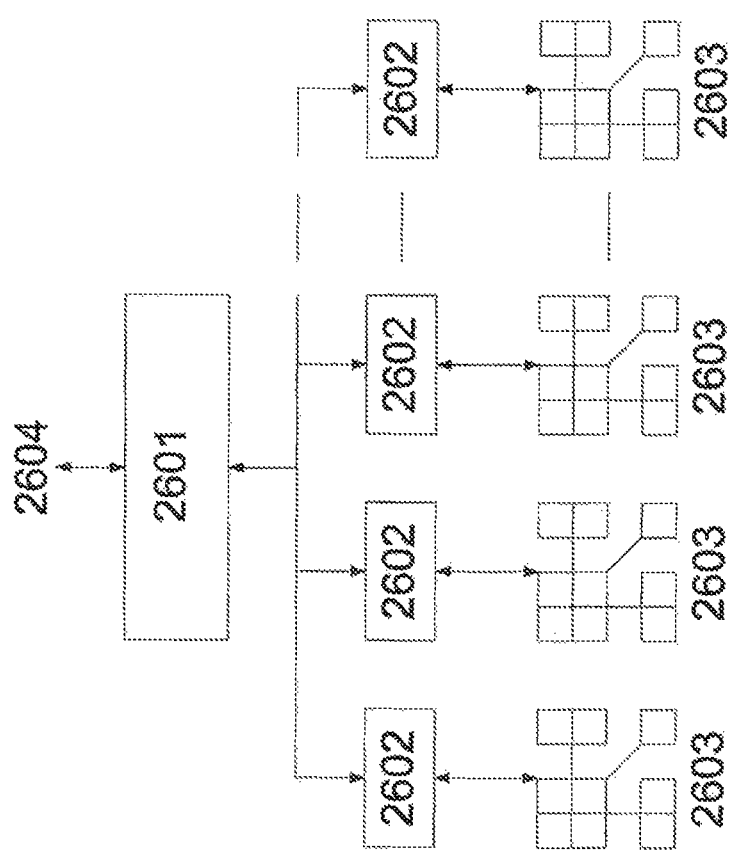
FIG. 26 illustrates a circuit for speeding up the (re) configuration time of PAEs, according to an example embodiment of the present invention.

FIG. 26 illustrates a circuit for speeding up the (re) configuration time of PAEs, according to an example embodiment of the present invention. At the same time, the circuit may be used for processing sequential algorithms. The array of PAEs (2605) may be partitioned into a plurality of portions (2603). An independent unit for (re)configuration (2602) may be associated with each portion. A CT (2601) as described in, for example, German Patent Application No. 198 07 782.2 is at a higher level than these units and may in turn be connected to another CT or a memory (2604). The CT loads the algorithms into the configuration units (2602). The 2602 automatically load the configuration data into the PAEs associated with them.

FIG. 27 and FIG. 27A illustrate the structure of an example configuration unit, according to an example embodiment of the present invention. The core of the unit is a sequencer (2701), which may have a series of commands. The commands include:

wait <trg#>
  Wait for the receipt of a certain trigger f(trg#) from the array, which indicates which next configuration should be loaded.
lookup <trg#>
  Returns the address of the subprogram called by a trigger received.
jmp <adr>
  Jump to address
call <adr>
  Jump to address. Return jump address may be stored on the stack.
jmp <cond><adr>
  Conditional jump to address call <cond><adr>
  Conditional jump to address. Return jump address is stored on the stack.
ret
  Return jump to the return jump address stored on the stack
mov <target><source>
  Transfers a data word from source to target. Source and target may each be a peripheral address or in a memory.

The commands may be similar to those described in German Patent Application No. 198 07 782.2, e.g., the description of the CT. The implementation of 2602, may need only very simple commands for data management. A complete micro controller may be omitted.

The command set may include a "pabm" command for configuring the PAEs. Two commands (pabmr, pabmm) are available, which have the following structure:

a)

| pabmr | regno | count |
|---|---|---|
| pa_adr$_0$ | | pa_dta$_0$ |
| pa_adr$_1$ | | pa_dta$_1$ |
| ... | | ... |
| pa_adr$_{count}$ | | pa_dta$_{count}$ |

-continued

| | | |
|---|---|---|
| pabmr offset | 0 | count |
| pa_adr$_0$ | | pa_dta$_0$ |
| pa_adr$_1$ | | pa_dta$_1$ |
| ... | | ... |
| pa_adr$_{count}$ | | pa_dta$_{count}$ |
| | b) | |
| pabmr memref | regno | count |
| pabmr offset memref | 0 | count |

The commands may copy an associated block of PAE addresses and PAE data from the memory to the PAE array. <count> indicates the size of the data block to be copied. The data block may either be directly appended to the opcode (a) or referenced by specifying the first memory address <memref>(b).

Each pa_adr$_n$-pa_dta$_n$ row represents a configuration for a PAE. pa_adr$_n$ specifies the address and pa_dta$_n$ specifies the configuration word of the PAE.

An example of the RDY/ACK-REJ protocol is described in German Patent Application No. 198 07 782.2. If the configuration data is accepted by a PAE, the PAE acknowledges the transmitted data with an ACK. However, if a PAE cannot accept the configuration data because it is not in a reconfigurable state, it returns a REJ. Thus the configuration of the subalgorithm fails.

The location of the pa_adr$_n$-pa_dta$_n$ row rejected with REJ is stored. The commands may be called again at a later time (as described in German Patent Application No. 198 07 782.2, FILMO). If the command was completely executed, e.g., no REJ occurred, the command performs no further configuration, but terminates immediately. If a REJ occurred, the command jumps directly to the location of the rejected pa_adr$_n$-pa_dta$_n$ row. Depending on the command, the location is stored in different ways:

pabmr: the address is stored in the register named <regno>;
pabmm: the address is stored directly in the command at the memory location <offset>.

The commands can be implemented via DMA structures as memory/IO transfers according to the related art. The DMAs are extended by a logic for monitoring the incoming ACK/REJ. The start address is determined by <regno> or <offset>. The last address of the data block is computed via the address of the command plus its opcode length minus one plus the number of pa_adr$_n$-pa_dta$_n$ rows.

It is also useful to extend the circuit described in German Patent Application No. 198 07 782.2, by the above-mentioned commands.

FIG. 27 shows the structure of a 2602 unit. The unit has a register set 2701 with which a simple ALU is associated for stack operations (2702). The structure contains address registers and stack pointers. Optionally, a full-fledged ALU can be used. A bus system (2703) having a minimum width connects registers and ALU. The width is such that simple control flow commands or simple ALU operations can be represented practically. The above-described PABM commands and the commands described in German Patent Application No. 198 07 782.2, are also supported. Registers and ALU may be controlled by a sequencer 2706, which may represent a complete micro controller by its execution of commands.

A unit 2704, which receives and acknowledges triggers from the associated PAEs and transmits triggers to the PAEs when appropriate, is connected to 2703. Incoming triggers cause an interrupt in sequencer 2706 or are queried by the WAIT command. Optionally, an interface (2705) to a data bus of the associated PAEs is connected to 2703 in order to be able to send data to the PAEs. For example, the assembler codes of a sequencer implemented in the PAEs are transmitted via 2705. The interface contains, when required, a converter for adjusting the different bus widths. Units 2701 through 2706 are connected to a bus system (2708), which is multiple times wider and leads to the memory (2709), via a multiplexer/demultiplexer (2707). 2707 is activated by the lower-value addresses of the address/stack register; the higher-value addresses lead directly to the RAM (2711). Bus system 2708 leads to an interface (2709), which is controlled by the PA commands and leads to the configuration bus of the PAEs. 2708 is designed to be wide enough to be able to send as many configuration bits as possible per cycle unit to the PAEs via 2709. An additional interface (2710) connects the bus to a higher-level CT, which exchanges configuration data and control data with 2602. Examples of interfaces 2710 and 2709 are described in German Patent Application No. 198 07 782.2.

2706 may have a reduced, minimum set of commands that is optimized for the task, mainly for PA commands, jumps, interrupts, and lookup commands. Furthermore, optimized wide bus system 2708, which is transferred to a narrow bus system via 2707 is of particular importance for the reconfiguration speed of the unit.

FIG. 27A illustrates a special version of the example configuration unit shown in FIG. 27. Interface 2705 may be used for transmitting assembler codes to sequencers configured in the PAE array. The processing capacity of the sequencers may depend on the speed of interface 2705 and of its memory access. In FIG. 27A, 2705 is replaced by a DMA function with direct memory access (2720$_n$). 2720$_n$ performs its own memory accesses and has its own bus system (2722$_n$) with appropriate adjustment of the bus width (2721$_n$), the bus may be relatively wide for loading wide command sequences (ULIW), so that in the limit case 2721$_n$ may not be needed. In order to further increase the speed, memory 2711 may be physically separated into 2711 $a$ and 2711 $b_n$. The address space across 2711 $a$ and 2711 $b_n$ remains linear, but 2701, 2701, and 2706 may access both memory blocks independently and simultaneously; 2720$_n$ can only access 2711 $b_n$. 2720$_n$, 2721$_n$, and 2711 $b_n$ can be implemented as multiple units ($_n$), so that more than one sequencer can be managed at the same time. For this purpose, 2711 $b_n$ can be subdivided again into multiple physically independent memory areas. Example implementations for 2720$_n$ are illustrated in FIG. 38 and FIG. 38A.

FIG. 28 illustrates an example structure of complex programs. The basic modules of the programs are the complex configurations (2801) containing the configurations of one or more PAEs and the respective bus and trigger configurations. 2801 are represented by an opcode (2802), which may have additional parameters (2803). These parameters may have constant data values, variable start values or even special configurations. Depending on the function, there may be one parameter, a plurality of parameters, or no parameter.

Multiple opcodes may use a common set of complex configurations to form an opcode group (2805). The different opcodes of a group differ from one another by the special versions of the complex configurations. Differentiation elements (2807) which either contain additional configuration words or overwrite configuration words occurring in 2801 may be used for this purpose.

If no differentiation is required, a complex configuration may be called directly by an opcode (2806). A program (2804) may be composed of a sequence of opcodes having the respective parameters.

A complex function may be loaded once into the array and then reconfigured again by different parameters or differentiations. Only the variable portions of the configuration are reconfigured. Different opcode groups use different complex configurations. (2805 *a*, . . . , 2805 *n*).

The different levels (complex configuration, differentiation, opcode, program) are run in different levels of CTs (see CT hierarchies in German Patent Application No. 198 07 782.2). The different levels are illustrated in 2810, with 1 representing the lowest level and N the highest. CTs with hierarchies of any desired depth can be constructed as described in, for example, German Patent Application No. 198 07 782.2.

A distinction may be made in the complex configurations 2801 between two types of code:
1. Configuration words which map an algorithm onto the array of PAEs. The algorithm may be designed as a sequencer. Configuration may take place via interface 2709. Configuration words may be defined by the hardware.
2.
   2. Algorithm-specific codes, which depend on the possible configuration of a sequencer or an algorithm. These codes may be defined by the programmer or the compiler and are used to activate an algorithm. If, for example, a Z80 microprocessor is configured as a sequencer in the PAEs, these codes represent the opcode of the Z80 microprocessor. Algorithm-specific codes may be transmitted to the array of PAEs via 2705.

Figure 29:
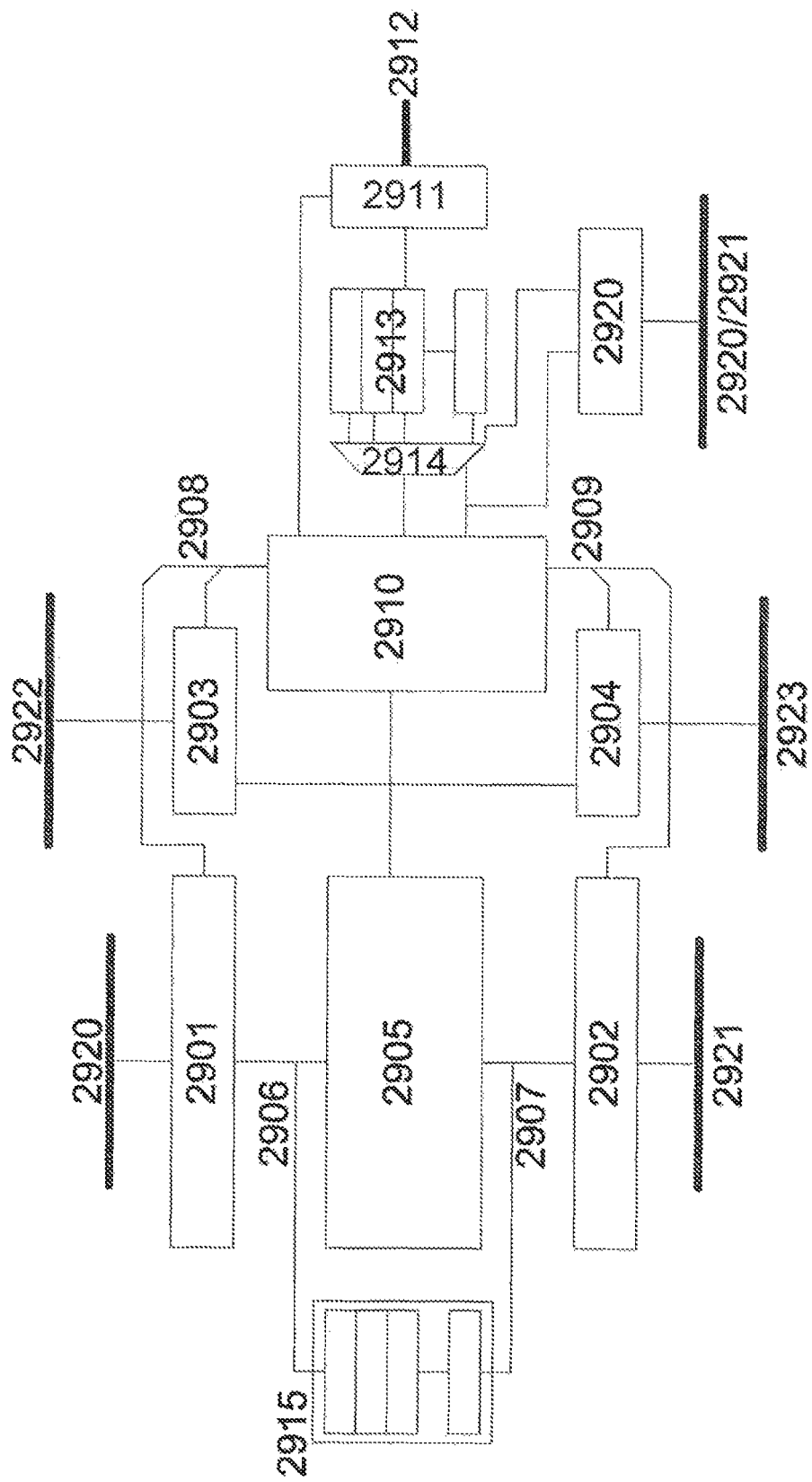
FIG. 29 illustrates an example basic structure of a PAE, according to an example embodiment of the present invention.

FIG. 29 illustrates an example basic structure of a PAE, according to an example embodiment of the present invention. 2901 and 2902 represent, respectively, the input and output registers of the data. The complete interconnection logic to be connected to the data bus(es) (2920, 2921) of the array is associated with the registers, as described in, for example, German Patent Application No. 196 51 075.9. The trigger lines as described in, for example, German Patent Application No. 194 04 728, may be tapped from the trigger bus (2922) by 2903 and connected to the trigger bus (2923) via 2904. An ALU (2905) of any desired configuration is connected between 2901 and 2902. A register set (2915) in which local data is stored is associated with the data buses (2906, 2907) and with the ALU. The RDY/ACK synchronization signals of the data buses and trigger buses are supplied (2908) to a state machine (or a sequencer) (2910) or generated by the unit (2909).

The CT may selectively accesses a plurality of configuration registers (2913) via an interface unit (2911) using a bus system (2912). 2910 selects a certain configuration via a multiplexer (2914) or sequences via a plurality of configuration words which then represent commands for the sequencer.

Since the VPU technology operates mainly pipelined, it is of advantage to additionally provide either groups 2901 and 2903 or groups 2902 and 2904 or both groups with FIFOs. This can prevent pipelines from being jammed by simple delays (e.g., in the synchronization).

2920 is an optional bus access via which one of the memories of a CT (see FIG. 27, 2720) or a conventional internal memory may be connected to sequencer 2910 instead of the configuration registers. This allows large sequential programs to be executed in one PAE. Multiplexer 2914 is switched so that it only connects the internal memory.

The addresses may be
a) generated for the CT memory by the circuit of FIG. 38;
b) generated directly by 2910 for the internal memory.

Figure 30:
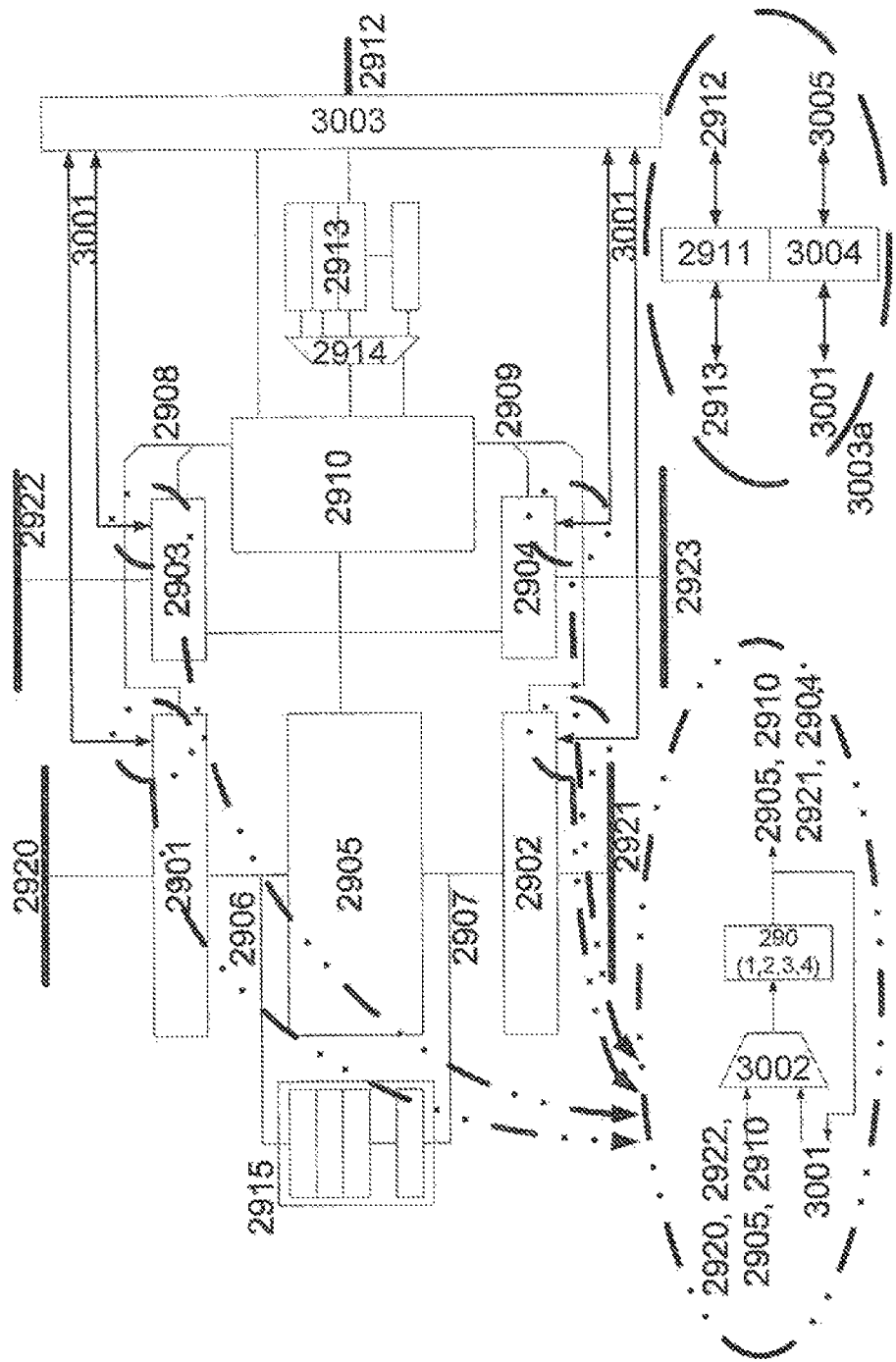
FIG. 30 illustrates an extension of the PAE in order to allow the CT or another connected microprocessor to access the data registers, according to an example embodiment of the present invention.

FIG. 30 illustrates an extension of the PAE in order to allow the CT or another connected microprocessor to access the data registers. The address space and the interface of the bus unit (formerly 2911, 3003) may be extended by the additional data buses (3001). A multiplexer (3002), through which 3003 can write data into the register via bus 3001, is connected upstream from each register. The outputs of the registers are looped back to 3003 via 3001. 3003 transmits the data to CT 2912. As an alternative (3003 *a*), the data can be transmitted to a bus (3005) that is independent of CT via an additional interface (3004) in order to transmit the data to CT.

Figure 31A:
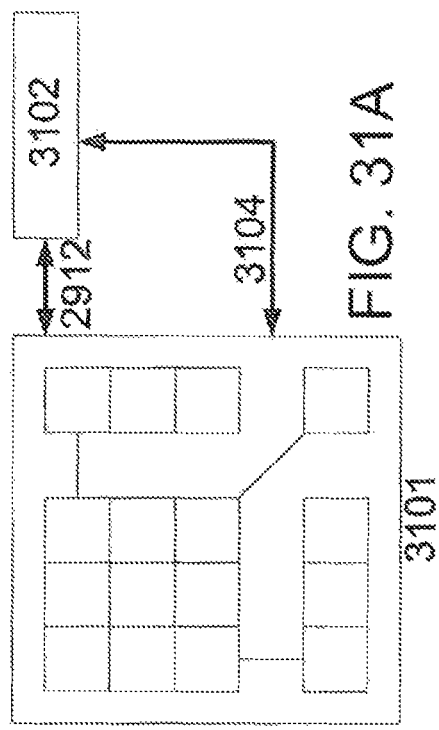
FIGS. 31A-31D illustrate the connection of the array of PAEs to a higher-level micro controller, according to an example embodiment of the present invention.

FIGS. 31A-31D show the connection of the array of PAEs (3101) to a higher-level micro controller. The array may contain 3101 all 10 channels and memories implemented according to the present invention. The architecture may operate as shown in FIG. 23. 2912 in FIG. 31A provides the bus for the configuration data and register data according to FIG. 30. The data bus is shown separately by 3104. 3102 represents the CT, which in FIG. 31A also represents the microprocessor.

For all bus systems, there are the following connection models to a processor which may be selected depending on the programming model and balancing price and performance.

1. Register Model

In the register model, the respective bus is addressed via a register, which is directly integrated in the register set of the processor and is addressed by the assembler as a register or a group of registers. This model is most efficient when a few registers suffice for the data exchange.

2. IO model

The respective bus is located in the IO area of the processor. This is usually the simplest and most cost-effective version.

3. Shared Memory Model

Processor and respective bus share one memory area in the data memory storage device. This is an effective version for large amounts of data.

4. Shared Memory-DMA Model

Processor and bus share the same memory as in the previous model. There is a fast DMA to further increase speed (see FIG. 38), which takes on the data exchange between bus and memory.

In order to increase the transmission speed, the respective memories may be physically separable from the other memories (a plurality of memory banks), so that processor and VPU can access their memories independently.

Figure 31B:
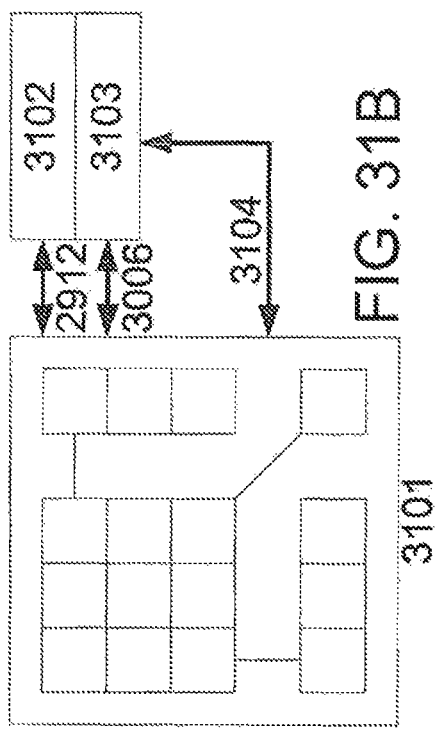

In FIG. 31B, a CT (3102) performs the configuration of the array, while a dedicated processor (3103) guarantees the programming model according to FIG. 23 via 3006 by exchanging register data with the array via 3006 and exchanging conventional data via 3104.

Figure 31C:
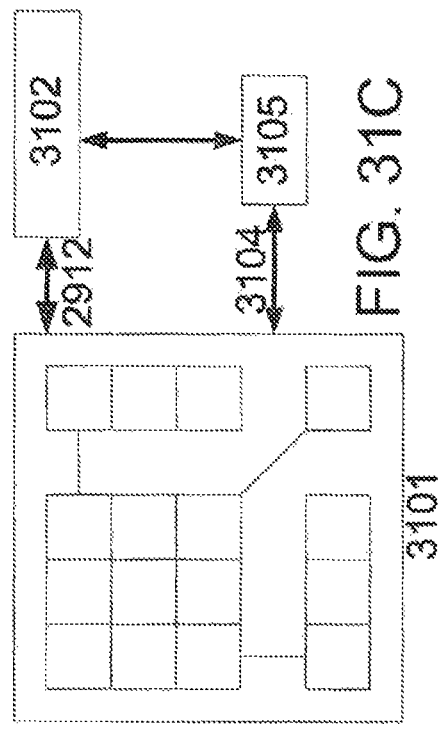
Figure 31D:
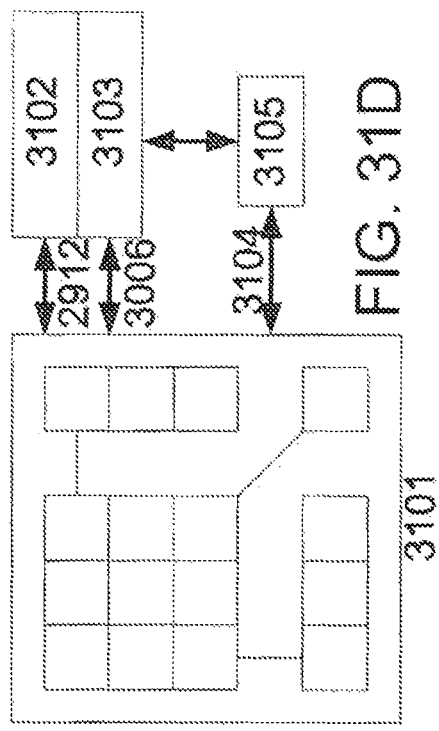

FIG. 31C/D correspond to FIG. 31A/B, but a shared memory (3105) is selected for data exchange between the respective processor and 3101.

Figure 32:
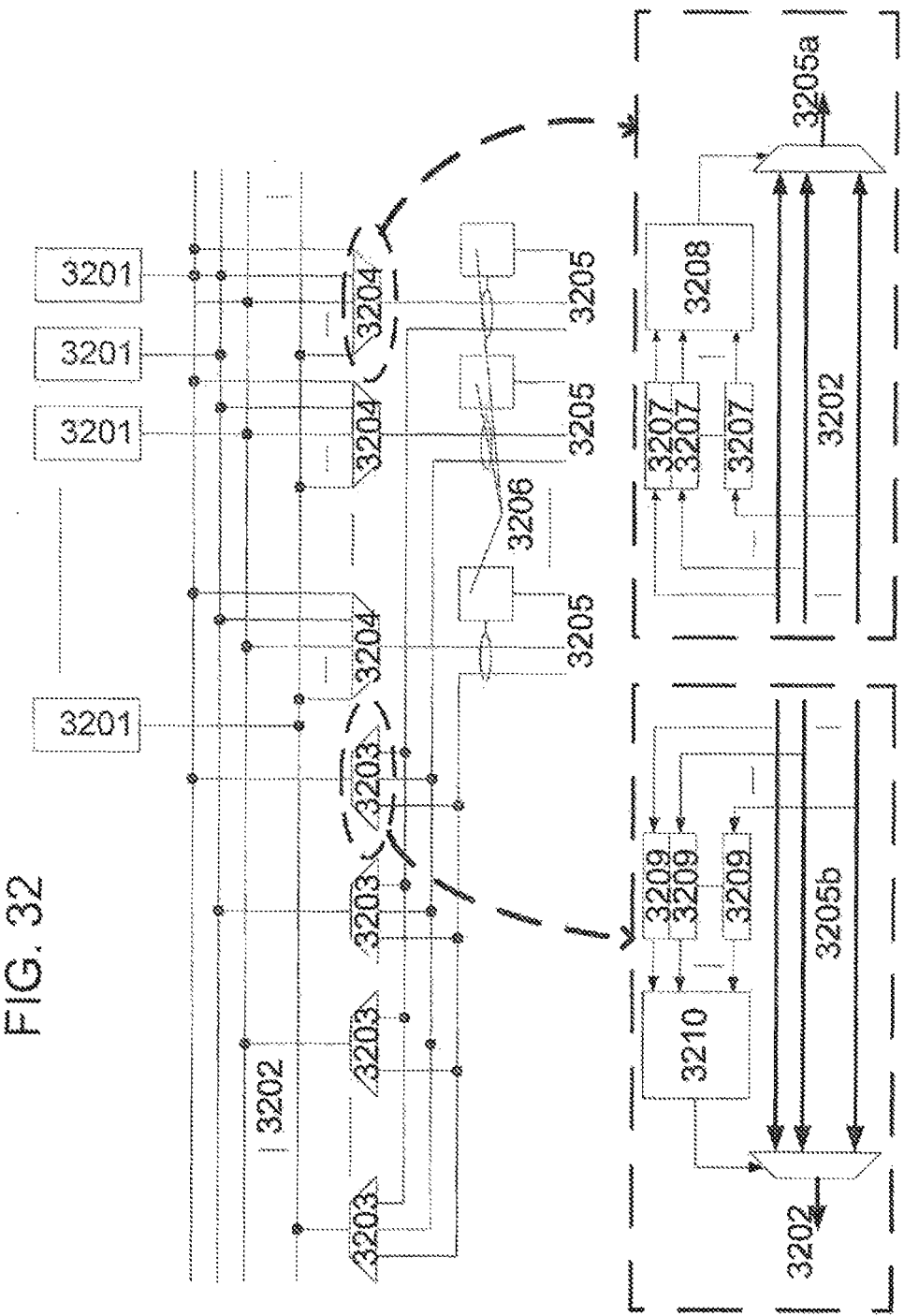
FIG. 32 illustrates an example circuit which allows the memory elements to jointly access a memory or a group of memories, according to an example embodiment of the present invention.

FIG. 32 illustrates an example circuit which allows the memory elements to jointly access a memory or a group of memories, according to an example embodiment of the present invention. Each individual memory of the group may be individually and uniquely addressed. For this purpose, the individual memory elements (3201) may be connected to a bus system, in which each 3201 has its own bus. The bus can be bidirectional or implemented by two unidirectional buses.

There is an address/data multiplexer for each memory, which connects a bus to the memory. For this purpose, the adjacent addresses of each bus are decoded (3207) and then one bus per time unit is selected (3204) by an arbiter (3208). The corresponding data and addresses are transferred to the respective memory bus (3205 *a*), with a state machine (3206) generating the required protocols. If the data are received from the memory upon a read request, the respective state machine sends the address of the memory to the bus that requested the data. The addresses of all incoming buses are evaluated by a multiplexer unit for each bus of the bus system (3202) and transferred to the respective bus. The evaluation takes place corresponding to the evaluation of the output data, e.g., a decoder (3209) for each input bus (3205 *b*) conducts a signal to an arbiter (3210) which activates the data multiplexer. Thus, different input buses are connected to the bus system (3202) in each time unit.

Figure 33:
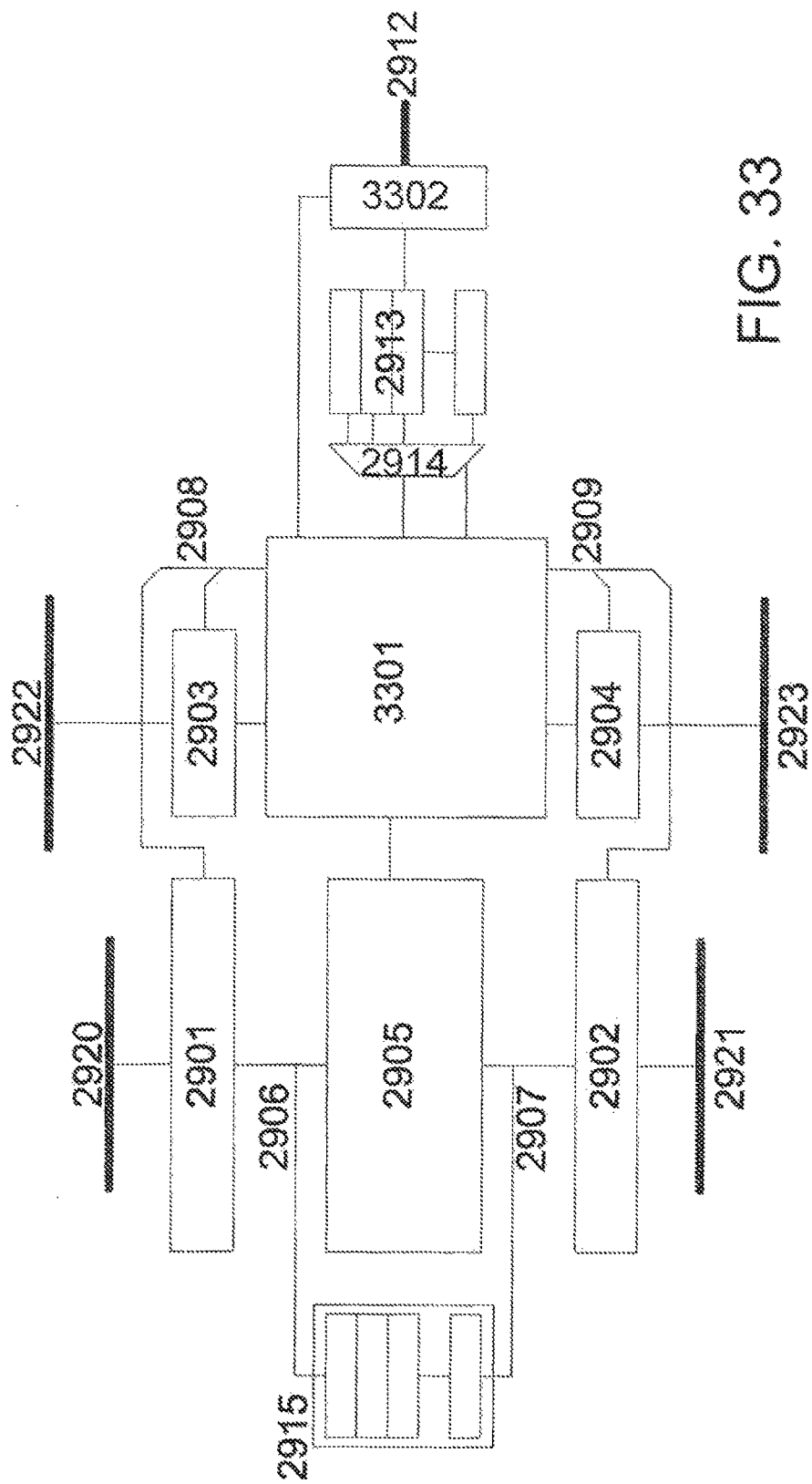
FIG. 33 illustrates the use of a freely programmable sequencer, according to an example embodiment of the present invention.

FIG. 33 illustrates the use of a freely programmable sequencer, according to an example embodiment of the present invention. The rigid state machine/rigid sequencer 2910, previously described, may be replaced by a freely programmable sequencer (3301). This may allow a simpler and more flexible evaluation of the trigger and RDY/ACK signals. The full function of 3301 may be dete/mined by the configuration registers (2913) prior to the execution of algorithms by the CT. Loading of 3301 may be controlled by a CT interface (3302) which has been extended by the management of 3301 with respect to 2911. An advantage of 3301 is that it allows handling of the different trigger and RDY/ACK signals in a much more flexible manner than in fixedly implemented 2910. A possible disadvantage is the potentially larger size of a 3301.

It will be appreciated that a compromise resulting in maximum flexibility and a reasonable size is evaluating the trigger and RDY/ACK signals by a unit according to 3301 and controlling all fixed processes within the PAE by a fixedly implemented unit according to 2910.

Figure 34:
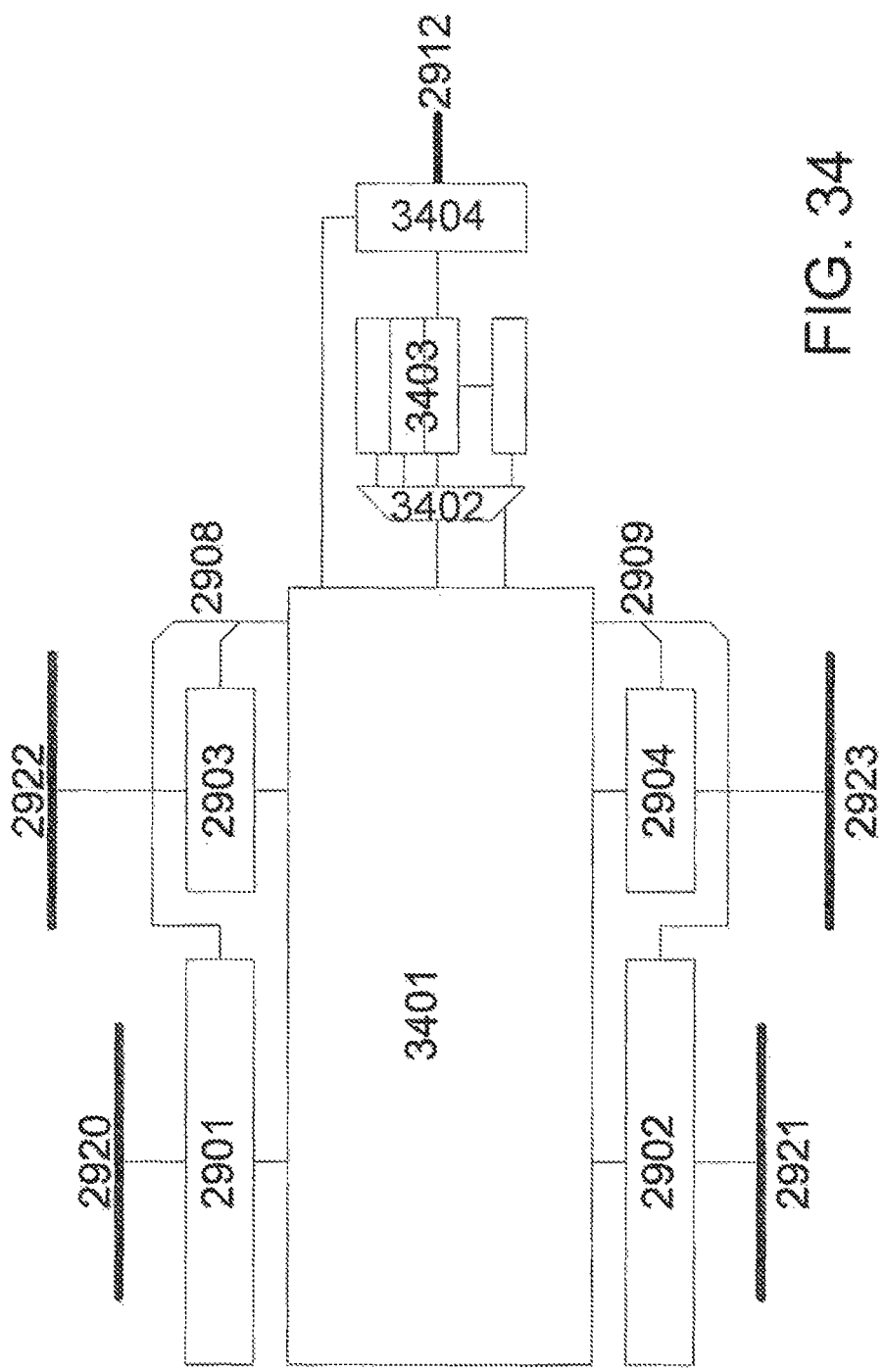
FIG. 34 illustrates a PAE for processing logical functions, according to an example embodiment of the present invention.

FIG. 34 illustrates a PAE for processing logical functions, according to an example embodiment of the present invention. The core of the PAE is a unit described in detail below for gating individual signals (3401). The bus signals are connected to 3401 via the known registers 2901, 2902, 2903, 2904. The registers are extended by a feed mode for this purpose, which selectively exchanges individual signals between the buses and 3401 without storing them (register) in the same cycle. The multiplexer (3402) and the configuration registers (3403) are adjusted to the different configurations of 3401. The CT interface (3404) is also configured accordingly.

Figure 35:
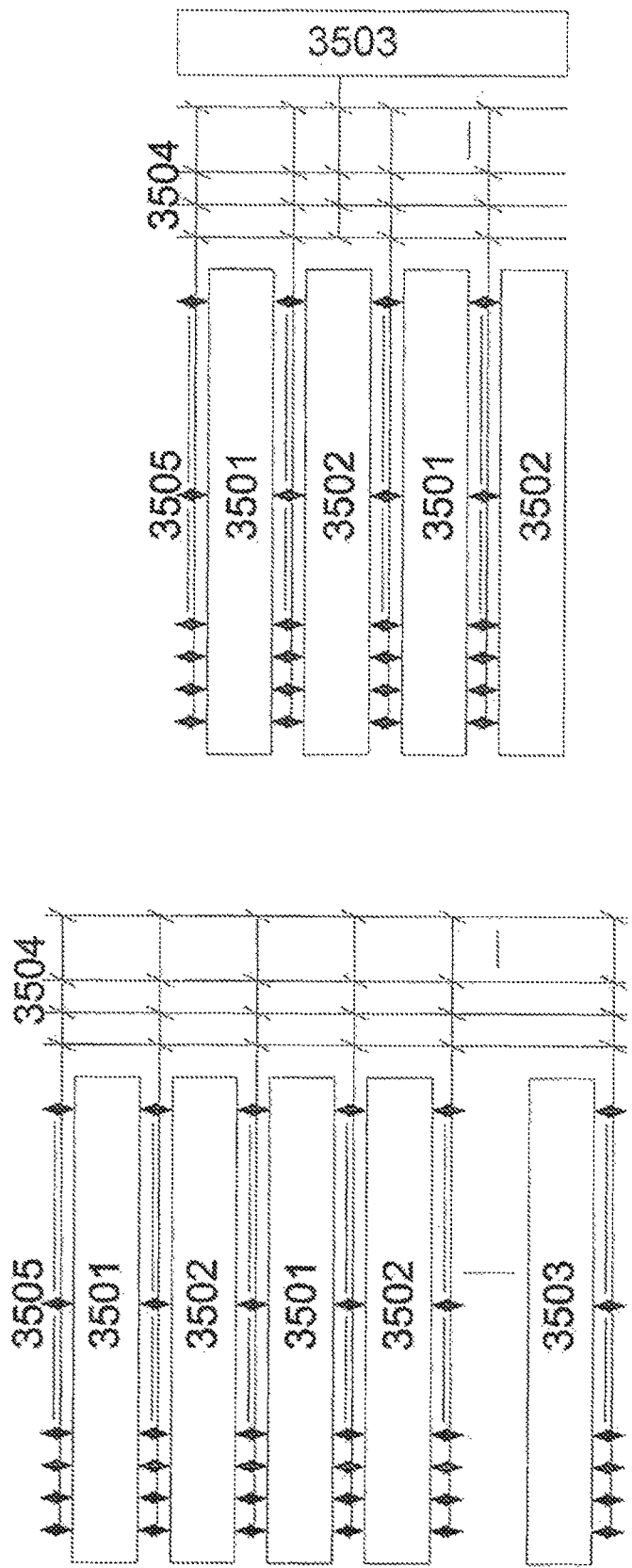
FIG. 35 illustrates possible designs of a unit for gating individual signals, according to an example embodiment of the present invention.

FIG. 35 illustrates possible designs of 3401, for a unit according to an example embodiment of the present invention. A global data bus 3504 connects logic cells 3501 and 3502 to registers 2901, 2902, 2903, 2904. 3504 is connected to the logic cells via bus switches, which can be designed as multiplexers, gates, transmission gates, or simple transistors. The logic cells may be designed to be completely identical or may have different functionalities (3501, 3502). 3503 represents a RAM.

Possible designs of the logic cells include:
lookup tables,
logic
multiplexers
registers The selection of the functions and interconnection can be either flexibly programmable via SRAM cells or using read-only ROMs or semistatic Flash ROMs.

Figure 36:
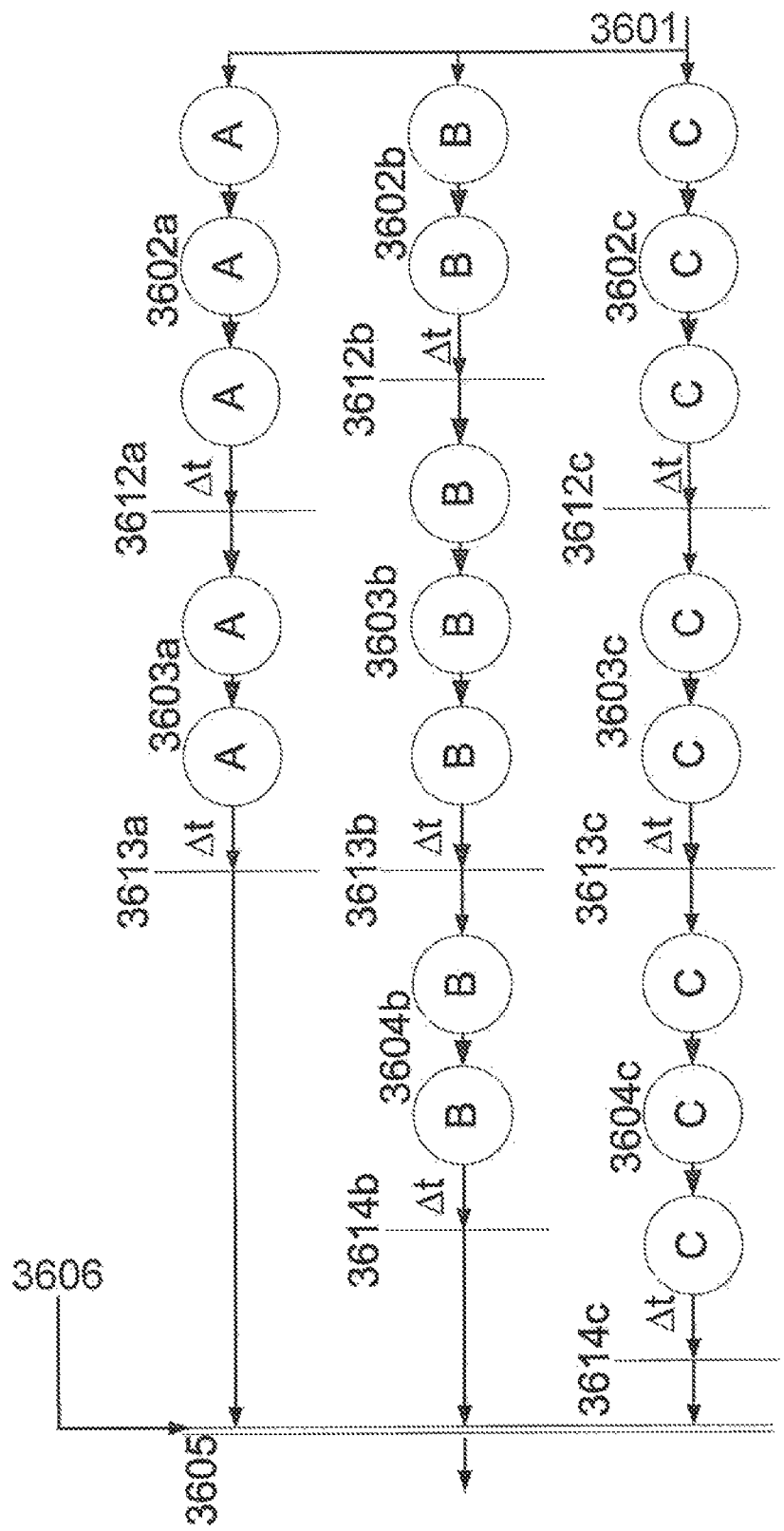
FIG. 36 illustrates speculative design with VPUs, according to an example embodiment of the present invention.

In order to speed up sequential algorithms, which are difficult to parallelize, speculative design may be utilized. FIG. 36 illustrates speculative design with VPUs, according to an example embodiment of the present invention. The operands (3601) may go to a plurality of possible paths of subalgorithms (3602 *a*, 3602 *b*, 3602 *c*) at the same time. The subalgorithms may have different area and time requirements. Depending on the subalgorithms, the data is stored according to the present invention (3612 *a*, 3612 *b*, 3612 *c*) before being processed (3603) by the next subalgorithms after reconfiguration. The times of reconfiguration of the individual subalgorithms are also independent of one another, as is the number of subalgorithms themselves (3603, 3614). As soon as it can be decided which of the paths is to be selected, the paths are combined via a bus or a multiplexer (3605). Trigger signals generated by a condition, e.g., as described in German Patent Application No. 197 04 728.9, (3606) determine which of the paths is selected and forwarded to the next algorithms.

Figure 37:
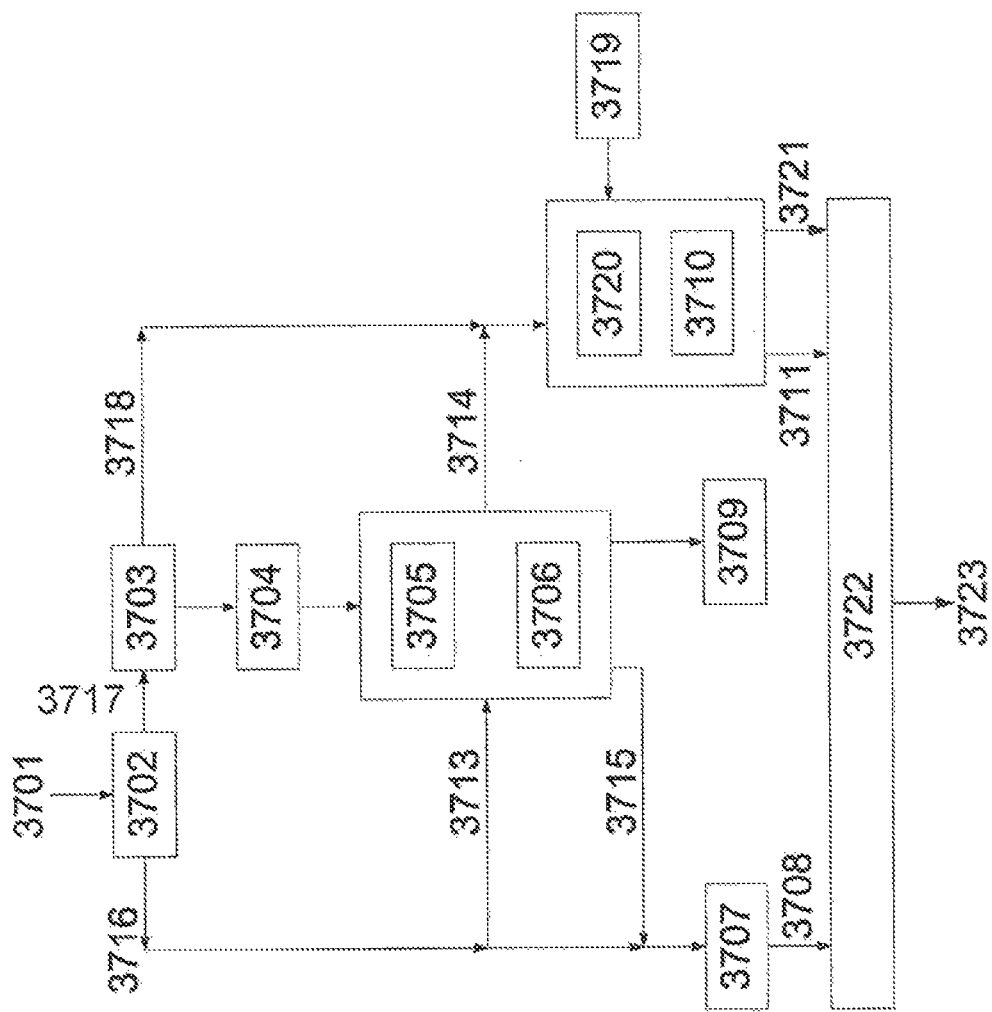
FIG. 37 illustrates the design of an example high-level language compiler, according to an example embodiment of the present invention.

FIG. 37 illustrates the design of an example high-level language compiler. The complier may translate common sequential high-level languages (C, Pascal, Java) to a VPU system. Sequential code (3711) is separated from parallel code (3708), whereby, 3708 is directly processed in the array of PAEs.

There are three design options for sequential code 3711:
1. Within a sequencer of a PAE (2910).
2. Via a sequencer configured in the VPU. To do so, the compiler may generate a sequencer optimized for the task, as well as the algorithm-specific sequencer code (see 2801) directly.
3. On a conventional external processor (3103).

The option selected depends on the architecture of the VPU, of the computer system, and of the algorithm.

The code (3701) may initially be separated in a preprocessor (3702) into data flow code (3716) (written in a special version of the respective programming language and optimized for the data flow), and common sequential code (3717). 3717 is checked for parallelizable subalgorithms (3703), and the sequential subalgorithms are eliminated (3718). The parallelizable subalgorithms are placed temporarily as macros and routed.

In an iterative process, the macros are placed together with the data flow-optimized code (3713), routed, and partitioned (3705). A statistical unit (3706) evaluates the individual macros and their partitioning with regard efficiency, with the time and the resources used for reconfiguration being factored into the efficiency evaluation. Inefficient macros are removed and separated as sequential code (3714).

The remaining parallel code (3715) is compiled and assembled (3707) together with 3716, and VPU object code is output (3708).

Statistics concerning the efficiency of the code generated and of the individual macros (including those removed with 3714) are output (3709); thus, the programmer receives essential information on the speed optimization of the program.

Each macro of the remaining sequential code is checked for complexity and requirements (3720). The appropriate sequencer is selected from a database, which depends on the VPU architecture and the computer system (3719), and output as VPU code (3721). A compiler (3721) generates and outputs (3711) the assembler code of the respective macro for the sequencer selected by 3720. 3710 and 3720 are closely linked. The process may take place iteratively in order to find the most suitable sequencer with the least and fastest assembler code.

A linker (3722) combines the assembler codes (3708, 3711, 3721) and generates the executable object code (3723).

FIG. 38 and FIG. 38A illustrate the internal structure of an example direct memory access unit, according to an example embodiment of the present invention. The core of the circuit is a loadable up/down counter (3801), which may get its start value from bus 3803 (corresponds to 2703) of the circuit of FIG. 27 via appropriately set multiplexer 3802. The counter may be used as a program counter (PC) for the associated sequencer; the start value is the first address of the program to be executed. The value of 3801 is looped back to the counter via an adder (3805) and 3802. An offset, which is either subtracted from or added to the PC, is sent by the sequencer to 3805 via bus 3804. Thus, relative jumps can be efficiently implemented. The PC is supplied to the PAE array via bus 3811 and can be stored on the stack for call operations. For ret operations, the PC is sent from the stack to 3801 via 3804 and 3802.

Either the PC or a stack pointer (3807) supplied by the PAE array is supplied to an adder (3808) via multiplexer 3806. Here an offset which is stored in register 3809 and written via 3803 is subtracted from or added to the values. 3808 allows the program to be shifted within memory 2711. This enables garbage collector functions to clean up the memory German Patent Application no. 198 07 782.2. The address shift which occurs due to the garbage collector is compensated for by adjustment of the offset in 3809.

FIG. 38A is a variant of FIG. 38 in which the stack pointer (3820) is also integrated. Only the offset is supplied to 3805 via 3804 for relative jumps (3804 a). The stack pointer is an up/down counter similar to 3801, whose start value represents the beginning of the stack and is loaded via 3803. The PC is sent directly to the data bus for the memory in order to be written onto the stack via a multiplexer in the event of call operations. The data bus of the memory is looped back to 3801 via 3821 and 3802 to perform ret operations.

FIG. 39 illustrates the mode of operation of the memories, according to an example embodiment of the present invention. The memory (3901) is addressed via a multiplexer (3902). In the standard mode, lookup mode, and register mode, the addresses are supplied from the array (3903) directly to 3901.

In the stack mode and FIFO mode, the addresses are generated in an up/down counter (3904). In this case, the addresses are supplied to the IO side by another up/down counter (3905). The addresses for the external RAM (or IO) are generated by another up/down counter (3906); the base address is loaded from a register (3907). The register is set by the CT or an external host processor. A state machine (3908) takes over the entire control. 3908 reads the status of the memory (full, empty, half-full, etc.) in an up/down counter (3909), which counts the number of words in the memory. If the memory is modified block by block (write stack onto external stack or read from external stack), the size of the block is supplied as a constant (3917) to an adder/subtracter (3910), to which the count of 3909 is looped back. The result is loaded according to 3909.

Thus, the count can be rapidly adjusted to block-by-block changes. (Of course, it is also possible to modify the counter with each written or read word in a block operation.) For cache operations, a conventional cache controller (3911) is available, which is associated with a tag memory (3912).

Depending on the mode of operation, the value of 3911 or 3906 is sent out (3914) via a multiplexer (3913) as an address. The data is sent out via bus 3915, and data is exchanged with the array via bus 3916.

Programming Examples to Illustrate the Subalgorithms

A software module may be declared in the following way, for example:

module example1
input (var1, var2: $ty_1$, var3: $ty_2$).
output (res1, res2: $ty_3$).
begin
. . . .
register <regname1> (res1).
register <regname2> (res2).
terminate@ (res1 & res2; 1).
end.

module identifies the beginning of a software module.
input/output defines the input/output variables with the types $ty_n$.
begin . . . end mark the body of the software module.
register <regname1/2> transfers the result to the output, the result being temporarily stored in the register specified by <regname1/2>. <regname1/2> is a global reference to a certain register.

The following memory types are available, for example, as additional transfer modes to the output:
fifo <fifoname>, where the data is transmitted to a memory operating by the FIFO principle. <fifoname> is a global reference to a specific memory operating by the FIFO principle, terminated@ is extended by the "fifofull" parameter, e.g., signal, which shows that the memory is full. stack <stackname>, where the data is transmitted to a memory operating by the stack principle. <stackname> is a global reference to a specific memory operating in the stack mode.
terminate@ differentiates the programming by the method according to the present invention from conventional sequential programming. The command defines the abort criterion of the software module. The result variables res1 and res2 are not evaluated by terminate@ with their actual values, but only the validity of the variables (e.g., their status signal) is checked. For this purpose, the two signals res1 and res2 are gated with one another logically via an AND, OR, or XOR operation. If both variables are valid, the software module is terminated with the value 1. This means that a signal having value 1 is forwarded to the higher-level load unit, whereupon the higher-level load unit loads the next software module.

module example2
input (var1, var2: $ty_3$; var3: $ty_2$).
output (res1: $ty_4$).
begin
register <regname1> (var1, var2).
. . . .
fifo <fifoname1> (res1, 256).
terminate@ (fifofull(<fifoname1>); 1).
end.

register is defined via input data in this example. <regname1> is the same here as in example1. This causes the register, which receives the output data in example1, to provide the input data for example2.
fifo defines a FIFO memory with a depth of 256 for the output data res1. The full flag (fifofull) of the FIFO memory is used as an abort criterion in terminate@.

module main
input (in1, in2: $ty_1$; in3: $ty_2$).
output (out1: $ty_4$).
begin

```
define <regname1>: register(234).
define <regname2>: register(26).
define <fifoname1>: fifo(256,4). //FIFO depth 256
....
(var12, var72)=call example1 (in1, in2, in3).
....
(out1)=call example2 (var12, var72, var243).
....
signal (out1).
terminate@ (example2).
end.
``` define defines an interface for data (register, memory, etc.).

The required resources and the name of the interface are specified with the definition. Since each of the resources is only available once, they must be specified unambiguously.

Thus the definition is global, e.g., the name is valid for the entire program.

call calls a software module as a subprogram.

signal defines a signal as an output signal without a buffer being used.

The software module main is terminated by terminate@ (example2) as soon as subprogram example2 is terminated.

In principle, due to the global declaration "define . . . " the input/output signals thus defined do not need to be included in the interface declaration of the software modules.

The invention claimed is:

1. A method for operating a processor having an array of data processing cells to execute an application in an interruptible manner, wherein the application is formed of subapplications that are ordered in a sequence and that are each a respective uninterruptible unit of the application that comprises a respective plurality of processing instructions to be executed by one of the data processing cells without interruption so that the respective one of the data processing cells executing the respective subapplication is not switchable to execute a different task prior to completion of the execution of the respective subapplication, the method comprising:
   a controlling unit distributing to said array of data processing cells and according to the sequence a plurality of the subapplications for execution by respective ones of the data processing cells;
   a data processing cell of the array of data processing cells sending a trigger to the controlling unit in response to completion by the respective data processing cell of execution of the instructions of a respective one of the plurality of subapplications that had been distributed to the respective data processing cell;
   in response to receiving the trigger, the controlling unit supplying to the data processing cell that sent the trigger a next one of the subapplications according to the sequence and while other ones of the data processing cells continue respective executions of the instructions of the respective ones of the subapplications that had been previously distributed to them;
   in response to receiving said next one of the subapplications, the data processing cell that had received said next one of the subapplications processing data by executing the processing instructions of the next one of the subapplications;
   during the execution of the application formed of the subapplications, storing processing states of the execution and storing data states of processed data of the execution; and
   the controlling unit responding to an interrupt event that occurs prior to distribution of all of the subapplications of the application by interrupting the distribution of the subapplications to the array of data processing cells, in order to control the data processing cells to execute a different application, but without interrupting uncompleted execution of any of the subapplications whose execution had begun prior to the interrupt event, wherein:
   none of the processing states obtained prior to the interrupt event are saved for accessibility after the different application is loaded and completion of the execution of all of the subapplications whose execution had begun prior to the interrupt event; and
   the data states obtained prior to the interrupt event:
      are saved so that they are accessible after the different application is loaded and the completion of the execution of all of the subapplications whose execution had begun prior to the interrupt event; and
      after execution of at least a part of the different application after the interrupt event, the are restored and used for continuing execution of the application formed of the subapplications.

2. The method of claim 1, further comprising, after the interrupt event, responding to completion of execution of all of the subapplications whose execution had begun prior to the interrupt event by loading at least a portion of the different application onto at least a portion of the array of data processing cells, so that no part of the loading occurs until completion of the execution of all of the subapplications whose execution had begun prior to the interrupt event.

3. The method of claim 1, wherein the processing states are obtained during respective executions of respective ones of the subapplications and are maintained only as long as the respective subapplications by whose execution the respective processing states were obtained are loaded in respective ones of the data processing units.

4. The method of claim 1, wherein the array of data processing cells include arithmetic logic units (ALUs).

5. The method of claim 1, wherein, after execution of the at least a part, but not an entirety, of the different application after the interrupt event, the data states obtained prior to the interrupt event are restored and used for continuing execution of the application formed of the subapplications.

6. A method for operating a processor having an array of data processing cells to execute an application in an interruptible manner, wherein the application is formed of subapplications that are ordered in a sequence and that are each a respective uninterruptible unit of the application that comprises a respective plurality of processing instructions to be executed by one of the data processing cells without interruption so that the respective one of the data processing cells executing the respective subapplication is not switchable to execute a different task prior to completion of the execution of the respective subapplication, the method comprising:
   a controlling unit distributing to said array of data processing cells and according to the sequence a plurality of the subapplications for execution by respective ones of the data processing cells, wherein, for each of at least of at least one of the subapplications, states are used for execution of the respective subapplications, the states including:
      first states that (a) are processing states of the execution, (b) are generated during the execution of the respective subapplication, (c) are not relevant subsequent to completion of the execution of the respective subapplication, and (d) are not stored for accessibility once the execution of the respective subapplication is completed; and second states that (a) are data states of processed data of the execution, (b) are generated during the execution of the respective subapplication, and (c) are maintained for accessibility after the execution of the respective subapplication has completed;

a data processing cell of the array of data processing cells sending a trigger to the controlling unit in response to completion by the respective data processing cell of execution of the instructions of a respective one of the plurality of subapplications that had been distributed to the respective data processing cell;

in response to receiving the trigger, the controlling unit supplying to the data processing cell that sent the trigger a next one of the subapplications according to the sequence and while other ones of the data processing cells continue respective executions of the instructions of the respective ones of the subapplications that had been previously distributed to them;

in response to receiving said next one of the subapplications, the data processing cell that had received said next one of the subapplications processing data by executing the processing instructions of the next one of the subapplications;

during the execution of the application formed of the subapplications, storing the processing states and the data states of processed data of the execution; and the controlling unit responding to an interrupt event that occurs prior to distribution of all of the subapplications of the application by interrupting the distribution of the subapplications to the array of data processing cells, in order to control the data processing cells to execute a different application, but without interrupting uncompleted execution of any of the subapplications whose execution had begun prior to the interrupt event, wherein:

none of the processing states obtained prior to the interrupt event are saved for accessibility after the different application is loaded and completion of the execution of all of the subapplications whose execution had begun prior to the interrupt event; and the data states obtained prior to the interrupt event are saved so that they are accessible after the different application is loaded and the completion of the execution of all of the subapplications whose execution had begun prior to the interrupt event.

7. The method of claim 6, wherein the array of data processing cells include arithmetic logic units (ALUs).

8. The method of claim 6, further comprising, after the interrupt event, responding to completion of execution of all of the subapplications whose execution had begun prior to the interrupt event by loading at least a portion of the different application onto at least a portion of the array of data processing cells, so that no part of the loading occurs until completion of the execution of all of the subapplications whose execution had begun prior to the interrupt event.

9. The method of claim 6, wherein the processing states are obtained during respective executions of respective ones of the subapplications and are maintained only as long as the respective subapplications by whose execution the respective processing states were obtained are loaded in respective ones of the data processing units.

* * * * *